(12) United States Patent
Sadr et al.

(10) Patent No.: US 10,585,159 B2
(45) Date of Patent: Mar. 10, 2020

(54) RADIO FREQUENCY IDENTIFICATION TAG LOCATION ESTIMATION AND TRACKING SYSTEM AND METHOD

(71) Applicant: Mojix, Inc., Los Angeles, CA (US)

(72) Inventors: Ramin Sadr, Los Angeles, CA (US); Scott Stephens, Los Angeles, CA (US); Christopher Richard Jones, Pacific Palisades, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

(21) Appl. No.: 15/893,474

(22) Filed: Feb. 9, 2018

(65) Prior Publication Data

US 2019/0018101 A1 Jan. 17, 2019

Related U.S. Application Data

(63) Continuation of application No. 15/042,068, filed on Feb. 11, 2016, now abandoned, which is a
(Continued)

(51) Int. Cl.
*G01S 5/02* (2010.01)
*G01S 5/12* (2006.01)
(Continued)

(52) U.S. Cl.
CPC ............. *G01S 5/02* (2013.01); *G01S 5/0278* (2013.01); *G01S 5/12* (2013.01); *G06K 7/10366* (2013.01);
(Continued)

(58) Field of Classification Search
None
See application file for complete search history.

(56) References Cited

U.S. PATENT DOCUMENTS

| 3,130,408 A | | 4/1964 | Kumano |
| 4,595,915 A | * | 6/1986 | Close ...................... G01S 13/56 250/390.02 |

(Continued)

FOREIGN PATENT DOCUMENTS

| CN | 1639706 A | 7/2005 |
| CN | 200947246 Y | 9/2007 |

(Continued)

OTHER PUBLICATIONS

"OMRON Develops World-First RFID Technology for Measuring the Distance Between UHF-Band Antenna and IC Tags," http://www.finanznachrichten.de/nachrichten-2007-09/artikel-8988010.asp, Sep. 10, 2007, 3 pgs.

(Continued)

*Primary Examiner* — Fekadeselassie Girma
(74) *Attorney, Agent, or Firm* — KPPB LLP

(57) ABSTRACT

Systems and methods for locating one or more radio frequency identification (RFID) tags are provided. A phase difference of received information signals of illuminated RFID tags is utilized to locate the RFID tags. One or more exciters transmit interrogation signals to illuminate the RFID tags in which the exciters may have a plurality of antenna selectively configured to transmit through two or more antennas and to receive on one antenna. Multiple reads of the same RFID tag can also be performed to generate a probability model of the location of the RFID tag. An enhanced particle filter is applied to probability model to determine the exact location of the RFID.

19 Claims, 40 Drawing Sheets

Related U.S. Application Data continuation of application No. 14/136,653, filed on Dec. 20, 2013, now Pat. No. 9,291,699, which is a continuation of application No. 13/309,329, filed on Dec. 1, 2011, now Pat. No. 8,629,762, which is a continuation of application No. 12/423,796, filed on Apr. 14, 2009, now Pat. No. 8,072,311.

(60) Provisional application No. 61/124,294, filed on Apr. 14, 2008, provisional application No. 61/044,904, filed on Apr. 14, 2008.

(51) Int. Cl.
G06K 7/10 (2006.01)
G01S 3/74 (2006.01)
G01S 5/04 (2006.01)
G01S 13/87 (2006.01)

(52) U.S. Cl.
CPC . G01S 3/74 (2013.01); G01S 5/04 (2013.01); G01S 13/878 (2013.01)

(56) References Cited

U.S. PATENT DOCUMENTS

| | | |
|---|---|---|
| 4,903,033 A | 2/1990 | Tsao et al. |
| 5,001,492 A | 3/1991 | Shapiro et al. |
| 5,040,191 A | 8/1991 | Forney, Jr. et al. |
| 5,061,943 A | 10/1991 | Rammos |
| 5,126,748 A | 6/1992 | Ames et al. |
| 5,227,803 A | 7/1993 | O'Connor et al. |
| 5,365,516 A | 11/1994 | Jandrell |
| 5,369,404 A | 11/1994 | Galton |
| 5,448,250 A | 9/1995 | Day |
| 5,525,991 A | 6/1996 | Nagura et al. |
| 5,602,741 A | 2/1997 | Talbot et al. |
| 5,640,151 A | 6/1997 | Reis et al. |
| 5,648,767 A | 7/1997 | O'Connor et al. |
| 5,684,832 A | 11/1997 | Adachi et al. |
| 5,929,701 A | 7/1999 | Rice |
| 5,936,527 A | 8/1999 | Isaacman et al. |
| 5,955,966 A | 9/1999 | Jeffryes et al. |
| 5,963,149 A | 10/1999 | Nagura |
| 6,037,898 A | 3/2000 | Parish et al. |
| 6,042,547 A | 3/2000 | Wright et al. |
| 6,127,981 A | 10/2000 | Pritchett et al. |
| 6,184,841 B1 | 2/2001 | Shober et al. |
| 6,233,290 B1 | 5/2001 | Raphaeli |
| 6,236,367 B1 | 5/2001 | Du Toit et al. |
| 6,252,542 B1 | 6/2001 | Sikina et al. |
| 6,252,553 B1 | 6/2001 | Solomon |
| 6,353,406 B1 | 3/2002 | Lanzl et al. |
| 6,377,217 B1 | 4/2002 | Zhu et al. |
| 6,392,544 B1 | 5/2002 | Collins |
| 6,396,438 B1 | 5/2002 | Seal |
| 6,456,239 B1 | 9/2002 | Werb et al. |
| 6,531,984 B1 | 3/2003 | Johannisson et al. |
| 6,549,166 B2 | 4/2003 | Bhattacharyya et al. |
| 6,574,478 B1 | 6/2003 | Mortensen |
| 6,600,443 B2 | 7/2003 | Landt |
| 6,678,340 B1 | 1/2004 | Khlat et al. |
| 6,750,757 B1 | 6/2004 | Gabig et al. |
| 6,825,754 B1 | 11/2004 | Rolin |
| 6,831,608 B2 | 12/2004 | Arvidsson |
| 6,836,472 B2 | 12/2004 | O'Toole et al. |
| 6,897,809 B2 | 5/2005 | Carson et al. |
| 6,903,656 B1 | 6/2005 | Lee |
| 6,917,291 B2 | 7/2005 | Allen |
| 6,982,670 B2 | 1/2006 | Mohamadi |
| 6,995,711 B2 | 2/2006 | Killen et al. |
| 7,002,461 B2 | 2/2006 | Duncan et al. |
| 7,009,561 B2 | 3/2006 | Menache et al. |
| 7,024,331 B2 | 4/2006 | Jones et al. |
| 7,026,935 B2 | 4/2006 | Diorio et al. |
| 7,030,761 B2 | 4/2006 | Bridgelall et al. |
| 7,035,322 B2 | 4/2006 | Girard |
| 7,066,441 B2 | 6/2006 | Warburton-Pitt |
| 7,076,000 B2 | 7/2006 | Rodriguez |
| 7,119,738 B2 | 10/2006 | Brighelall et al. |
| 7,155,172 B2 | 12/2006 | Scott |
| 7,161,489 B2 | 1/2007 | Sullivan et al. |
| 7,187,288 B2 | 3/2007 | Mendolia et al. |
| 7,212,116 B2 | 5/2007 | Wang et al. |
| 7,228,228 B2 | 6/2007 | Bartlett et al. |
| 7,253,717 B2 | 8/2007 | Armstrong et al. |
| 7,260,369 B2 | 8/2007 | Feher |
| 7,271,765 B2 | 9/2007 | Stilp et al. |
| 7,289,064 B2 | 10/2007 | Cheng |
| 7,289,815 B2 | 10/2007 | Gfeller et al. |
| 7,345,625 B1 | 3/2008 | Urkowitz |
| 7,362,266 B2 | 4/2008 | Collinson |
| 7,378,967 B2 | 5/2008 | Sullivan et al. |
| 7,418,065 B2 | 8/2008 | Qiu et al. |
| 7,423,586 B2 | 9/2008 | Schieblich |
| 7,432,855 B2 | 10/2008 | Mohamadi |
| 7,432,874 B2 | 10/2008 | Meissner |
| 7,477,193 B2 | 1/2009 | Evers et al. |
| 7,479,875 B2 | 1/2009 | Fehling et al. |
| 7,528,776 B2 | 5/2009 | Montuno |
| 7,561,053 B2 | 7/2009 | Hecht et al. |
| 7,592,909 B2 | 9/2009 | Zaruba et al. |
| 7,599,441 B2 | 10/2009 | Ma et al. |
| 7,627,329 B2 | 12/2009 | Mizugaki et al. |
| 7,633,377 B2 | 12/2009 | Sadr |
| 7,649,491 B2 | 1/2010 | Ohara et al. |
| 7,652,577 B1 | 1/2010 | Madhow et al. |
| 7,667,652 B2 * | 2/2010 | Gevargiz ............. H01Q 1/2216 343/700 MS |
| 7,668,794 B2 | 2/2010 | Wang et al. |
| 7,692,532 B2 | 4/2010 | Fischer et al. |
| 7,693,681 B2 | 4/2010 | Yamada |
| 7,710,320 B2 | 5/2010 | Fullerton et al. |
| 7,738,554 B2 | 6/2010 | Lin et al. |
| 7,789,308 B2 | 9/2010 | Droms et al. |
| 7,800,541 B2 | 9/2010 | Moshfeghi |
| 7,817,754 B2 | 10/2010 | MacLeod |
| 7,825,858 B2 | 11/2010 | Blessing et al. |
| 7,873,326 B2 | 1/2011 | Sadr |
| 7,917,155 B2 | 3/2011 | Karr et al. |
| 7,973,701 B2 | 7/2011 | Lohmeier et al. |
| 8,072,311 B2 * | 12/2011 | Sadr .......................... G01S 5/12 340/10.1 |
| 8,095,923 B2 | 1/2012 | Harvey et al. |
| 8,258,925 B2 | 9/2012 | Lam et al. |
| 8,395,482 B2 | 3/2013 | Sadr et al. |
| 8,400,271 B2 | 3/2013 | Sadr |
| 8,552,835 B2 | 10/2013 | Sadr |
| 8,570,172 B2 | 10/2013 | Al-Mahdawi |
| 8,629,762 B2 * | 1/2014 | Sadr .......................... G01S 5/12 340/10.1 |
| 8,680,970 B2 | 3/2014 | Sadr et al. |
| 8,690,057 B2 | 4/2014 | Schoening et al. |
| 8,712,444 B2 | 4/2014 | Dahl et al. |
| 8,768,248 B2 | 7/2014 | Sadr |
| 8,830,091 B2 | 9/2014 | Karlsson et al. |
| 8,941,472 B2 | 1/2015 | Sadr |
| 8,981,908 B2 | 3/2015 | Sadr |
| 9,008,239 B2 | 4/2015 | Sadr et al. |
| 9,014,635 B2 | 4/2015 | Sadr et al. |
| 9,014,970 B2 | 4/2015 | Oi et al. |
| 9,291,699 B2 * | 3/2016 | Sadr .......................... G01S 5/12 |
| 9,312,987 B2 | 4/2016 | Sadr et al. |
| 9,602,316 B2 | 3/2017 | Divsalar |
| 9,613,236 B2 | 4/2017 | Sadr |
| 9,614,604 B2 | 4/2017 | Sadr |
| 9,647,797 B2 | 5/2017 | Sadr et al. |
| 9,690,957 B2 | 6/2017 | Sadr et al. |
| 9,762,976 B2 | 9/2017 | Sadr et al. |
| 9,883,337 B2 | 1/2018 | Sadr et al. |
| 9,924,244 B2 | 2/2018 | Sadr et al. |
| 2001/0001616 A1 | 5/2001 | Rakib et al. |
| 2001/0017898 A1 | 8/2001 | Raheli et al. |
| 2001/0022813 A1 | 9/2001 | Tan et al. |

(56) References Cited

U.S. PATENT DOCUMENTS

| | | | |
|---|---|---|---|
| 2002/0024448 A1* | 2/2002 | Olesen | G01S 13/765 340/8.1 |
| 2002/0042290 A1 | 4/2002 | Williams et al. | |
| 2002/0057729 A1 | 5/2002 | Farbod et al. | |
| 2002/0063622 A1 | 5/2002 | Armstrong et al. | |
| 2002/0091666 A1 | 7/2002 | Rice et al. | |
| 2002/0093454 A1 | 7/2002 | Kim et al. | |
| 2002/0113736 A1 | 8/2002 | Toutain et al. | |
| 2002/0122472 A1 | 9/2002 | Lay | |
| 2002/0131515 A1 | 9/2002 | Rodriguez | |
| 2002/0135513 A1 | 9/2002 | Paschen et al. | |
| 2002/0159540 A1 | 10/2002 | Chiodini | |
| 2003/0007473 A1 | 1/2003 | Strong et al. | |
| 2003/0138055 A1 | 7/2003 | Saito et al. | |
| 2003/0197612 A1 | 10/2003 | Tanaka et al. | |
| 2003/0234730 A1 | 12/2003 | Arms et al. | |
| 2004/0001460 A1 | 1/2004 | Bevan et al. | |
| 2004/0042539 A1 | 3/2004 | Vishakhadatta et al. | |
| 2004/0058749 A1 | 3/2004 | Pirritano et al. | |
| 2004/0104253 A1 | 3/2004 | Vishakhadatta et al. | |
| 2004/0061644 A1 | 4/2004 | Lier et al. | |
| 2004/0067764 A1 | 4/2004 | Pratt et al. | |
| 2004/0201539 A1 | 10/2004 | Yewen | |
| 2004/0263388 A1 | 12/2004 | Krumm et al. | |
| 2005/0018861 A1 | 1/2005 | Tashev | |
| 2005/0065861 A1 | 3/2005 | Bann | |
| 2005/0079871 A1 | 4/2005 | Kirk et al. | |
| 2005/0129139 A1 | 6/2005 | Jones et al. | |
| 2005/0141459 A1 | 6/2005 | Li et al. | |
| 2005/0159187 A1 | 7/2005 | Mendolia et al. | |
| 2005/0206555 A1 | 9/2005 | Bridgelall et al. | |
| 2005/0231367 A1 | 10/2005 | Bellantoni | |
| 2005/0237953 A1 | 10/2005 | Carrender et al. | |
| 2005/0248456 A1 | 11/2005 | Britton et al. | |
| 2005/0271165 A1 | 12/2005 | Geraniotis et al. | |
| 2005/0280508 A1 | 12/2005 | Mravca et al. | |
| 2006/0019679 A1 | 1/2006 | Rappaport et al. | |
| 2006/0022800 A1 | 2/2006 | Krishna et al. | |
| 2006/0033609 A1 | 2/2006 | Bridgelall | |
| 2006/0044147 A1* | 3/2006 | Knox | G01S 3/32 340/686.1 |
| 2006/0065731 A1 | 3/2006 | Powell et al. | |
| 2006/0094391 A1 | 5/2006 | Darabi | |
| 2006/0103576 A1 | 5/2006 | Mahmoud et al. | |
| 2006/0135211 A1 | 6/2006 | Chae et al. | |
| 2006/0170565 A1 | 8/2006 | Husak et al. | |
| 2006/0187051 A1 | 8/2006 | Wu et al. | |
| 2006/0208080 A1 | 9/2006 | Overhultz et al. | |
| 2006/0224318 A1 | 10/2006 | Wilson et al. | |
| 2006/0273905 A1 | 12/2006 | Choi et al. | |
| 2006/0279458 A1 | 12/2006 | Mohamadi | |
| 2006/0291544 A1 | 12/2006 | Fischer et al. | |
| 2006/0291592 A1 | 12/2006 | Perrins et al. | |
| 2007/0001813 A1 | 1/2007 | Maguire et al. | |
| 2007/0013582 A1 | 1/2007 | Kwon et al. | |
| 2007/0032241 A1 | 2/2007 | Busch et al. | |
| 2007/0046467 A1 | 3/2007 | Chakraborty et al. | |
| 2007/0101118 A1 | 5/2007 | Raghunath et al. | |
| 2007/0127595 A1 | 6/2007 | Simon et al. | |
| 2007/0149251 A1 | 6/2007 | Jeon | |
| 2007/0168127 A1* | 7/2007 | Zaruba | A61B 5/053 701/500 |
| 2007/0176824 A1 | 8/2007 | Stumbo et al. | |
| 2007/0187266 A1* | 8/2007 | Porter | A63F 1/02 206/232 |
| 2007/0219720 A1 | 9/2007 | Trepagnier et al. | |
| 2007/0257795 A1 | 11/2007 | Overhultz | |
| 2007/0265799 A1 | 11/2007 | Yamada et al. | |
| 2007/0265866 A1 | 11/2007 | Fehling et al. | |
| 2008/0001735 A1* | 1/2008 | Tran | G06F 19/3418 340/539.22 |
| 2008/0012710 A1 | 1/2008 | Sadr | |
| 2008/0030422 A1 | 2/2008 | Gevargiz et al. | |
| 2008/0042847 A1 | 2/2008 | Hollister et al. | |
| 2008/0061984 A1 | 3/2008 | Breed et al. | |
| 2008/0068265 A1 | 3/2008 | Kalliola et al. | |
| 2008/0143584 A1 | 6/2008 | Shoarinejad et al. | |
| 2008/0186231 A1 | 8/2008 | Aljadeff et al. | |
| 2008/0197982 A1 | 8/2008 | Sadr | |
| 2008/0242240 A1 | 10/2008 | Rofougaran et al. | |
| 2008/0258876 A1 | 10/2008 | Overhultz et al. | |
| 2008/0318632 A1 | 12/2008 | Rofougaran et al. | |
| 2009/0135800 A1 | 5/2009 | McPherson | |
| 2009/0146792 A1 | 6/2009 | Sadr et al. | |
| 2009/0146832 A1 | 6/2009 | Ebert et al. | |
| 2009/0207947 A1 | 8/2009 | Strodtbeck et al. | |
| 2010/0039228 A1 | 2/2010 | Sadr et al. | |
| 2010/0069011 A1 | 3/2010 | Carrick et al. | |
| 2010/0127875 A1 | 5/2010 | Wong | |
| 2010/0141385 A1 | 6/2010 | Shiau et al. | |
| 2010/0164805 A1 | 7/2010 | Niu et al. | |
| 2010/0310019 A1 | 12/2010 | Sadr | |
| 2011/0090059 A1 | 4/2011 | Sadr | |
| 2011/0153208 A1 | 6/2011 | Kruglick | |
| 2011/0181422 A1 | 7/2011 | Tran et al. | |
| 2011/0187600 A1* | 8/2011 | Landt | G01S 3/02 342/458 |
| 2011/0205358 A1* | 8/2011 | Aota | G01S 19/23 348/143 |
| 2011/0254664 A1 | 10/2011 | Sadr et al. | |
| 2012/0086606 A1* | 4/2012 | Mathews | G01C 21/165 342/461 |
| 2012/0121161 A1 | 5/2012 | Eade et al. | |
| 2012/0139704 A1 | 6/2012 | Sadr et al. | |
| 2012/0275546 A1 | 11/2012 | Divsalar | |
| 2013/0141220 A1 | 6/2013 | Sadr | |
| 2013/0147608 A1 | 6/2013 | Sadr | |
| 2013/0202062 A1 | 8/2013 | Sadr et al. | |
| 2014/0197926 A1* | 7/2014 | Nikitin | G06K 7/10009 340/10.1 |
| 2014/0203914 A1 | 7/2014 | Sadr et al. | |
| 2014/0218172 A1 | 8/2014 | Sadr | |
| 2014/0292492 A1 | 10/2014 | Sadr | |
| 2014/0292494 A1 | 10/2014 | Sadr et al. | |
| 2015/0169909 A1 | 6/2015 | Sadr | |
| 2015/0215073 A1 | 7/2015 | Sadr et al. | |
| 2015/0326298 A1 | 11/2015 | Sadr et al. | |
| 2015/0371067 A1 | 12/2015 | Sadr | |
| 2016/0161590 A1 | 6/2016 | Sadr et al. | |
| 2016/0191206 A1 | 6/2016 | Sadr et al. | |
| 2016/0316325 A1 | 10/2016 | Sadr et al. | |
| 2017/0177911 A1 | 6/2017 | Sadr | |
| 2017/0308728 A1 | 10/2017 | Sadr et al. | |
| 2017/0353334 A1 | 12/2017 | Divsalar et al. | |
| 2017/0364715 A1 | 12/2017 | Sadr | |
| 2017/0366878 A1 | 12/2017 | Sadr et al. | |
| 2018/0338217 A1 | 11/2018 | Sadr | |
| 2019/0069054 A1 | 2/2019 | Sadr et al. | |

FOREIGN PATENT DOCUMENTS

| | | |
|---|---|---|
| CN | 102884562 A | 1/2013 |
| CN | 102884562 B | 10/2015 |
| EP | 1313249 A2 | 5/2003 |
| EP | 1362320 A2 | 11/2003 |
| EP | 2283474 A2 | 2/2011 |
| EP | 2559014 A1 | 2/2013 |
| EP | 2283474 B1 | 12/2016 |
| EP | 3232414 A1 | 10/2017 |
| JP | 05142341 A | 6/1993 |
| JP | 1999066250 A | 3/1999 |
| JP | 2000501515 A | 2/2000 |
| JP | 2001148652 A | 5/2001 |
| JP | 2002098747 A | 4/2002 |
| JP | 2004005511 A | 1/2004 |
| JP | 2004094752 A | 3/2004 |
| JP | 2004507714 A | 3/2004 |
| JP | 2004508754 A | 3/2004 |
| JP | 2004194150 A | 7/2004 |
| JP | 2004326595 A | 11/2004 |
| JP | 2005136570 A | 5/2005 |
| JP | 2005278139 A | 10/2005 |

(56) References Cited

FOREIGN PATENT DOCUMENTS

| | | |
|---|---|---|
| JP | 2005339507 A | 12/2005 |
| JP | 2006041929 A | 2/2006 |
| JP | 2006284557 A | 10/2006 |
| JP | 2006293634 A | 10/2006 |
| JP | 2006295414 A | 10/2006 |
| JP | 2006318078 A | 11/2006 |
| JP | 2006318396 A | 11/2006 |
| JP | 2006324880 A | 11/2006 |
| JP | 2007121014 A | 5/2007 |
| JP | 2007298441 A | 11/2007 |
| JP | 2007327839 A | 12/2007 |
| JP | 2008017307 A | 1/2008 |
| JP | 2008503759 A | 2/2008 |
| JP | 2008050101 A | 3/2008 |
| JP | 2009018944 A | 1/2009 |
| JP | 2009076048 A | 4/2009 |
| JP | 2009514461 A | 4/2009 |
| JP | 2009192381 A | 8/2009 |
| JP | 2011520097 A | 7/2011 |
| JP | 2013533835 A | 8/2013 |
| JP | 6150455 | 6/2017 |
| JP | 6154318 B2 | 6/2017 |
| JP | 2017105633 A | 6/2017 |
| JP | 2018133115 A | 8/2018 |
| KR | 20130137071 A | 12/2013 |
| KR | 10-1763221 B1 | 7/2017 |
| WO | 1994029990 A1 | 12/1994 |
| WO | 02065380 A2 | 8/2002 |
| WO | 2002082395 A1 | 10/2002 |
| WO | 2005101652 A1 | 10/2005 |
| WO | 2006011208 A1 | 2/2006 |
| WO | 2006026518 A2 | 3/2006 |
| WO | 2006039119 A1 | 4/2006 |
| WO | 2006075367 A1 | 7/2006 |
| WO | 2006099148 A1 | 9/2006 |
| WO | 2009151778 A2 | 12/2009 |
| WO | 2011130582 A1 | 10/2011 |
| WO | 2014151943 A1 | 9/2014 |

OTHER PUBLICATIONS

Extended European Search Report for EP Application No. 09763070.1, Completed May 18, 2012, dated May 30, 2012, 10 pgs.

Extended European Search Report for European Application EP08732774.8, Report Completed Jul. 15, 2015, dated Jul. 23, 2015, 5 pgs.

Extended European Search Report for European Application EP15164416.8, Report Completed Aug. 21, 2015, dated Aug. 31, 2015, 5 pgs.

Extended European Search Report for European Application No. 11769632.8, Search completed Sep. 27, 2016, dated Oct. 6, 2016, 10 pgs.

Extended European Search Report for European Application No. 14767719.9, completed Sep. 12, 2016, dated Sep. 19, 2016, 8 pgs.

Extended European Search Report for European Application No. 16002642.3, Search completed Sep. 8, 2017, dated Sep. 18, 2017, 8 pgs.

International Preliminary Report on Patentability for International Application PCT/US14/26707, Report Issued Sep. 15, 2015, dated Sep. 24, 2015, 5 pgs.

International Preliminary Report on Patentability for International Application No. PCT/US2011/032593, Report Issued Oct. 16, 2012, Report dated Oct. 26, 2012, 9 pgs.

International Preliminary Report on Patentability for International Application PCT/US2007/072423, Completed Jan. 13, 2009, 13 pgs.

International Preliminary Report on Patentability for International Application PCT/US2009/040584, completed Nov. 5, 2009, dated Apr. 25, 2011, 8 pgs.

International Search Report and Written Opinion for International Application No. PCT/US2006/060339, filed Oct. 27, 2006, search completed Jul. 7, 2008, dated Jul. 21, 2008, 5 pgs.

International Search Report and Written Opinion for International Application No. PCT/US2011/032593, Report Completed Jun. 30, 2011, Report dated Jul. 7, 2011, 10 pgs.

International Search Report for International Application No. PCT/US2009/040584, date completed Jan. 7, 2010, dated Jan. 26, 2010, 4 pgs.

International Search Report for International Application PCT/US08/58061, Report completed Jun. 9, 2008, Report dated Jun. 30, 2008, 1 page.

Mudumbai, R. et al., "Scalable Feedback Control for Distributed Beamforming in Sensor Networks," Proc. 2005 IEEE International Symposium on Information Theory (ISIT 2005), Sep. 2005, 5 pgs.

Supplementary European Search Report for Application No. EP 06850079, International Filing Date Oct. 27, 2006, Search Completed Dec. 12, 2013, 7 pgs.

Widrow, Bernard et al., "A Comparison of Adaptive Algorithms Based on the Methods of Steepest Descent and Random Search," IEEE Transactions on Antennas and Propagation, vol. 24, No. 5, Sep. 1976, pp. 615-637.

Written Opinion for International Application No. PCT/2006/060339, filed Oct. 27, 2006, Opinion completed Jul. 17, 2008, dated Jul. 21, 2008, 4 pgs.

Written Opinion of the International Searching Authority for International Application No. PCT/US2009/040584, date completed Jan. 7, 2010, dated Jan. 26, 2010, 5 pgs.

Written Opinion of the International Searching Authority for International Application PCT/US08/58061, Opinion completed Jun. 9, 2008, Opinion dated Jun. 30, 2008, 6 pgs.

International Search Report and Written Opinion for International Application PCT/US2014/026707, International Filing Date Mar. 13, 2014, Report Completed Jun. 28, 2014, dated Aug. 1, 2014, Aug. 1, 2014, 6 pgs.

Extended European Search Report for European Application EP07840315.1, dated Aug 28, 2014, report completed Aug 22, 2014, Aug. 29, 2014, 5 pgs.

"Simultaneous Localization and Mapping (SLAM)", Retrieved from https://www.usna.edu/Users/cs/taylor/courses/si475/class/slam.pdf on Nov. 10, 2014, 3 pgs.

Beevers, Kristopher R. "Fixed-lag Sampling Strategies for Particle Filtering SLAM", 2007 IEEE International Conference on Robotics and Automation, Apr. 10-14, 2007, 6 pgs.

Chevillat et al., "Decoding of Trellis-Encoded Signals in the Presence of Intersymbol Interference and Noise", IEEE Transactions on Communications, Jul. 1989, vol. 37, No. 7, pp. 669-676.

Divsalar et al., "Multiple-Symbol Differential Detection of MPSK", IEEE Transactions on Communications, Mar. 1990, vol. 38, No. 3, pp. 300-308.

Eade, Ethan et al. "Monocular Graph SLAM with Complexity Reduction", 2010 IEEE/RSJ International Conference on Intelligent Robots and Systems Oct. 18-22, 2010, Taipei, Taiwan, pp. 3017-3024.

EPCGlobal, EPC standard, Published Jan. 26, 2005, 94 pgs (presented in three parts).

Forney, Jr., "Maximum-Likelihood Sequence Estimation of Digital Sequences in the Presence of Intersymbol Interference", IEEE Transactions on Information Theory, May 1972, vol. IT-18, No. 3, pp. 363-378.

Howard, Andrew "Multi-robot Simultaneous Localization and Mapping using Particle Filters", International Journal of Robotics Research, vol. 25 Issue 12, Dec. 2006, 8 pgs.

Huang, Joseph et al. "Efficient, Generalized Indoor WiFi GraphSLAM", IEEE International Conference on Robotics and Automation, Sep. 13, 2010, 6 pgs.

Kamel et al., "A smoothing Rao-Blackwellized particle filter for tracking a highly-maneuverable target", 2005 IEEE International Radar Conference, May 9-12, 2005, 4 pgs.

Kerpez, "Viterbi Receivers in the Presence of Severe Intersymbol Interference", Global Telecommunications Conference, 1990, and Exhibition. 'Communications: Connecting the Future', Globecom '90., IEEE, vol. 3, Dec. 2-5, 1990, pp. 2009-2013.

Makrakis et al., "Optimal Noncoherent Detection of PSK Signals", IEEE Electronics Letter, Mar. 15, 1990, vol. 26, No. 6, pp. 398-400.

(56) References Cited

OTHER PUBLICATIONS

Montemerlo et al., Michael "FastSLAM: A Factored Solution to the Simultaneous Localization and Mapping Problem", In Proceedings of the AAAI National Conference on Artificial Intelligence, 2002, 6 pgs.

Sadr et al., "Generalized Minimum Shift-Keying Modulation Techniques", IEEE Transactions on Communications, Jan. 1988, vol. 36, No. 1, pp. 32-40.

Slivka, Eric "Apple Appears to Have Acquired GPS Firm Coherent Navigation [Confirmed]", May 17, 2015, retrieved from http://www.macrumors.com/2015/05/17/apple-coherent-navigation-acquisition/ on May 18, 2015, 16 pgs.

Taniguchi et al., "Indoor Positioning via TDOA measurements Using Particle Filter", IEICE Technical Report, vol. 105, No. 623, 8 pgs.

Thrun et al., Sebastian "Multi-Robot SLAM with Sparse Extended Information Filters", Department of Computer Science, Stanford University, Stanford, CA, Department of Physics, Carnegie Mellon University, Pittsburgh, PA, Jul. 29, 2014, 12 pgs.

\* cited by examiner

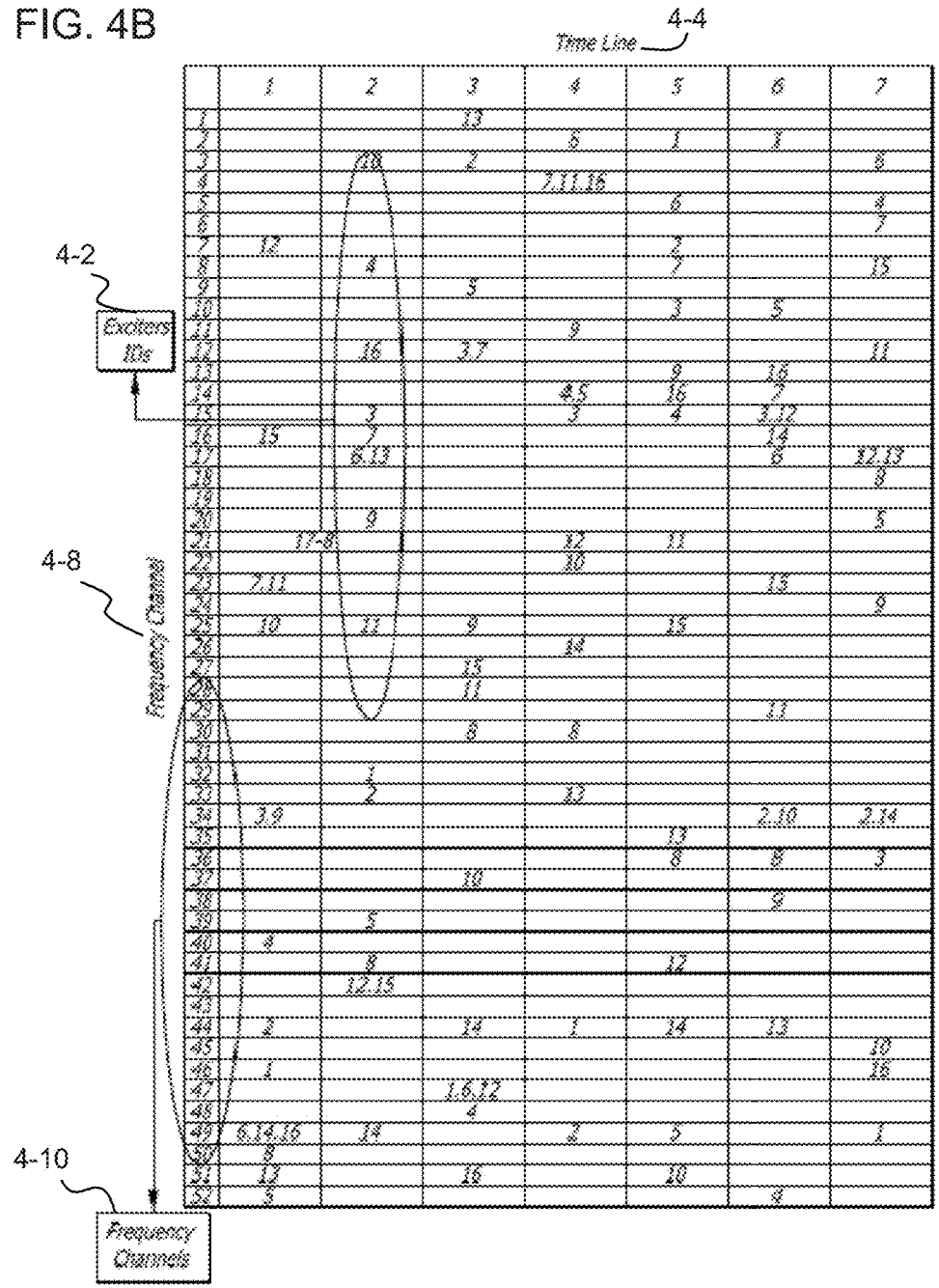

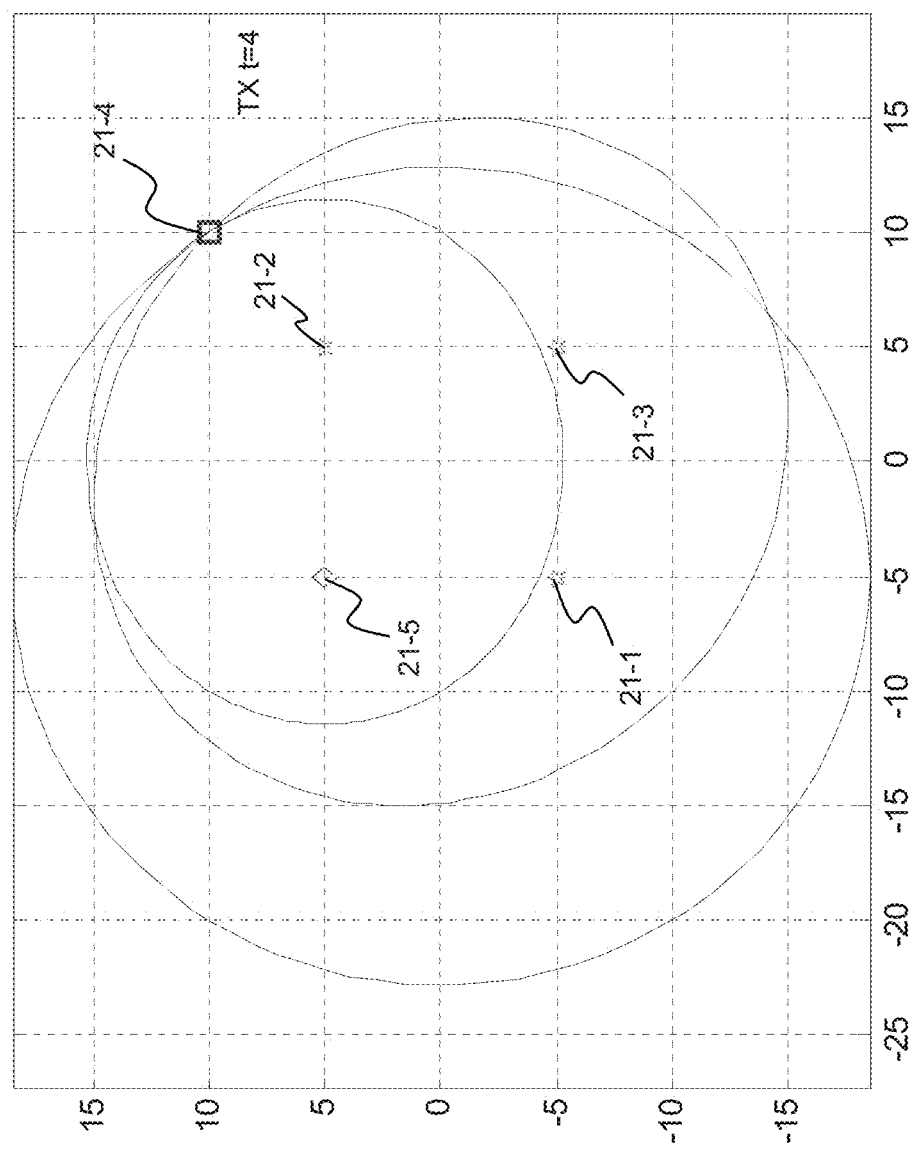

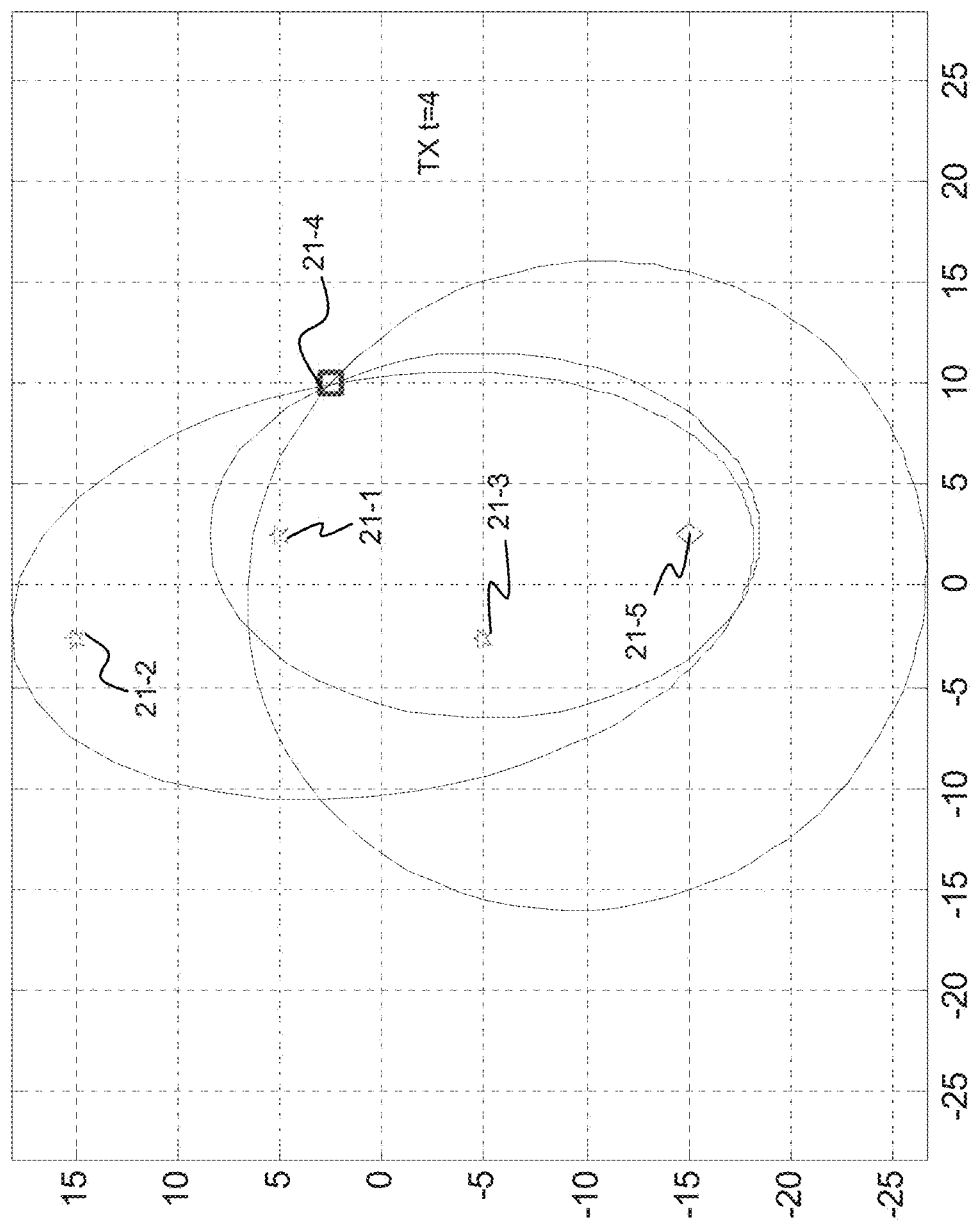

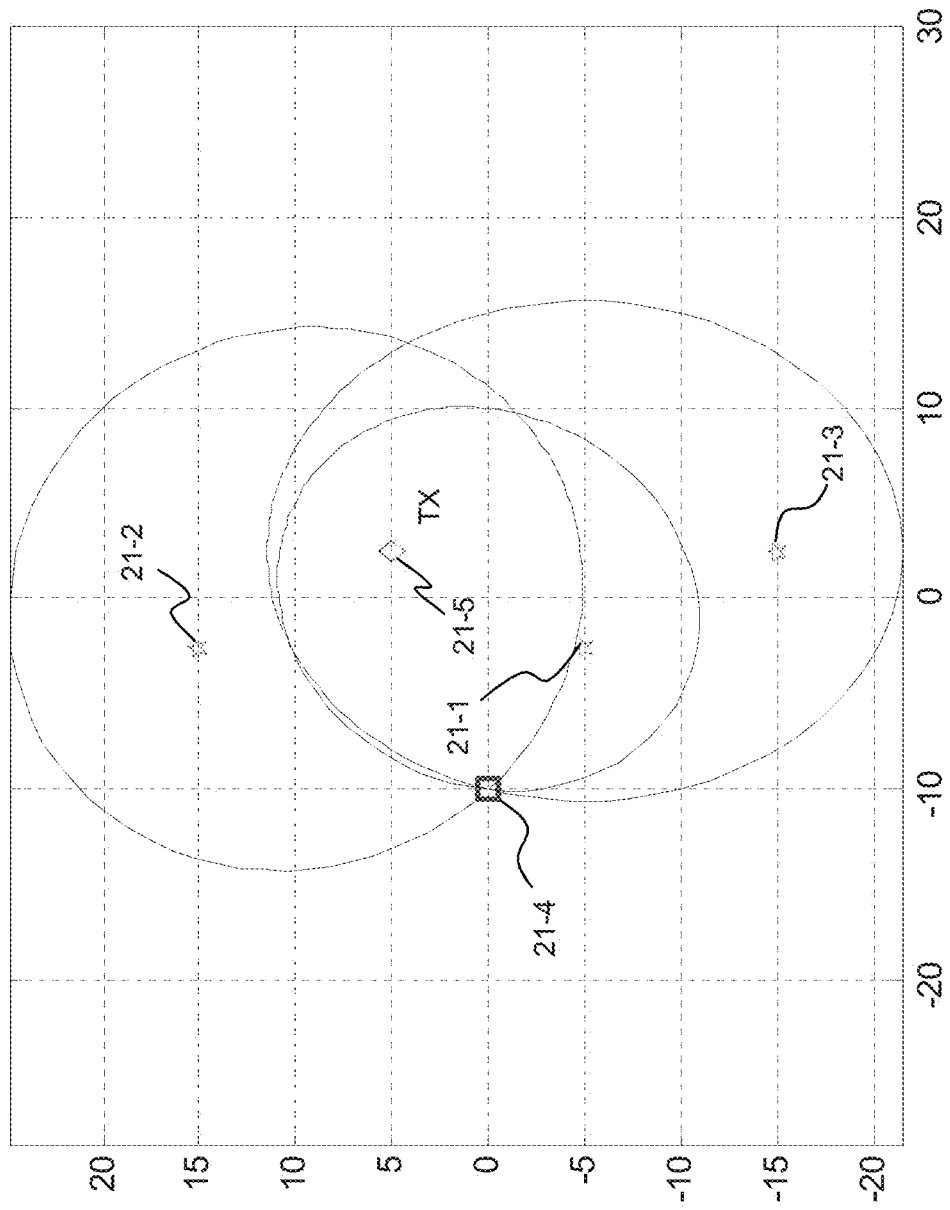

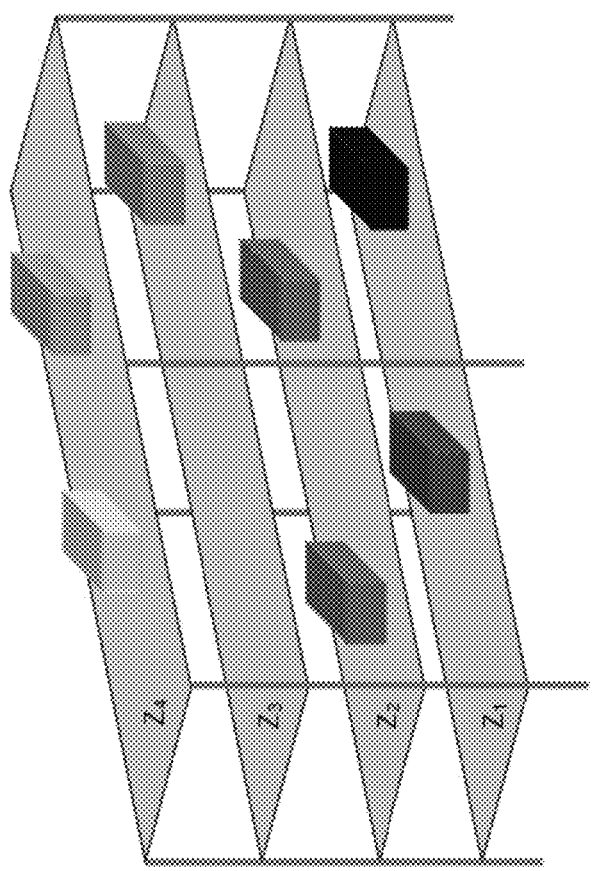
FIG. 27
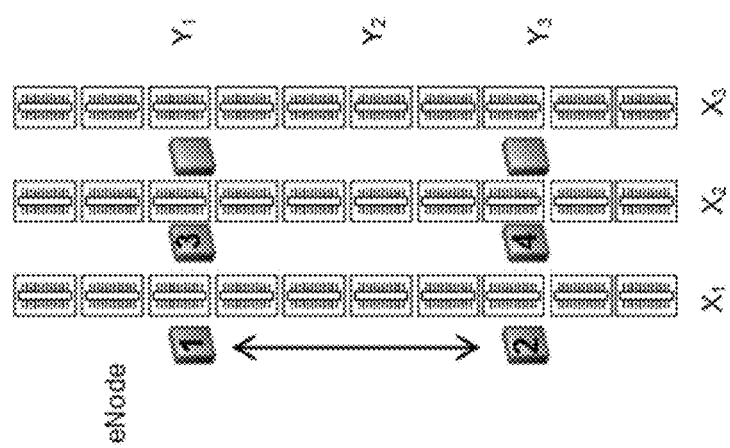

RADIO FREQUENCY IDENTIFICATION TAG LOCATION ESTIMATION AND TRACKING SYSTEM AND METHOD

CROSS REFERENCE TO RELATED APPLICATIONS

This application is a continuation of U.S. application Ser. No. 15/042,068, filed Feb. 11, 2016, which application is a continuation of U.S. application Ser. No. 14/136,653, filed Dec. 20, 2013, which application is a continuation of U.S. application Ser. No. 13/309,329, filed Dec. 1, 2011, which application is a continuation of U.S. application Ser. No. 12/423,796 filed Apr. 14, 2009, which application claims the benefit of U.S. Provisional Patent Application No. 61/124,294, filed Apr. 14, 2008 and U.S. Provisional Patent Application No. 61/044,904, filed Apr. 14, 2008, the disclosures of which are hereby incorporated by reference as if set forth in full herein.

BACKGROUND

This application relates to estimating location and tracking of passive or active sensors and in particular is related to using phased array antenna systems and Radio Frequency Identification (RFID) system to locate sensors and/or RFID tags.

An RFID system conventionally includes a set of stationary or mobile RFID tags typically manipulated by a reader/interrogator system. Each sensor may be passive or active, i.e., with or without a battery. In conventional systems, the reader and the RFID tags are generally required to be in close proximity so that the tags can operate in close proximity to the reader antenna.

The limited transmission distances available with conventional RFID systems limit their use in an automated factory setting and/or in an indoor wireless environment. Even within the designed range of operation, such systems often have low reliability due to interferences and collisions.

Typical RFID systems also are not designed to cover extremely large areas as multiple base stations are needed to provide sufficient coverage for the area. This can be extremely expensive and thus cost prohibitive. Also, sacrifices are made to compensate for the large area by limiting the coverage area to select high use regions, e.g., at dock doors. Additionally, such systems often do not provide precise location determinations of the RFID due to the complexity in the size and space of the environment. Accordingly, there is a need for a RFID system that overcomes the above-noted obstacles and the shorting comings in the art.

SUMMARY

In one aspect, the location of RFID tags/sensors is determined using both single and multiple read points.

In one embodiment, a method of locating one or more radio frequency identification (RFID) tags comprises illuminating at least one RFID tag by an exciter; receiving information signals from the illuminated at least one RFID tag by a plurality of receive antennas; determining a phase derivate for the received information signals from the at least one illuminated RFID tag received by each of the plurality of receive antennas; and identifying a location of the at least one RFID tag based on the determined phase derivates of the received information signals. Also, in one embodiment, the method further includes identifying the location of the at least one RFID based on a ratio of the phase derivate versus the frequency derivate.

In another embodiment, a radio frequency identification (RFID) system for locating one or more RFIDs comprises at least one exciter and a reader. The at least one exciter has a plurality of antennas and is configured to selectively transmit interrogation signals through at least two of the plurality of antennas and to selectively receive information signals from at least one RFID tag through one of the plurality of antennas different from the at least two of the plurality of antennas. The reader is in communication with the at least one exciter and is configured to activate the at least one exciter. The reader locates the at least one RFID tag based on a phase derivate of the received information signals.

In yet another embodiment, a radio frequency identification (RFID) system for locating one or more RFIDs comprises at least one RFID tag, an antenna array, a transmitter and a reader. The antenna array is configured to illuminate the at least one RFID tag. The transmitter is coupled to the antenna array and is configured to activate the antenna array to repeatedly illuminate the at least one RFID tag within a specific time frame and a specific space. The reader is in communication with the transmitter and is configured to generate a probability model based on information signals received from the repeated illumination of the at least one RFID tag and the reader applies a particle filter on the generated probability model to determine a location of the at least one RFID tag based on a result of the applied particle filter.

In a further embodiment, a method of locating one or more radio frequency identification (RFID) tags comprises positioning at least one receiver and at least one transmitter to share a geometric characteristic with each other; determining location measurements based on received information signals from at least one RFID tag illuminated by the at least one transmitter; and estimating a location of the at least one RFID tag utilizing a probability model and the determined location measurements.

For a more complete understanding of the disclosed method and system, reference is now made to the following description taken in conjunction with the accompanying drawings.

BRIEF DESCRIPTION OF THE DRAWINGS

FIGS. 4A-B illustrate an exciter layout and an exemplary frequency plan in accordance with various aspects of the present invention.

FIG. 13A-D is a graphical representation illustrating a four port excitation node in a chandelier configuration in accordance with various embodiments of the invention.

FIG. 14A-D is a graphical representation illustrating a four port excitation node in an offset linear array configuration in accordance with various embodiments of the invention.

FIG. 15A-F is a graphical representation illustrating a four port excitation node in an offset linear array configuration relative to six different RFID tag locations in accordance with various embodiments of the invention.

FIG. 27 is a conceptual illustration showing application of autonomous perpetual inventory to items stored on vertically racked shelves.

DETAILED DESCRIPTION

Figure 1:
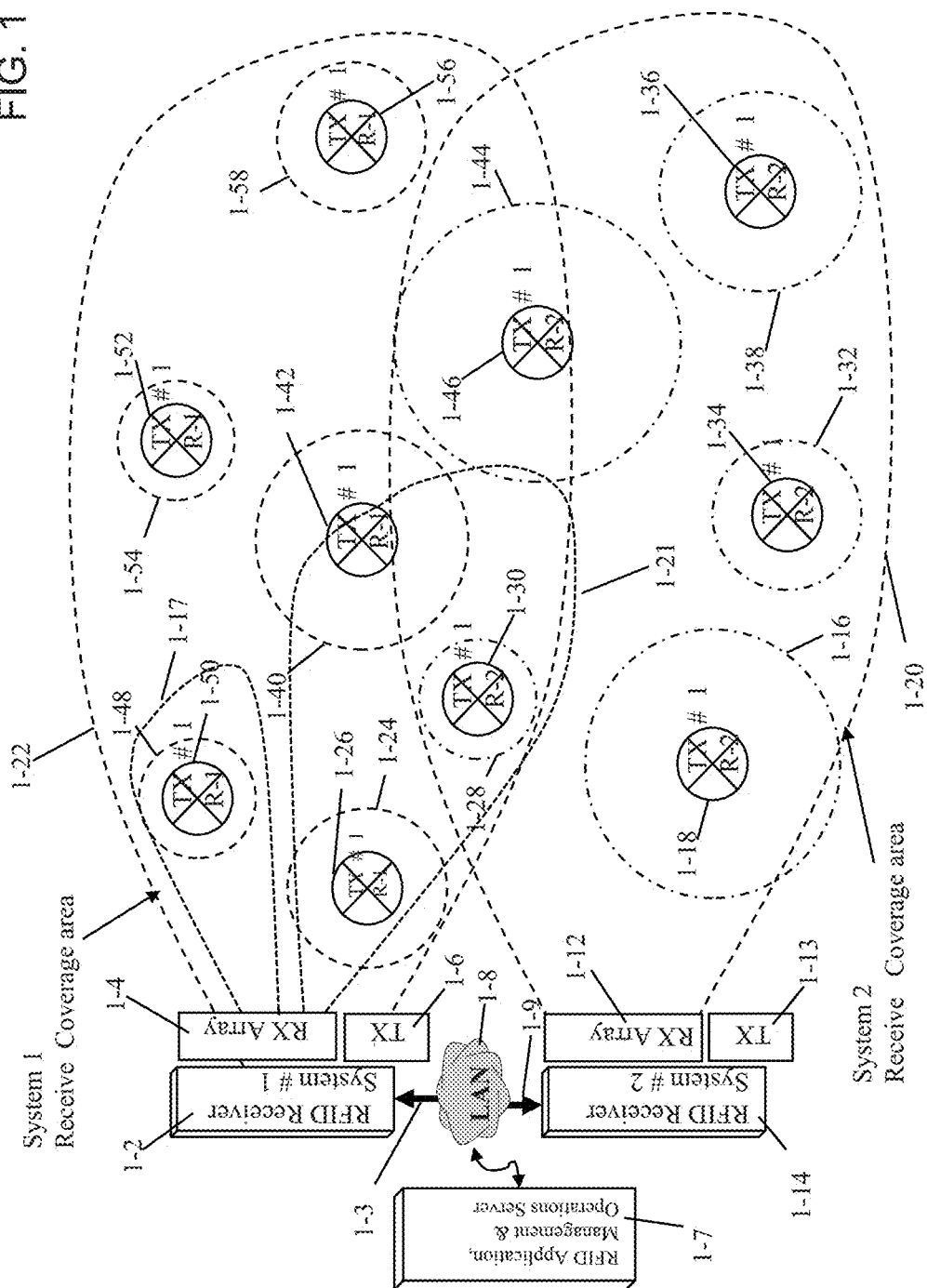
FIG. 1 is a schematic diagram of a distributed exciter architecture showing TX and receive coverage areas for two readers as well as exciter interrogation spaces in accordance with various aspects of the present invention.

Referring now to the drawings, systems and methods for locating one or more radio frequency identification (RFID) tags are described. The systems utilize various transmitter and receiver geometries to obtain observations relevant to the location of RFID tags. The observations can be provided to any of a variety of estimators that can generate estimates for the location of the observed RFID tags.

The transmitter and receiver geometry of an RFID system influences the accuracy with which the system can estimate the location of RFID tags. Various architectures in accordance with embodiments of the invention are discussed. In a number of embodiments, one or more exciters transmit interrogation signals to illuminate the RFID tags and the reflected signals are received by a plurality of receivers. The receivers can be separate receivers and/or can be separate receiver antennas connected to a single receiver system or a multiple port exciter system. In several embodiments, a multiple port exciter system acts as both the exciter and the receiver. One of the antennas is selectively configured to transmit interrogation signals and the remaining antennas are configured to receive signals backscattered by RFID tags. In a number of embodiments, the multiport exciters do not possess the ability to read data from RFID tags and simply possess the ability to make observations useful in locating the RFID tags.

Due to instability in the RFID backscatter process, the observables that are chosen when performing location estimation can influence the accuracy of the resulting estimates. In various embodiments, the system observes the phase difference of backscattered signals from illuminated RFID tags. In several embodiments, the phase differences are observed at different transmit frequencies to provide range information. The ratio of phase difference to frequency difference is also referred to as group delay. In many embodiments, the system observes the read rate of RFID tags in response to illumination of different interrogation spaces by various exciters. The read rate is the number of times that a tag is read as a ratio of the number of opportunities that the tag had to be read. In systems that utilize extremely sensitive receivers, read rate can be considered indicative of the distance from the RFID tag to the exciter. In such systems, the overwhelming majority of tags that are activated by an exciter are read. Therefore, read rate is largely indicative of the rate of activation of the RFID tag by the transmitter.

As is discussed further below, a variety of techniques can be used to estimate location based upon one or more observables in accordance with aspects of the invention. Given the complexity of the system and the numerous RFID tags potentially in a given space, statistical modeling of the RFID tag locations can provide accurate location estimates for each RFID tag within the space. As such, in various embodiments, by using many observations of the RFID tags, a probability distribution model is created. Using one or more algorithms and/or filters, the model is further refined to determine the location to the RFID tag. In several embodiments, a particle filter is utilized to create and refine the probability distribution model. In other embodiments, a variety of other techniques can be used to refine the location estimates obtained using the observables.

System Architectures

The ability to locate RFID tags within a given space is largely dependent upon the location of the antennas used to transmit interrogation signals to the RFID tags and the antennas used to receive signals backscattered by the RFID tags. A variety of geometries can be used in accordance with embodiments of the invention including geometries in which the transmit and receive functions are decoupled and can be performed by separate exciters and receivers.

Figure 2:
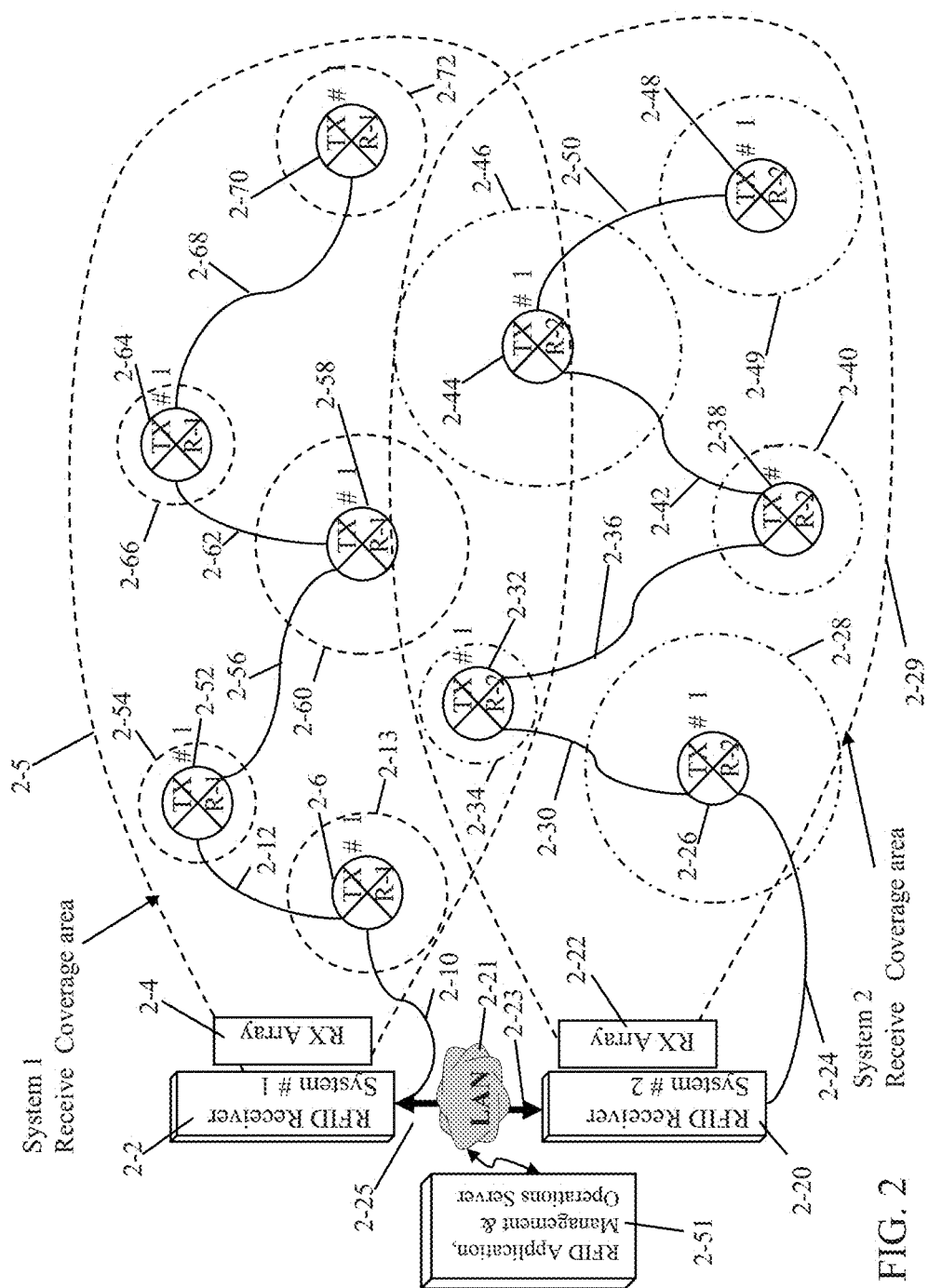
FIG. 2 is a schematic diagram of a distributed exciter architecture showing TX and receive coverage areas for two readers as well as exciter interrogation spaces in accordance with various aspects of the present invention.

In a co-pending U.S. patent application Ser. No. 12/054,331, filed Mar. 23, 2007, entitled "RFID Systems Using Distributed Exciter Network", the disclosure of which incorporated by reference as if set forth in full herein, enhancement in the performance and capacity for RFID systems is achieved by separating the receive and transmit systems to manipulate the passive RFID tags. This functionality is realized by decomposing the population of RFID tags/sensors into a set of interrogation spaces (1-16, 1-32, 1-38, 1-44, 1-40, 1-28, 1-24, 1-48, 1-54, 1-56) where an exciter is placed for each target interrogation space (1-18, 1-34, 1-36, 1-46, 1-42, 1-30, 1-26, 1-58, 1-52, 1-50) as shown in FIGS. 1-2.

The size of each interrogation space can be adjusted by controlling the total emitted power from the exciter. However, it should be appreciated that emitted power of an RFID system is typically restricted by regulation and limits the interrogation range of an exciter, e.g., 20 to 30 feet. Emitter power control is implemented through the RFID reader's (1-2) exciter power management and gain controller subsystem (3-18, 3-30). In addition to adjusting the size of each interrogation space, the overall performance of the system may be further improved by selecting each exciter transmit antenna type to provide a desired level of directivity, thereby controlling the beam-width for the target interrogation space.

In a number of embodiments, the reader includes phased-array antenna that is capable of performing beam forming. The reader receive phased-array antenna beam (1-4) can be formed to focus (1-17, 1-21) to specified interrogation spaces or as a wide beam (1-20). The network of transmit antennas, also referred to as distributed exciters may be commanded by wired (2-24, 2-30, 2-36, 2-12, 2-56) or wireless links. The transmitted "backhaul signal" from the controller to the exciter embeds all the necessary signal characteristics and parameters to generate the desired waveform output from the exciter module to the tag. FIGS. 1 and 2 also show the RFID application management and operations server (1-7, 2-51), which is connected to the reader via the local area network (1-11, 2-50).

Figure 3:
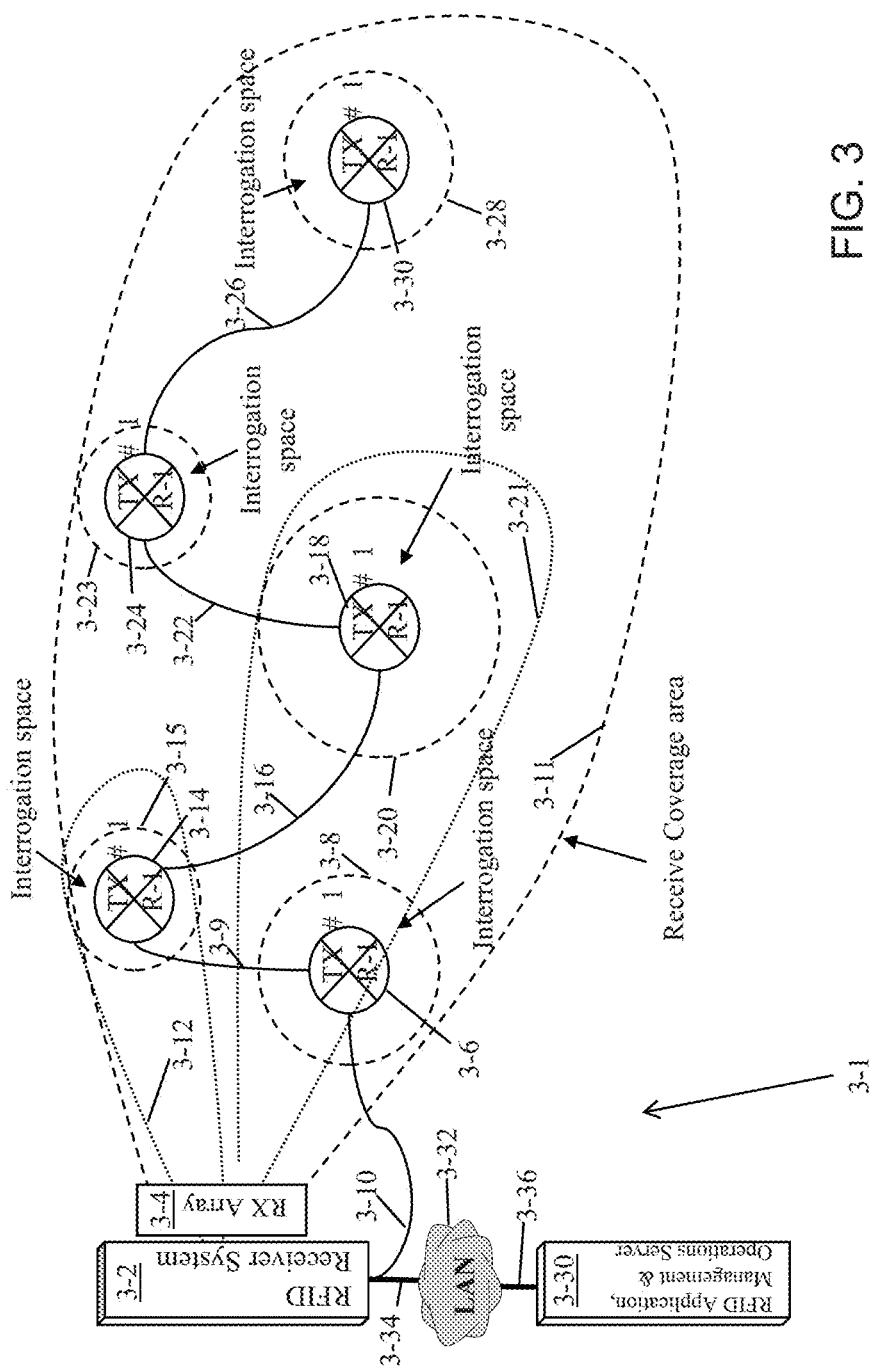
FIG. 3 is a distributed exciter architecture cabled (single) system showing TX and receive coverage areas for the reader as well as exciter interrogation spaces in accordance with various aspects of the present invention.

FIG. 3 illustrates the layout of a distributed exciter/transmitter RFID systems, showing the receive system (3-2), receive antenna array (3-4), and distributed exciters (3-6, 3-14, 3-18, 3-24 & 3-30), which in one aspect are connected to the system via coaxial cables (3-10, 3-9, 3-16, 3-22, & 3-26). The interrogation space and transmitted power of each exciter is managed and controlled by the central unit (3-2). In FIG. 3, exciter interrogation spaces (3-8, 3-15, 3-20, 3-23, & 3-28) with different sizes are depicted. The complete receive array coverage area (3-11) is also shown. Each interrogation space (3-8, 3-14, 3-20, 3-22, 3-28) can be operated sequentially or concurrently, depending on the number of possible beams the receiving array supports.

Figure 4A:
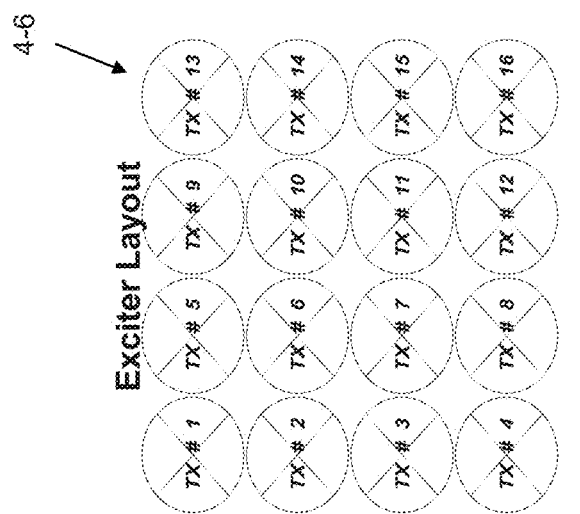
Figure 14A:
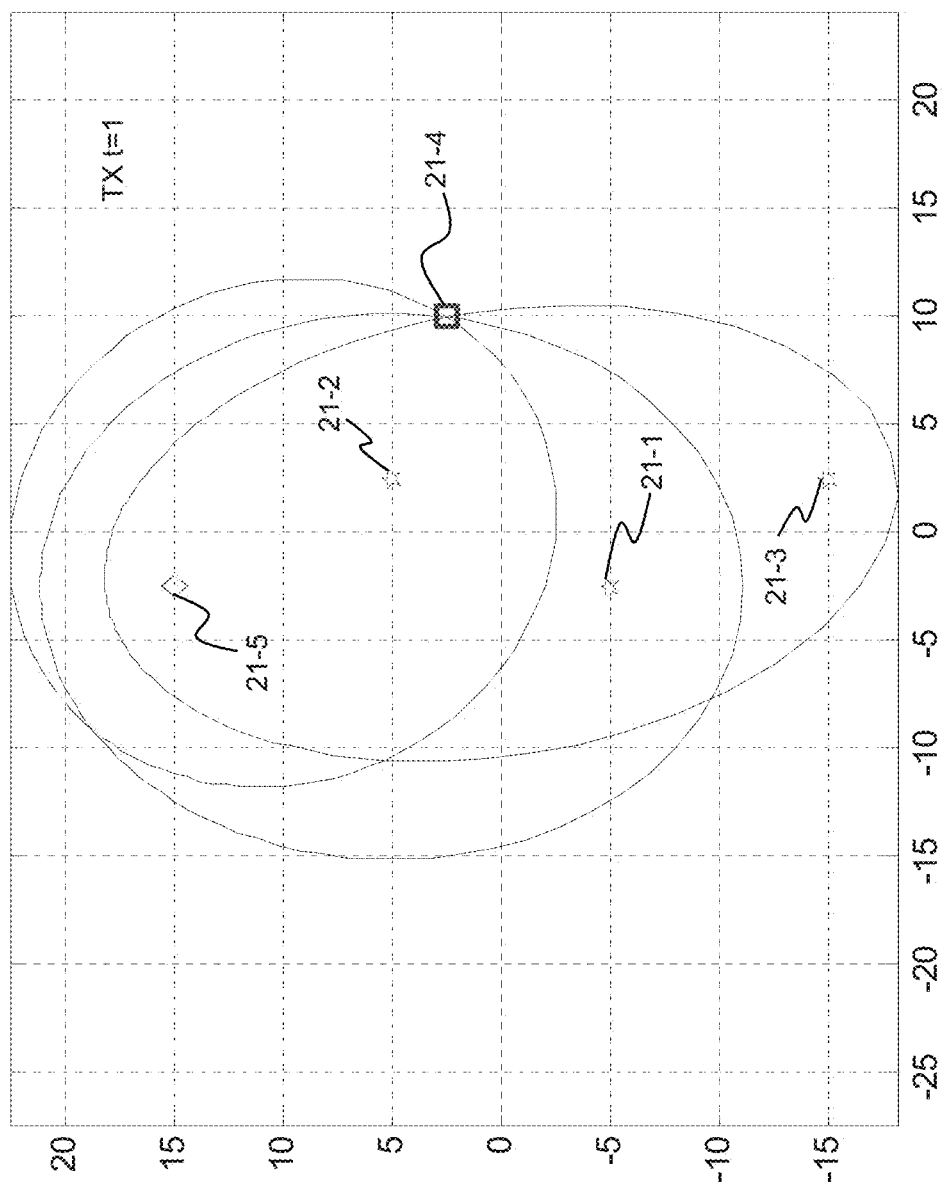
Figure 14B:
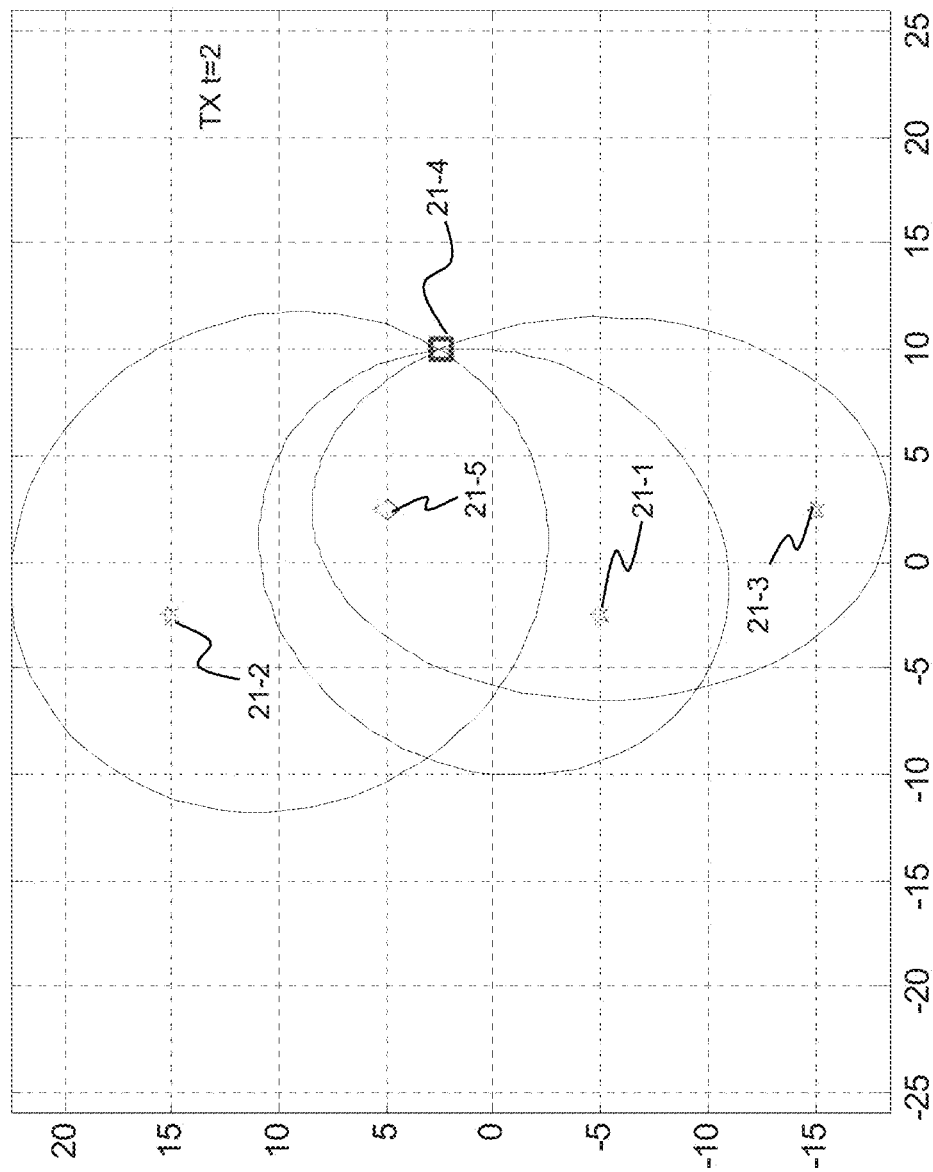
Figure 14C:
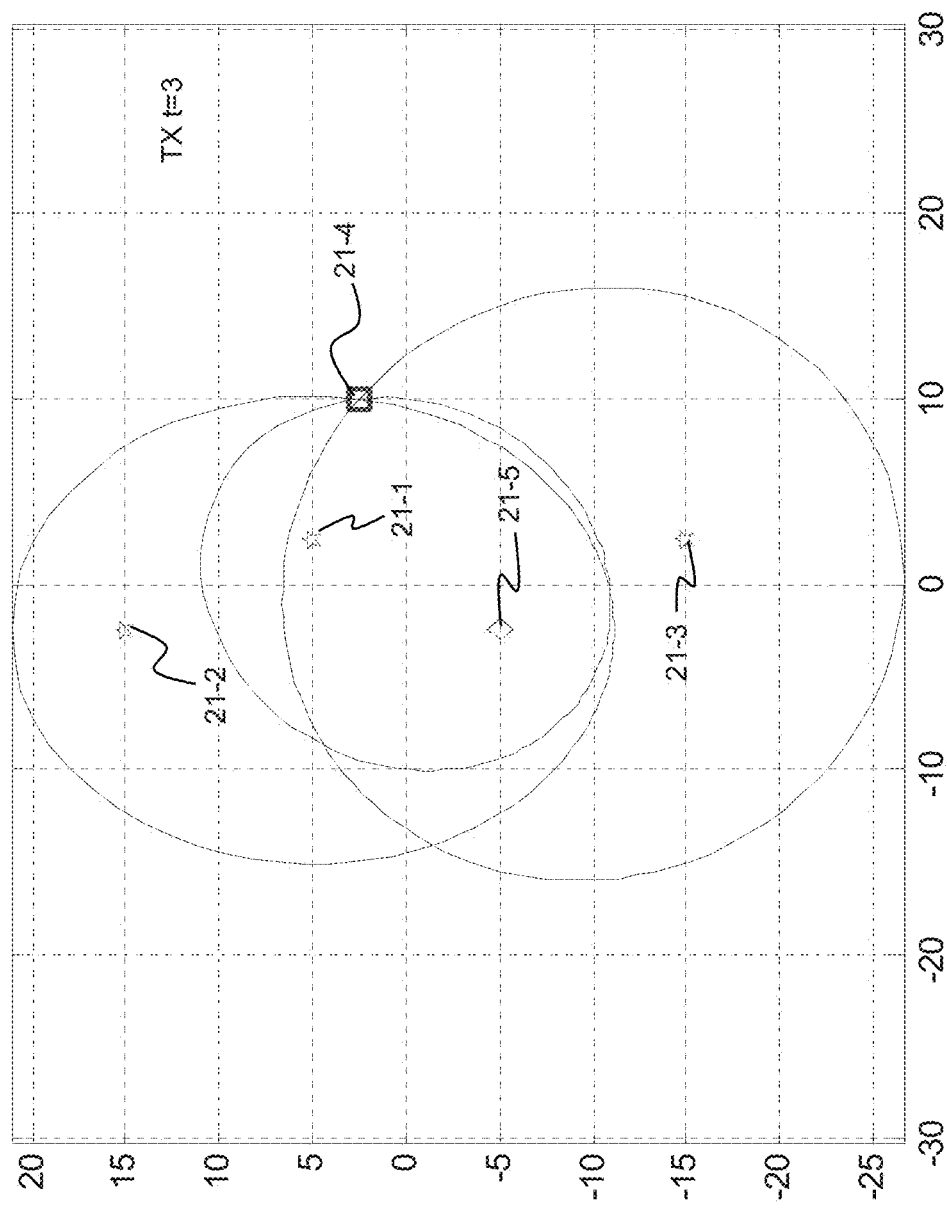
Figure 15A:
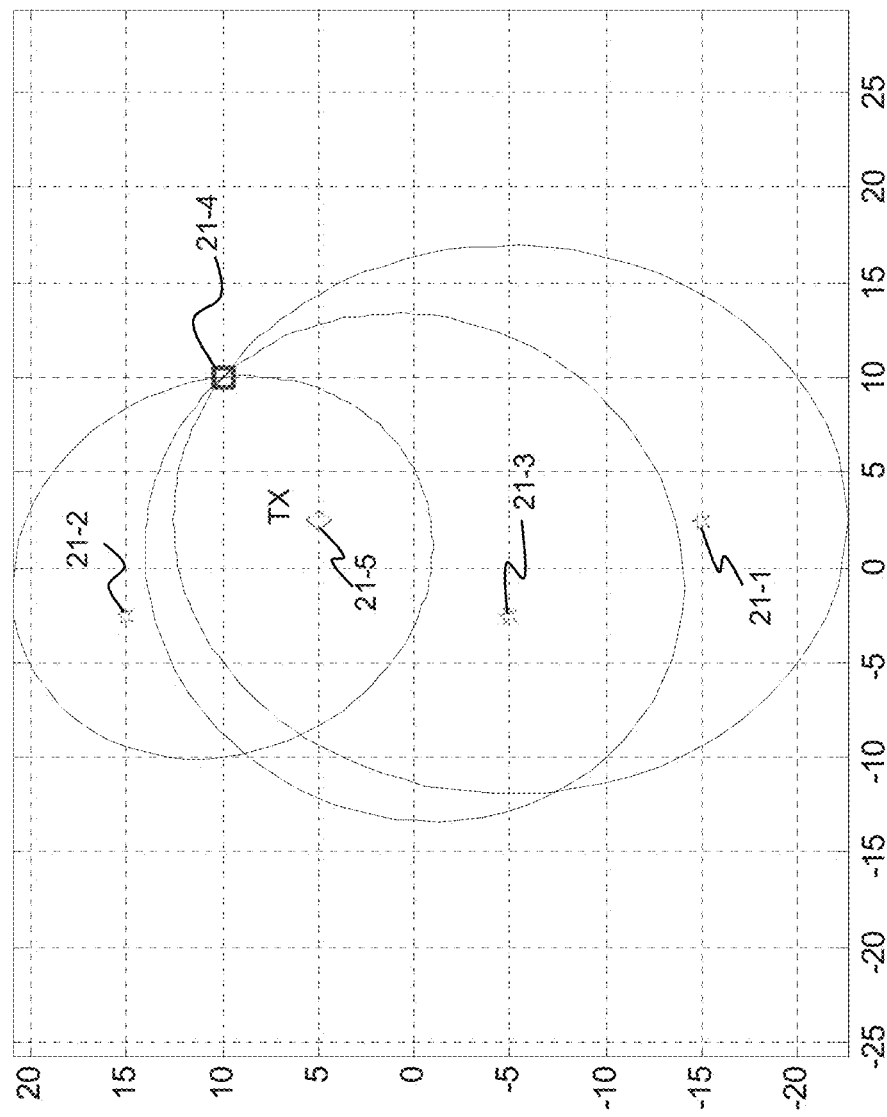
Figure 15B:
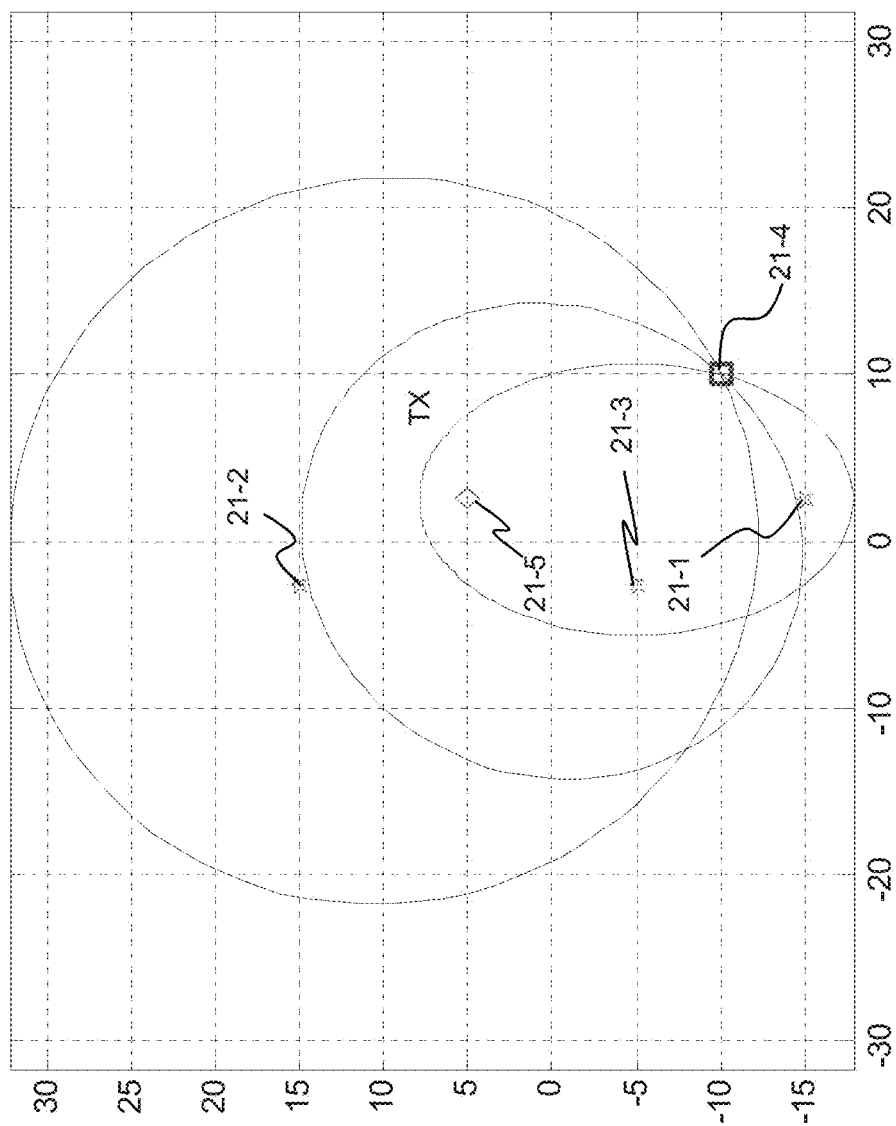
Figure 15D:
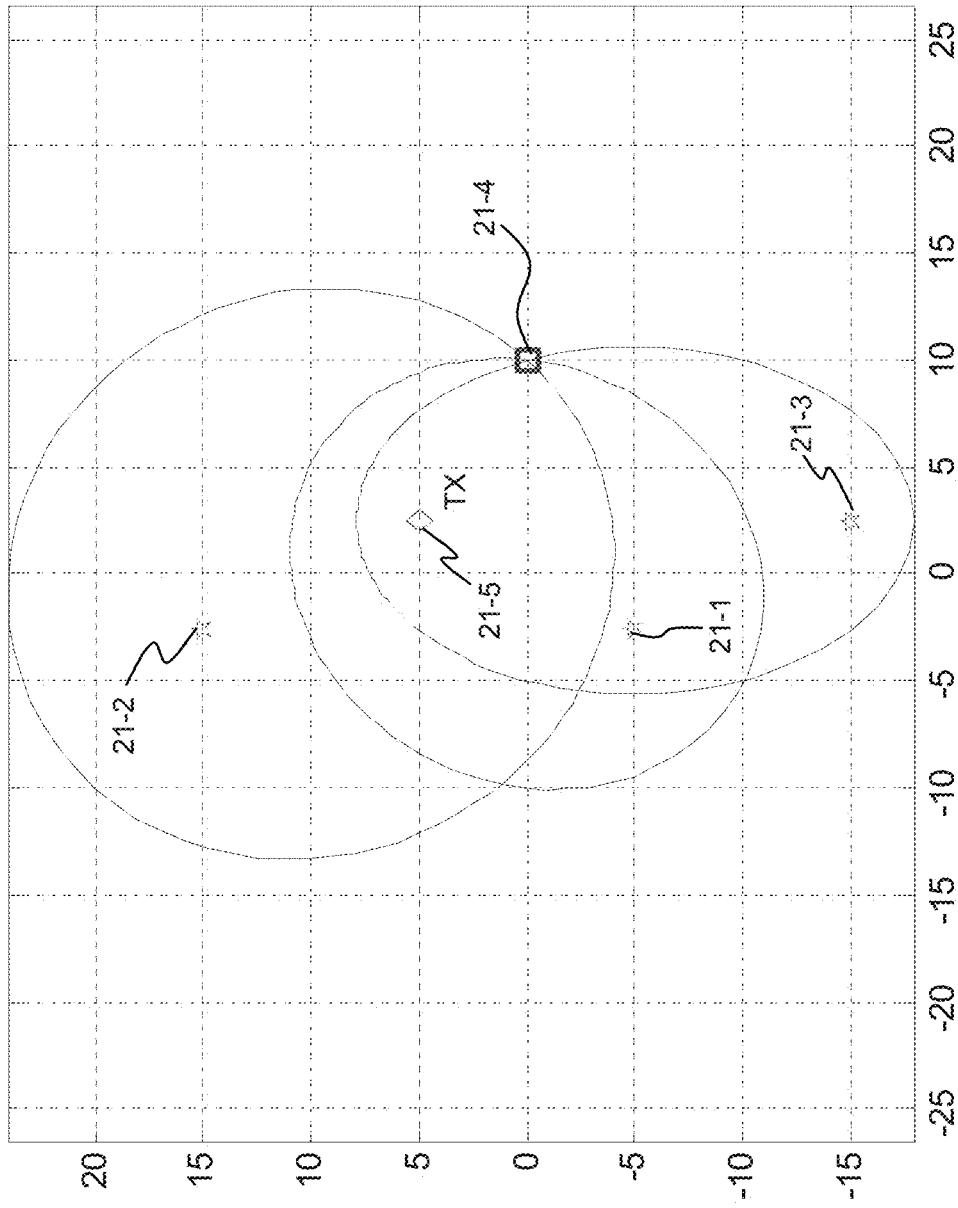
Figure 15E:
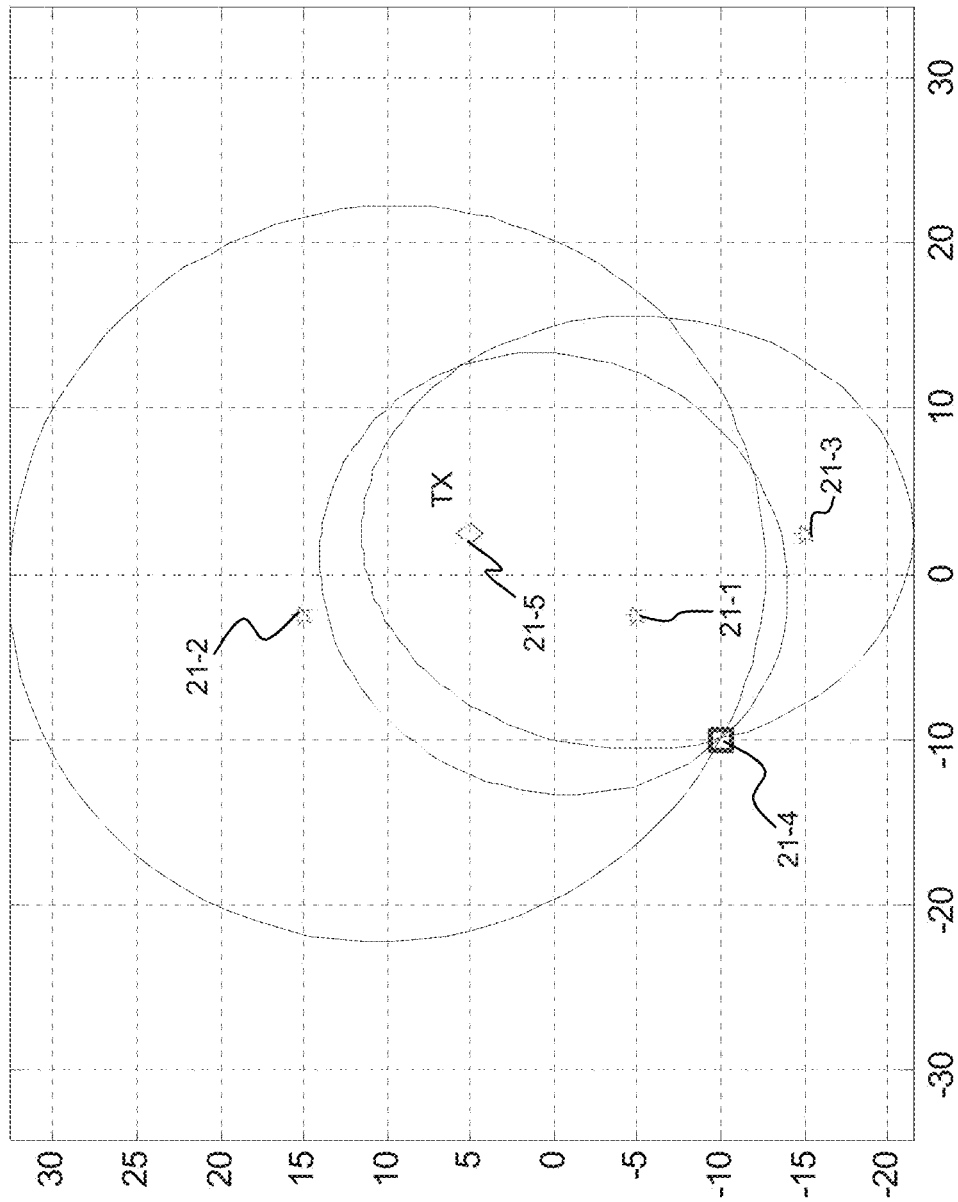
Figure 15F:
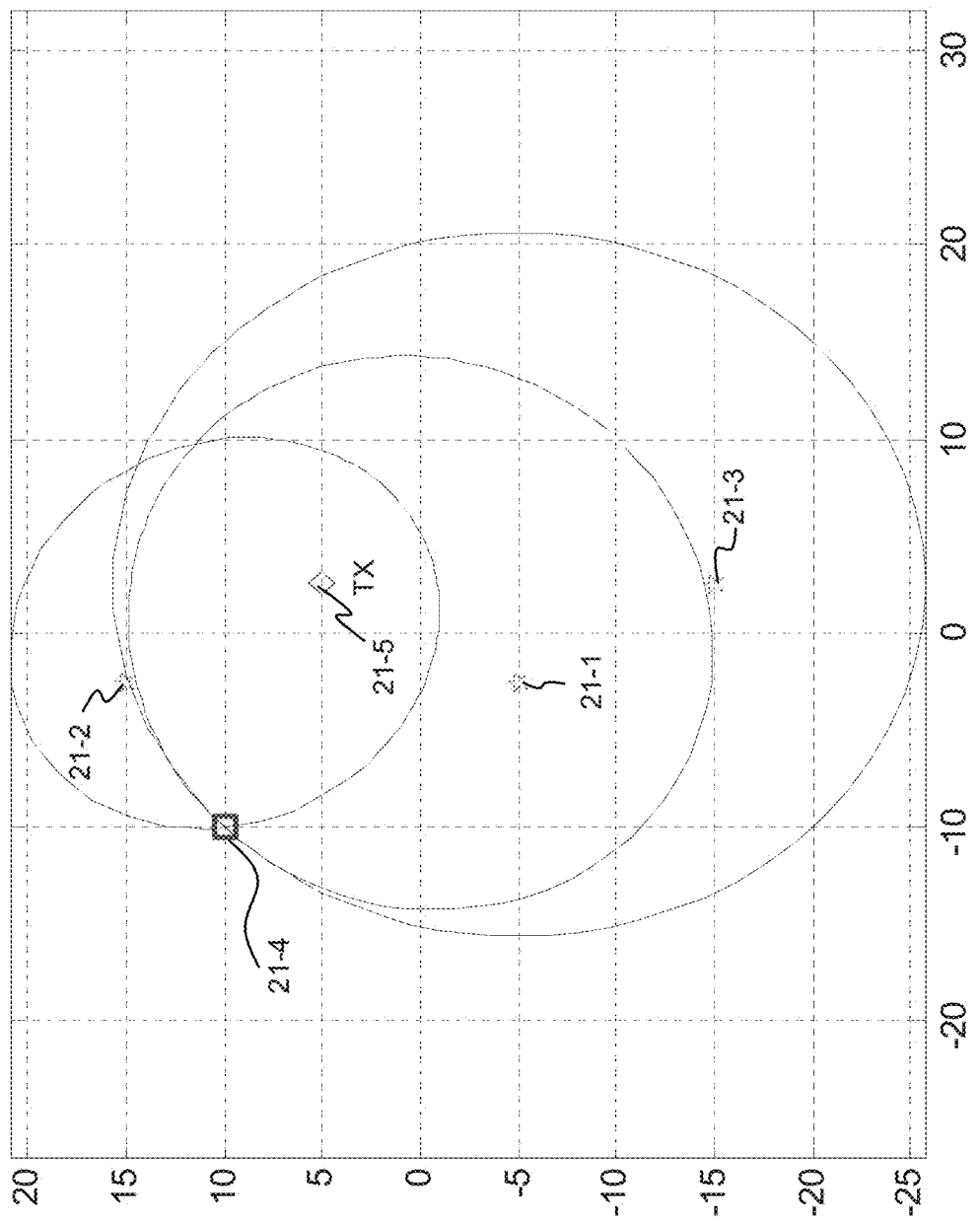

The controller (3-30) in the system (3-2) schedules each exciter to operate in the time, frequency and space dimensions. The scheduler for S/T/FDM (Space, Time and Frequency Division Multiplexing) utilizes an optimization algorithm to maximize the probability of reading all the tags within a target interrogation space. The controller may utilize frequency hopping (while satisfying regulatory requirements) to schedule frequency channel use for each exciter. FIGS. 4A-B illustrate an example of the exciter layout (4-6) and the time line (4-4) showing the assigned frequency channels (4-8). The timeline (4-4) depicts frequency-hopped channelization in the 900 MHz ISM band (4-10). On each timeline, a different hopping sequence effectively assigns a distinct series of random frequencies to each active exciter (4-8). The algorithms described in FIG. 14, manage and optimize this activity. As different exciters are activated in accordance with the schedule, the RFID system can collect observations concerning the RFID tags. In many embodiments, the schedule provides an important role in preventing interference from multiple exciters during the collection of observations. As is discussed further below, the ability to utilize different excitation frequencies in the schedule enables the RFID system to collect observations concerning the group delay of different RFID tags.

Referring back to FIG. 1, a wireless exciter layout and deployment system is shown. In the illustrated embodiment, two RFID systems (1-2, 1-14) are provided. Each system has separate receive (1-4, 1-12) and transmit antennas (1-6, 1-13). The transmit antenna radiates a forward link to the exciter, while the receive antenna array receives the signal from the tags, within the interrogation space of each exciter. The forward link in one aspect carries additional information such as an exciter identification (ID) number, command, control and management information. The figure shows the receive coverage areas for two systems (1-22, 1-20). As noted in the figure, the system supports receive interrogation spaces (1-24, 1-48, 1-28, 1-40, 1-54, 1-56, 1-44, 1-16, 1-32, 1-38). The overlap region between the receive coverage areas (1-22, 1-20) is managed through receive array beam-forming and frequency or time coordination of exciter operations. The two systems are connected to the LAN (1-3, 1-8, 1-9) in a way that is similar to the wired exciter systems of FIG. 2, the wireless exciter management server (1-7) interfaces with the two systems (1-2, 1-14) through the LAN and manages the operations of the exciters that includes control, command, coordination, and calibration of the exciters as well as optimization of the interrogation spaces.

Interrogation of RFID Tags

A sensor or an RFID tag can be interrogated many times over a fixed time interval. For each of these interrogations, sensor data or information embedded in RFID tags may be detected by combining the impinging signal on the array to form a single (beamformed) signal for detecting the sequence of symbols transmitted by the RFID tag. Each interrogation round is comprised typically of multiple (e.g. two, referred to as RN16 and EPC packet) packets from a cingulated RFID tag. The payload in these packets typically contain a temporary address (e.g. a random 16-bit number in an RN16 type packet), once acknowledged, the tag may then transmit a packet with its information content (e.g. an Electronic Product Code (EPC)).

Multiple RFID tag interrogation signals can be transmitted at different frequencies during each interrogation round. Interrogating a tag using different frequencies enables additional observation of the tag to accurately model the received signal phase and amplitude trajectories over time, and characterize the signal dispersion with multipath reflections of the transmitted signal.

Overview of Use of Interrogation Results in Location Estimation

During an interrogation round, processing operations may include but are not limited to: estimating the relative phase difference between the signals from each of the antenna elements and the reference signal and deriving the relative range from each of the antenna elements to the RFID tag in accordance with the adjusted phase delay difference for each such antenna element. Estimating the location of the RFID tag may then be dealt with by treating the aggregate interrogation rounds as a single data base forming a "sample space". It is also noted that reading the same RFID tag at multiple frequencies enables an estimation of the range (distance of the tag to the read point) of the signal source via "sequential ranging". For applications where only a single reader (read point) is deployed, the reader system is able to provide location estimation without the need to "triangulate".

Processing the signals may include deriving the adjusted phase difference between the signals from each of the other antenna elements and the reference signal, and deriving relative direction of arrival of the received signals from the RFID tag at each of the antenna elements. The direction of arrival of a signal from a single RFID tag at multiple read points may be used to further improve the estimate of the location of the RFID tag. This can be performed by combining the relative direction of arrival information derived from signals received at each array element at each read point. By using multiple interrogation cycles and arrays, each multiplicity of the number of read points in time results in a further enhancement of the overall estimate of the location of the tag.

The iterating procedure with multiple read points may include combining the RFID tag information derived from a plurality of iterations to form a probability distribution of the location of the tag, and applying an algorithm to estimate and mitigate the effects of the multipath in the direction of arrival of the signal from the source to each antenna element.

Figure 5:
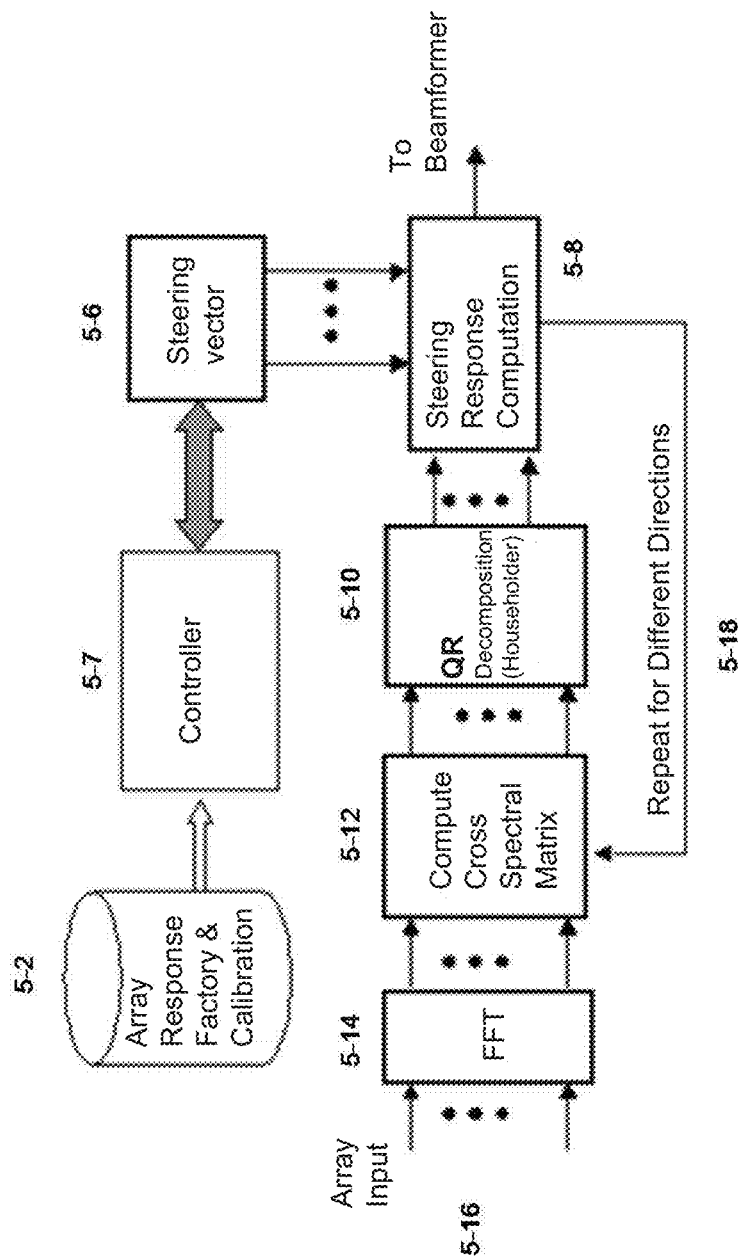
FIG. 5 graphically illustrates an algorithm for estimation of the angle of arrival from the received signal in accordance with various aspects of the present invention.

An algorithm for estimation of the angle of arrival from the received signal in a system described in FIG. 5 is addressed in co-pending U.S. patent application Ser. No. 11/770,712, filed Jun. 28, 2007, the disclosure of which is incorporated by reference above. In the application, the method by which the discrete time sampled signal from each received packet from the tag is used to estimate the AOA, using the relative phase and amplitudes of the received signal from each antenna element, is described. The algorithm described in FIG. 5, takes an FFT (5-14) of the array input (5-16), followed by cross spectral matrix computation (5-12), decomposition process (5-10), and computation of the beam steering response (5-8). The steering response computation (5-8) uses the steering vector data (5-6), which is generated and controlled using array response and calibration data base (5-2, 5-7). The beam steering response computation (5-8) is repeated for different directions by changing the cross spectral matrix (5-12).

To handle practical challenges induced by electronic components used in the radio frequency circuit of the antenna array, among other challenges, each antenna element is periodically calibrated in order to eliminate relative phase and amplitude imbalances for each antenna element and its respective in-phase and quadrature components. The calibration is performed for one or more test signals and the processing of the signals received by each antenna element may be corrected to compensate for such imbalances.

In one embodiment, where an exciter location is not known or to ensure the exciter's location has not moved, a calibration sequence occurs prior to or at various times in a location estimation procedure to determine the exciter or a dummy RFID tag location. In one embodiment, the exciter or dummy RFID tag location is determined by the RFID receiver system similar to the location estimation of the "actual" RFID tag.

A radio frequency identification system reader in one embodiment is provided employing an antenna array. In the forward channel (the transmission path between the reader and the tag), the transmit antenna array may be distributed across several physical arrays. In the case of a distributed transmit antenna, the receive antenna array can capture the impinging energy from the tag signal excited by the antenna elements of a distributed array. This approach may use spatial multiplexing to provide substantial bandwidth utilization enhancements over single antenna systems. The antenna array may support multiple frequency bands. A typical array element configuration includes an aperture-coupled feed tiled patch antenna. The tiled construction includes a matrix of identical elements in a two-dimensional plane. A low-noise amplifier (LNA) may be embedded in the antenna element itself to enhance the overall performance of the system.

For cases in which a transmit array antenna is used, beam forming can be employed to steer the transmitted beam to a desired location in space. This beam steering reduces the collisions and interference between the signals received from responding tags. Various transmission policies may be adopted, as an example: the transmit beamformer coefficients may be updated every time-slot to inject a "space hopping" pattern to maximize the received isotropic power to the RFID tags, while satisfying regulatory constraints for the maximum amount of power and dwell time.

Through periodical calibrations, the beam former may compensate for mismatches and imperfections of RF microwave devices in the front end (between the antenna and analog-digital converters (ADCs) for the receive path and between the digital-analog converters (DACs) and the antenna for the transmit path) as well as mismatches in phase and amplitude from RF-to-baseband from multiple independent parallel array element paths.

Figure 6:
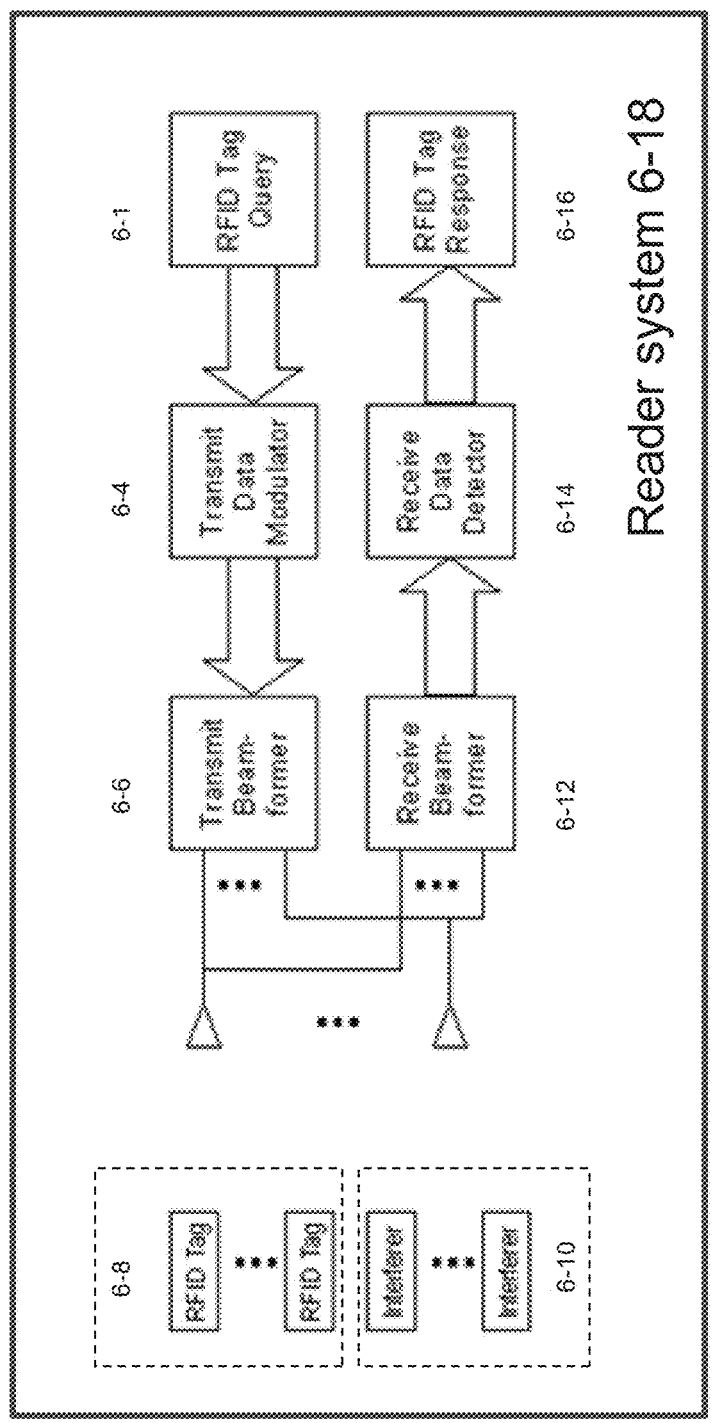
FIG. 6 is a block diagram of a reader system showing RFID Tags, Interferer sources, and the reader (i.e., transmit, and receive chain) in accordance with various aspects of the present invention.

Referring now to FIG. 6, a RFID reader interrogating a group of RFID tags placed on a number of inventory items as arranged on a pallet in accordance with an embodiment of the invention is shown. The RFID system operates in the presence of interference from an exemplary interferer 6-10. The pallet of goods 6-1 includes many cases or items tagged with RFID passive tags. A transmitted interrogation signal 6-4 from an antenna 6-6 impinges upon the pallet 6-1. In response to the signal energy detected by each tag, each tag may backscatter a sequence of information using the power received from the transmitted interrogation signal or beam 6-4. In the environment, there may be man-made or natural interferences illustrated as an interferer 6-10. The receive antenna array 6-12 applies beam forming to the backscatter signal from the tag so that the received power from the tag is maximized and the power received by antenna 6-6 from the interferer 6-10 is minimized.

Figure 7:
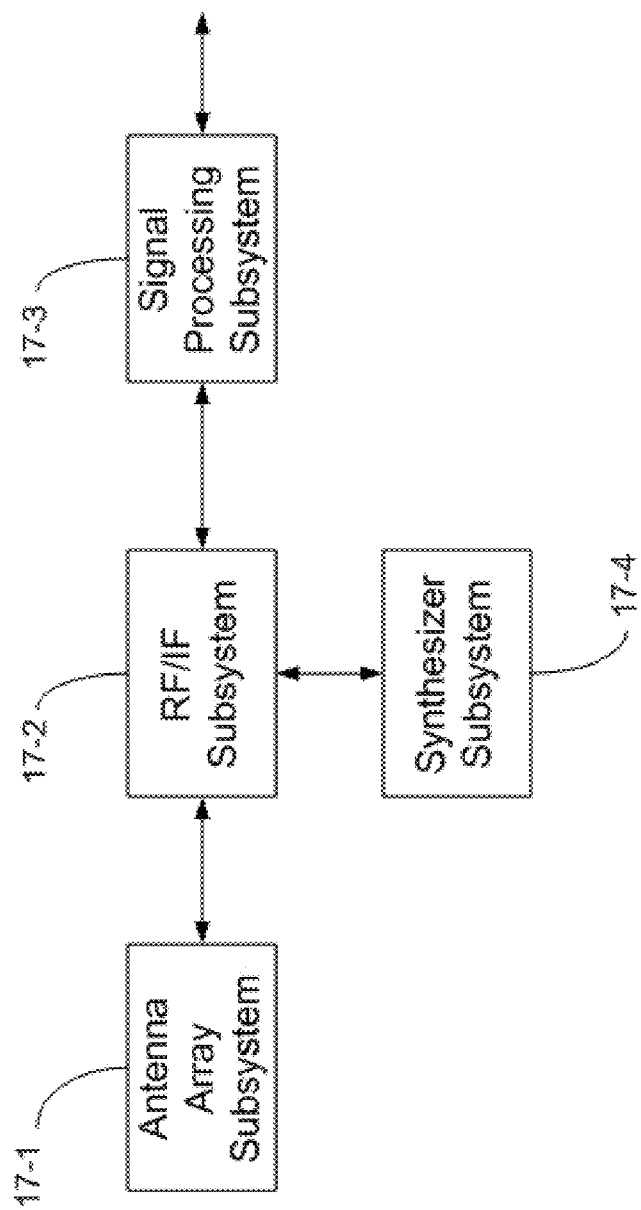
FIG. 7 is a functional block diagram of the reader showing an Antenna array, RF/IF, signal processing and synthesizer subsystem in accordance with various aspects of the present invention.

In FIG. 7, a functional block diagram of a reader system (e.g., FIG. 6) including an antenna array subsystem (17-1), an RF/IF subsystem (17-2), and a signal processing subsystem (17-3) is shown. Also, a synthesizer subsystem (17-4) provides the clocks and local frequencies to RF/IF subsystem of the reader system. The reader system interrogates the RFID tags on the pallet 1-1 (e.g., FIG. 1) in the presence of interference.

Antenna Geometries

RFID systems can include multiple transmit antennas and multiple receive antennas. In a distributed exciter architecture, the multiple transmit antennas are the antennas of exciters. As will be discussed below, the multiple receive antennas can be the antenna array of an RFID receiver and/or the antennas of a multiport exciter switched to make observations for the purpose of location estimation. When collecting observations for the purpose of estimating RFID tag location, the number and position of the receive antennas relative to the exciter and relative to each other can materially impact the accuracy with which any individual observation can be made. Therefore, the geometry of the transmitter and receiver antennas can impact the number of antennas required for an application with a specified location estimation precision requirement.

Linear Arrays

Figure 8:
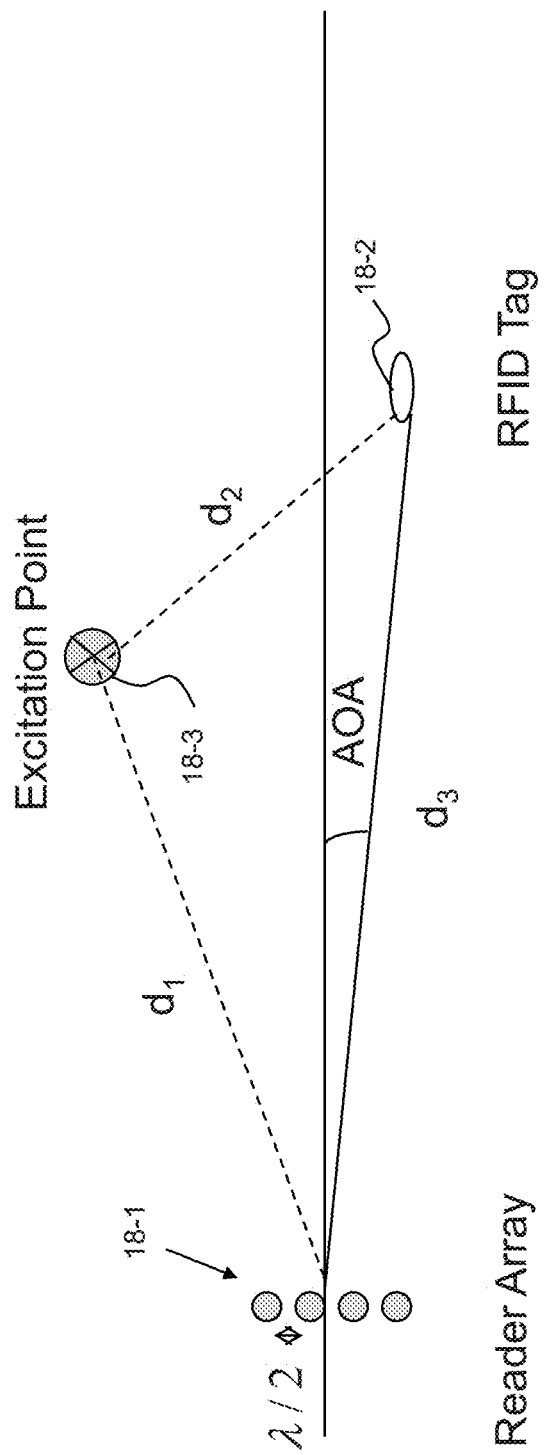
FIG. 8 is a graphical representation illustrating a reader array and a single excitation point topology in accordance with various embodiment of the present invention.
Figure 9A:
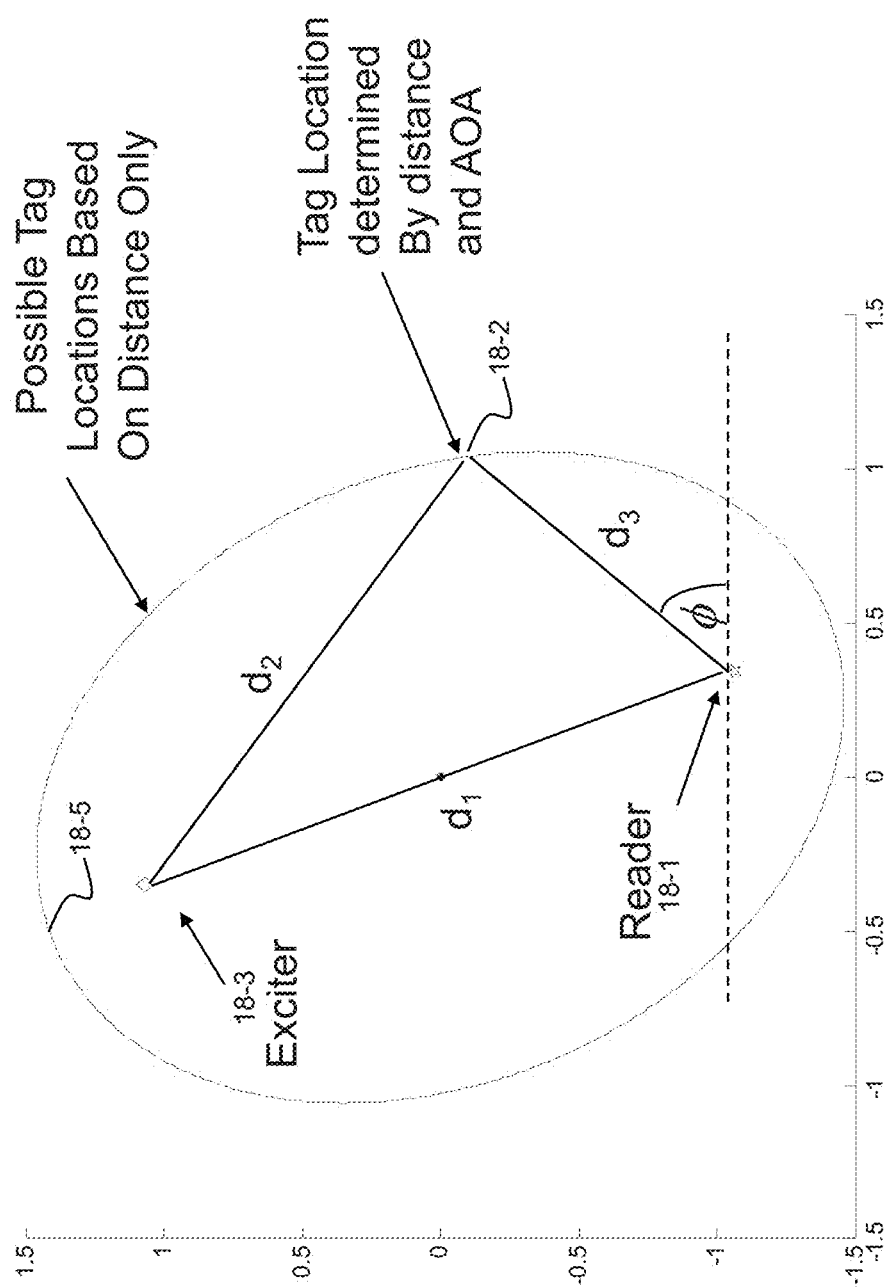
FIGS. 9A-9C are graphical representations providing elliptical representations for determining the location an RFID tag in accordance with various embodiments of the invention.
Figure 9B:
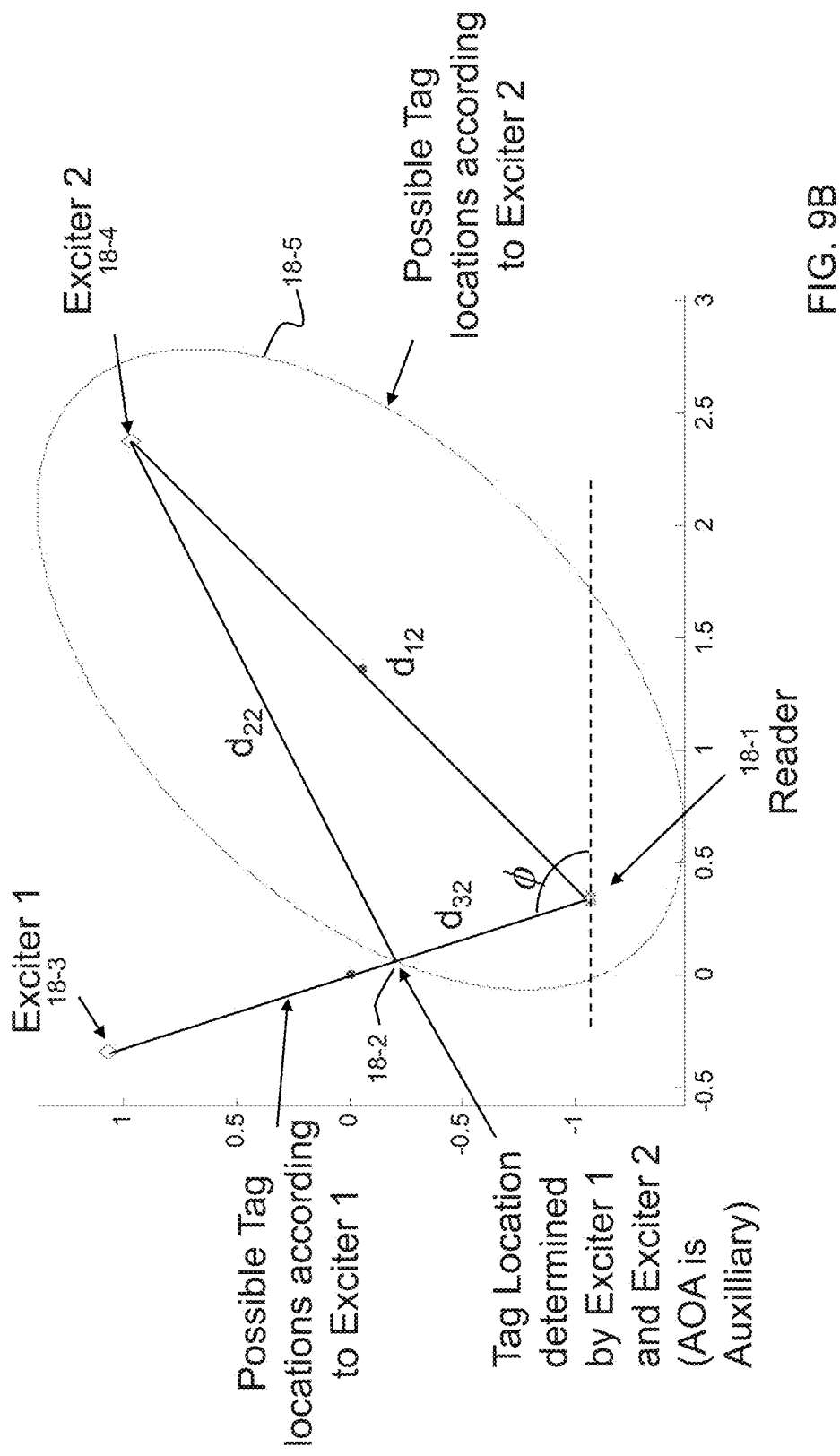
Figure 9C:
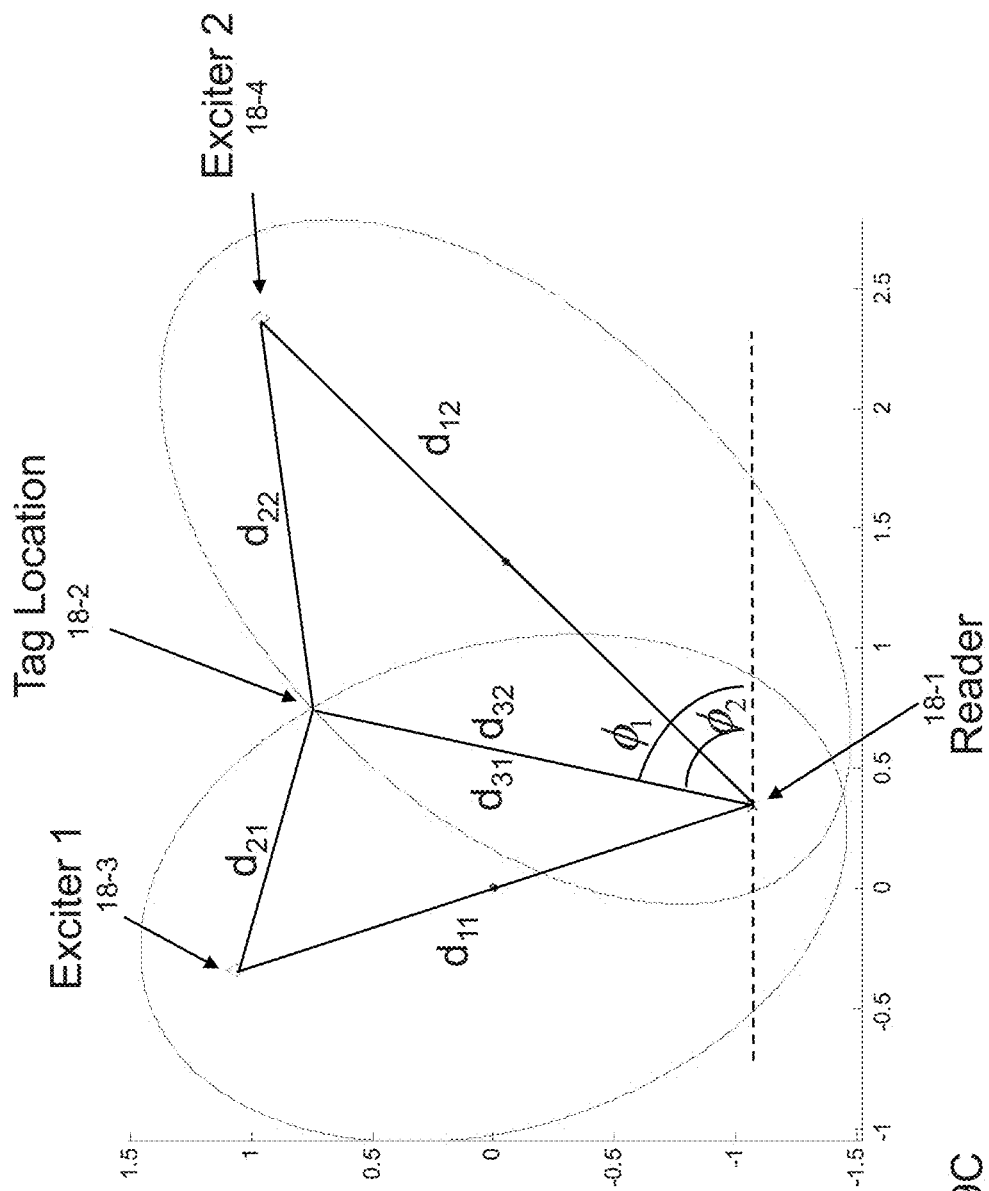

Referring now to FIGS. 8-9C, a reader array 18-1 relative to a single exciter 18-3 and RFID tag 18-2 is shown. The reader array is a linear array including four antennas providing four reception points. Each antenna is offset relative to each other. The exciter is positioned a specific distance d1 from the reader array and also a specific distance d2 relative to a RFID tag. The RFID tag is also located a specific distance d3 relative to the reader array.

Observations Using Receiver Arrays

In FIGS. 9A-9C, observation of the location of an RFID tag utilizing calibrated slope of the group delay as a proxy for distance from the RFID receiver system to the exciter (d1) from the exciter to the RFID tag (d2) and from the RFID tag back to the RFID receiver system (d3) in accordance with an embodiment of the invention is shown. Group delay observations are discussed in greater detail below, but can be assumed here as providing an estimate of the path length between a transmit antenna, an RFID tag and a receive antenna. An ellipse is a locus of points in a plane such that the sum of the distances to two fixed points is a constant. Such is exactly the case when the distance between a reader and exciter is known (d1) and the sum of the distances d2+d3 is known. By way of calibration we are able to determine the time (distance) between the reader (noted by a star) and an exciter (noted by a diamond). We are also able to determine the sum of times d1+d2+d3. These two distance measurements together (d1 and d1+d2+d3) imply that the tag must be somewhere on the ellipse 18-4. Note that there is a degenerate case wherein 2*d1=d1+d2+d3. This indicates that the tag is somewhere on the line segment between the reader and the exciter; exactly where cannot be determined in this case (an additional exciter, as will be described, resolves this instance). Expressions for determining the location of the intersection of a line emanating from one foci of an ellipse (in this case the reader) and a position on the ellipse can be derived.

In FIG. 9B, the case in which a tag is on the line segment between the Reader and Exciter 1 is provided. This is the degenerate case wherein 2d1=d1+d2+d3. In this case the region of possible tag location according to Exciter 1 is the line segment between the Reader and Exciter 1. If another exciter, Exciter 2 (18-4), is able to illuminate the tag, then this case can be resolved be finding the intersection between the ellipse predicted (18-5) by the foci locations of the Reader and Exciter 2 and the sum of the distances d22, distance from exciter 2 and the tag and distance d32, distance from the reader to the exciter 2. It should be appreciated that in this case the angle of arrival (AOA) information is not required to determine tag location. It can, however, be used as an additional measurement via the procedures previously described.

In FIG. 9C, two non-degenerate location predictions due to Exciter 1 and Exciter 2 are shown. Both distances d11 and d12, distances from the reader to each respective exciter, can be determined via a calibration procedure. Distances d21+d31 and d22+d32 specify left and right ellipse respectively. Angles φ1 and φ2 predict the line segment leaving the Reader and the intersection of this segment with each of the ellipses specifies the tag location. The angles φ1 and φ2 as shown appear the same. However, each angle is an independent observation due to reading the tag of interest via excitation from exciters 1 and 2 respectively.

Multiport Exciter Geometries

Distributed exciter architectures decouple the transmit and receive functions in an RFID system, with exciters being tasked with performing the transmit function. An advantage of decoupling the system in this way is that low cost exciters can be used an deployed in more locations than traditional RFID receiver systems, where providing RFID receivers in multiple locations is typically too costly. In a number of embodiments, exciters have multiple ports so that a single exciter can activate RFID tags using multiple antennas (i.e. ports). In many embodiments, the multiport exciters can possess the capability to switch some antennas to receive signals backscattered by RFID tags. Switching the function of the antennas in this way enables the multiport exciter to collect observations of the signals backscattered by the RFID tags. The exciters can make these observations without the necessity of the complex decoding circuitry utilized in RFID receivers. Enabling multiport exciters to collect observations concerning RFID tags significantly increases the number of receive antennas within an RFID system that can be utilized to collect information for use in location estimation. In addition, the antennas of a multiport exciter are typically distributed further from each other than the antennas in the linear array of an RFID receiver. Multiport exciters that can collect observations concerning RFID tags and various geometries for the location of the antennas of a multiport exciter are discussed further below.

Figure 10:
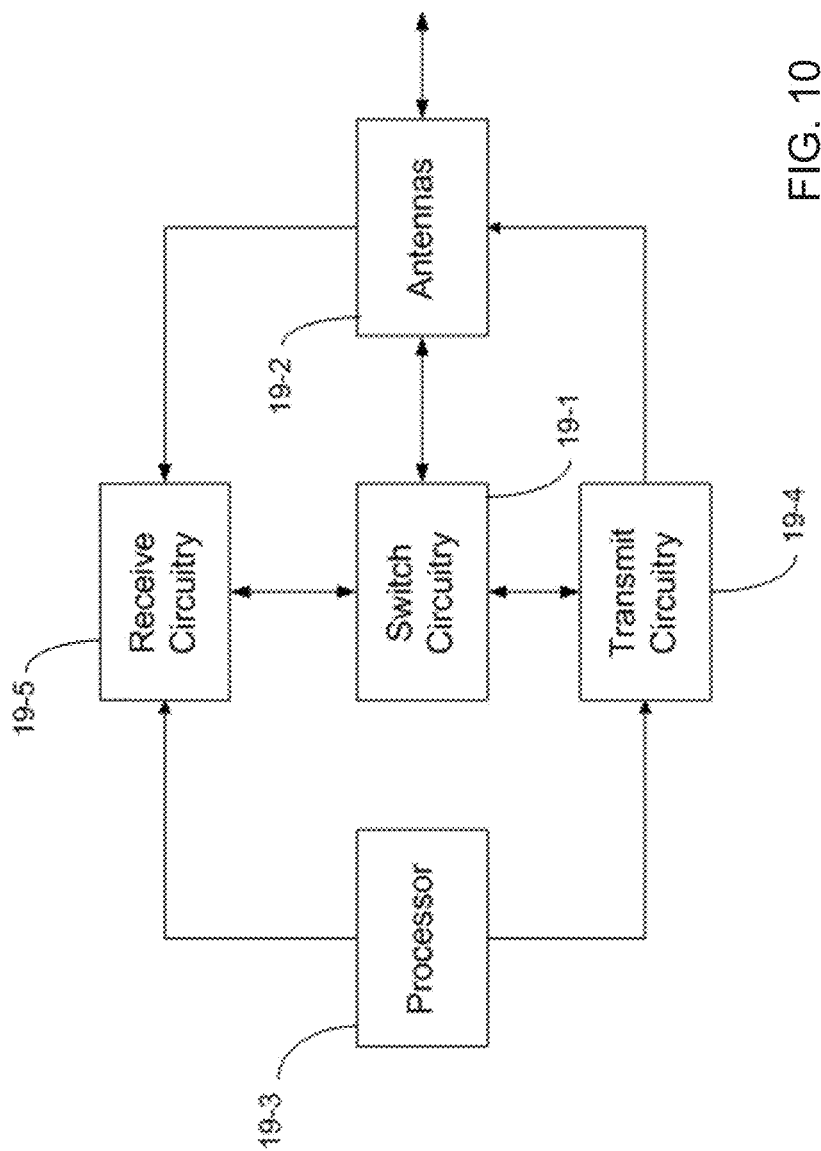
FIG. 10 is a block diagram of a four port excitation node in accordance with various embodiments of the invention.

Turning now to FIG. 10, FIG. 10 illustrates a block diagram of a multiport exciter or excitation node (eNode) having four ports (four port exciter) in accordance with various embodiments of the invention. Although much of the following discussion relates to a multiport exciter including four ports, multiport exciters including any number of ports can be utilized in accordance with embodiments of the invention. The four port exciter includes switch circuitry 19-1 to select one or more antennas 19-2. The selection of the antennas is controlled by a processor 19-3 utilizing an associated transmitter circuitry 19-4 or receiver circuitry 19-5. The transmitter circuitry handles all outgoing communications such as interrogation and calibration signals to nearby RFIDs. The receiver circuitry handles all incoming communications such as response data from interrogated RFIDs. The receiver circuitry through the switch circuitry selects one of the antennas for reception of incoming signals. Likewise, the transmitter circuitry through the switch circuitry selects one of the antennas for transmission of the outgoing signals. In most cases, multiple antennas are selected for the transmission to ensure the maximum interrogation coverage to reach the most RFIDs nearby and as described throughout the application to quickly and accurately determine the location of the RFIDs.

Figure 11:
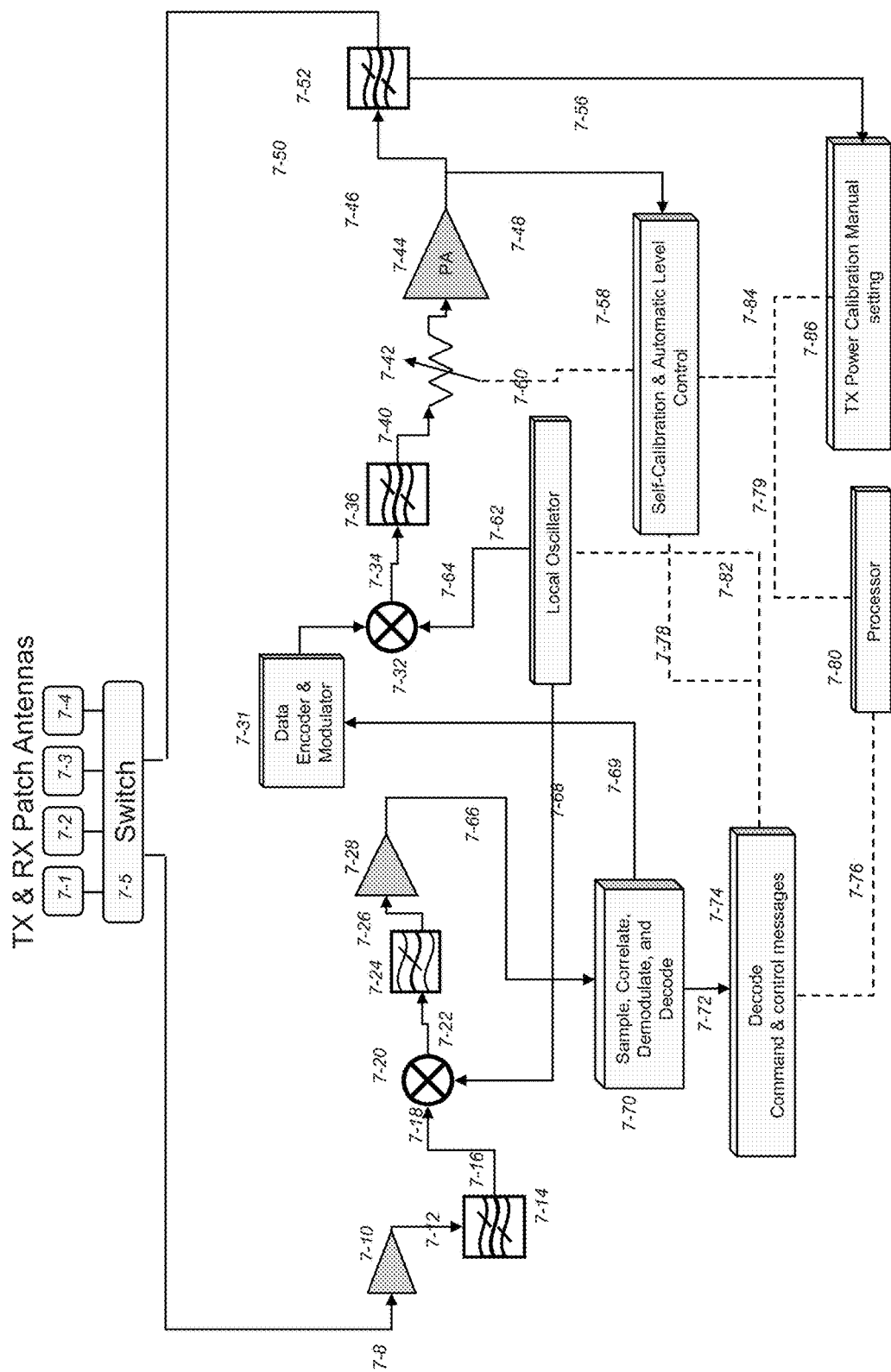
FIG. 11 is a detailed block diagram of a four port excitation node in accordance with various embodiments of the invention.

FIG. 11 illustrates a detailed block diagram of a multiport exciter or excitation node (eNode) in accordance with various embodiments of the invention. The excitation node includes an antenna array that transmits and receives data from RFIDs. The antenna array includes multiple antenna elements 7-1 through 7-4. Each antenna element is configured via a switch (7-5), such that one or more of the antenna elements transmits and the remaining antenna elements receive. As such, a received signal via the antenna element 7-1 is supplied to an amplifier 7-10. The receive path signal is thus amplified (7-10), bandpass filtered (7-14), and mixed directly to a baseband signal (7-20) supplied by a local oscillator (7-60). The carrier frequency used to mix the baseband signal with the received signal corresponds in frequency used to mix to RF on the transmit side (7-62). The received baseband signal is then low pass filtered (7-24) and amplified (7-28). The signal is sampled, correlated to extract phase, demodulated and decoded by a receiver signal processing circuitry (7-70). Command and control messages (non RFID-tag related data) are decoded by control circuitry (7-74). Based on the decoded command and control messages, processor (7-80) issues instructions to control transmit power level calibration (7-86) and other maintenance features. Received RFID data is forwarded to a data encoder and modulator (7-31) to satisfy aspects of different RFID protocols. Packets for transmission are upconverted (7-32), bandpass filtered (7-36), variably attenuated (7-42), and amplified (7-44). A final bandpass filter ensures that out of band emissions requirements are applied (7-52) prior to radiation out through one of a plurality (in this case four) of possible antennas. In one embodiment, a coaxial cable supplies a frequency reference, DC power, and command control. In this embodiment, local oscillator block (7-62) is replaced with a filter that spectrally purifies the coaxial fed frequency reference.

Figure 12:
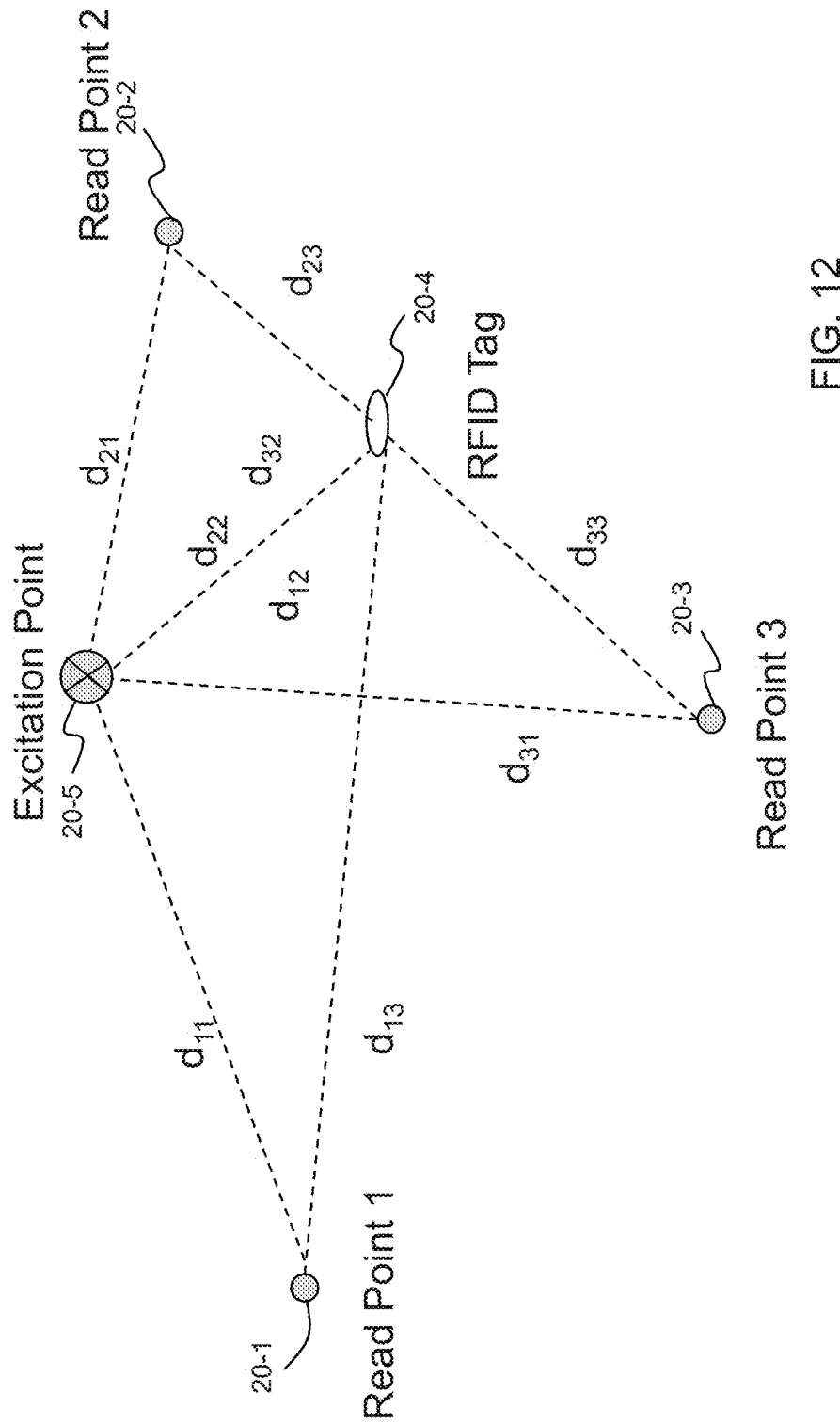
FIG. 12 is a graphical representation illustrating a distributed array of readers and a single excitation point topology in accordance with various embodiments of the invention.
Figure 13A:
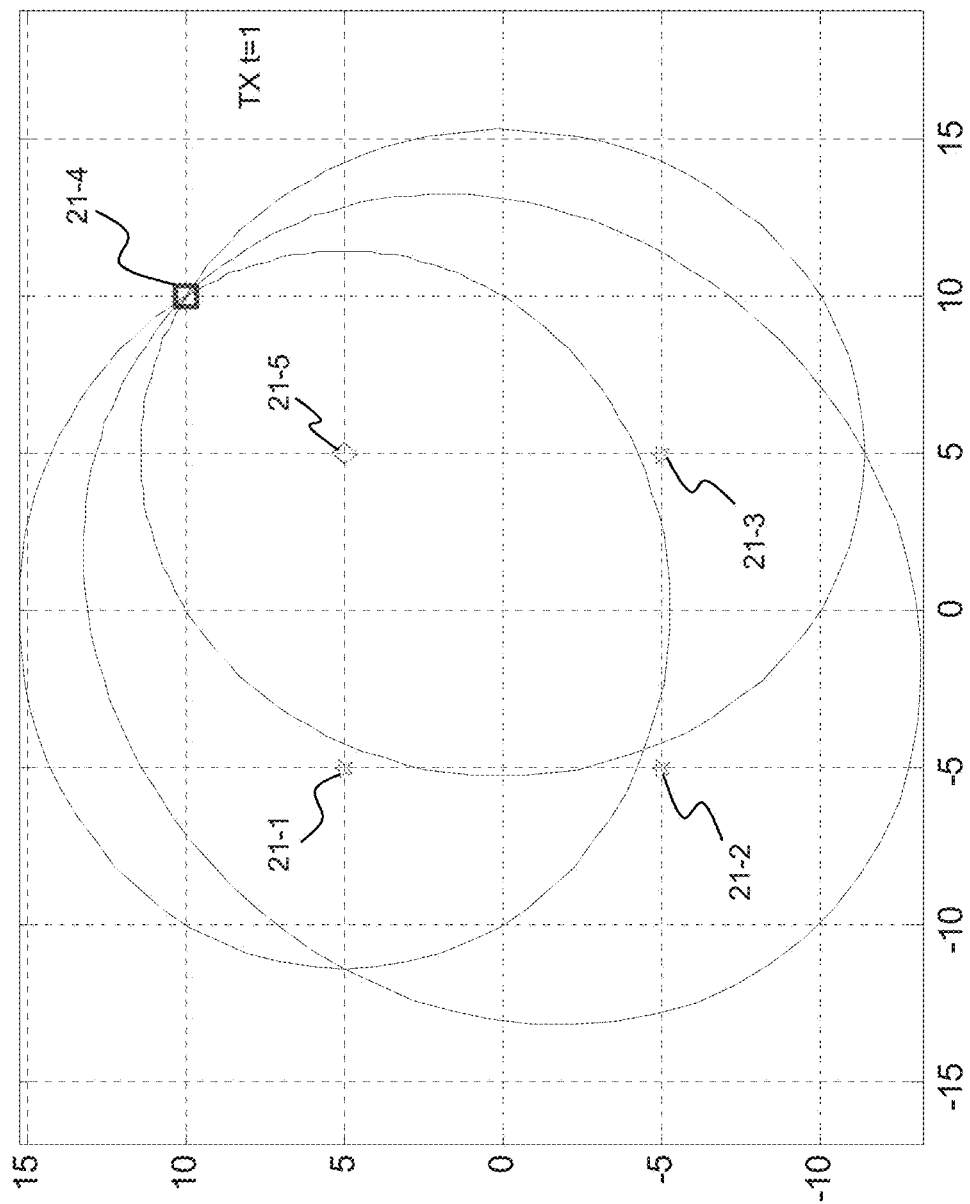
Figure 13B:
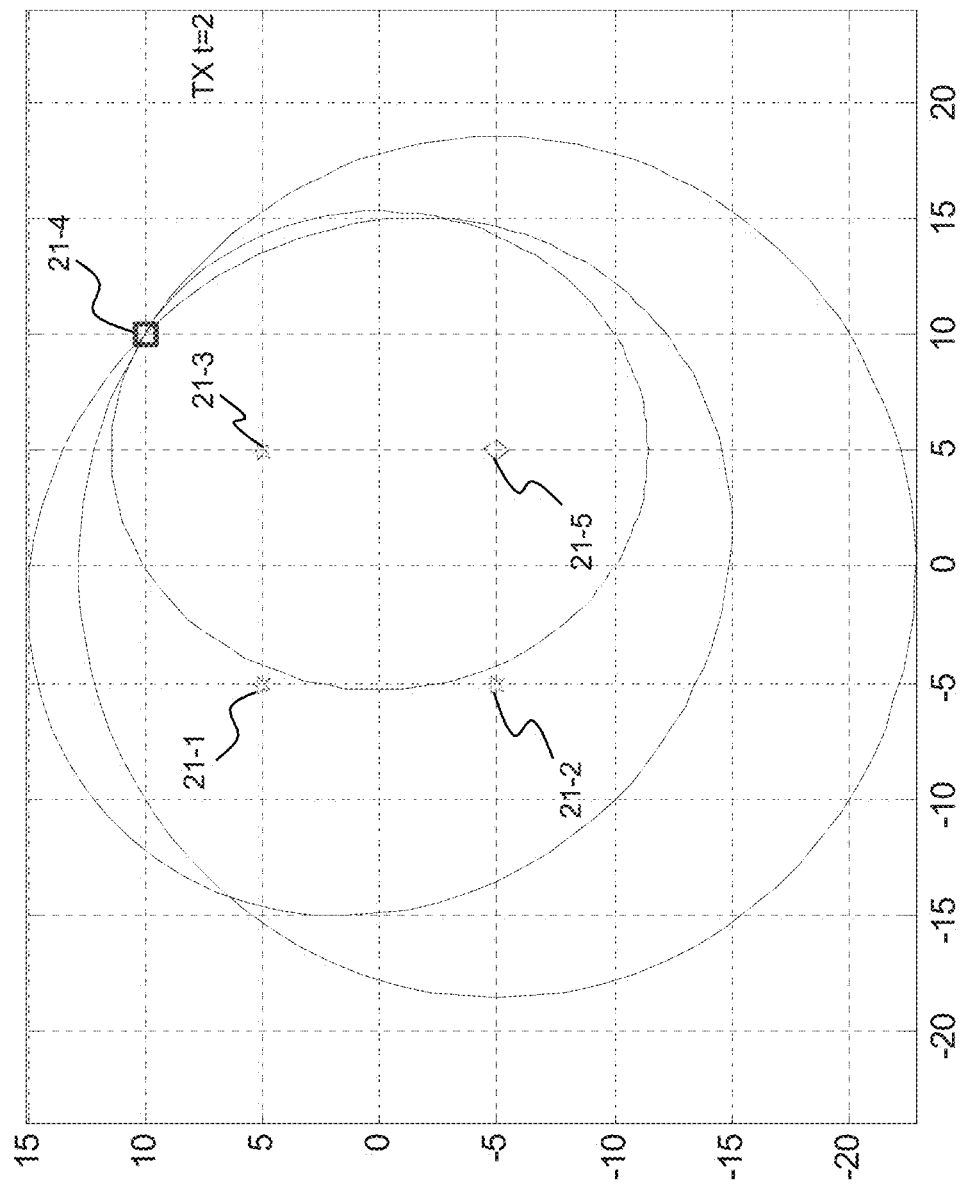
Figure 13C:
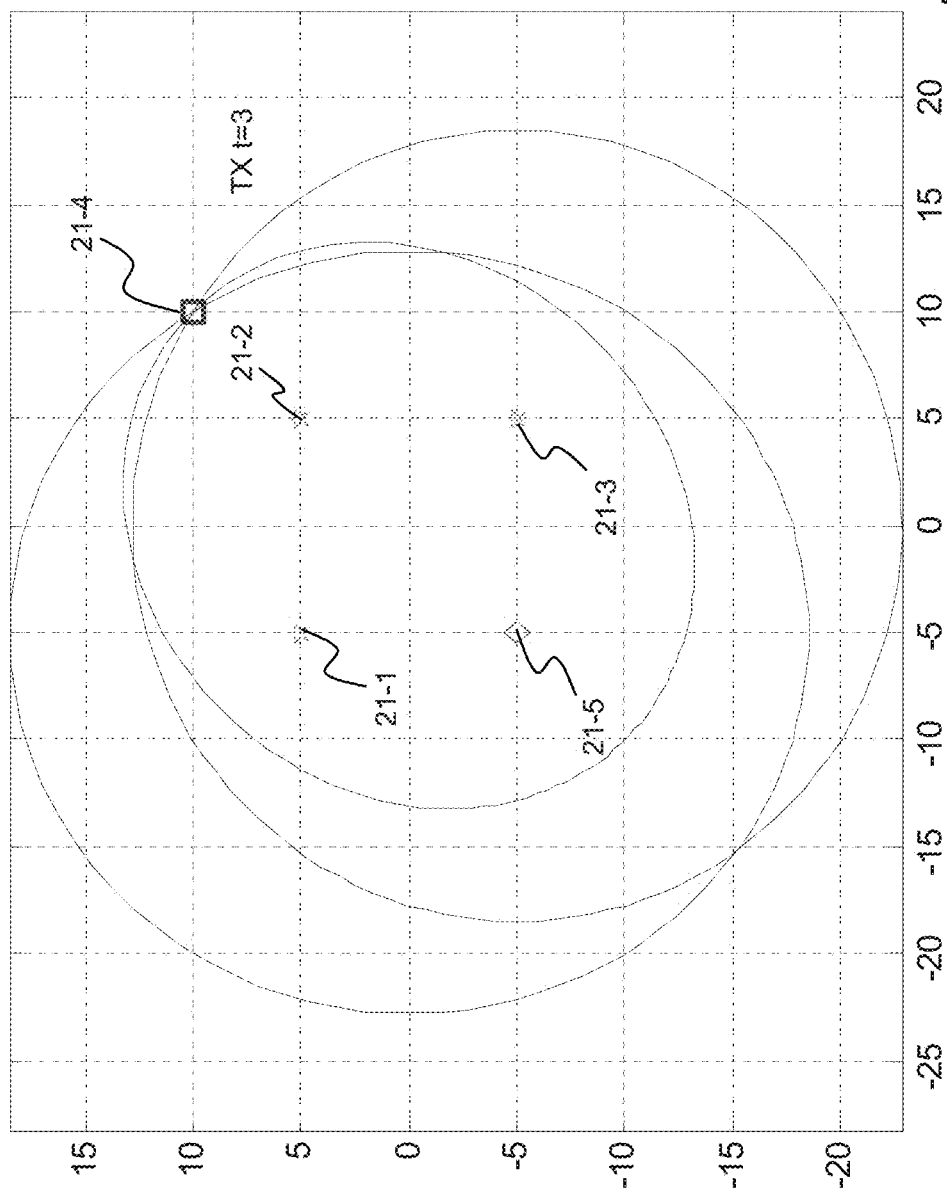

Referring now to FIG. 12, the antennas of a multiport exciter are shown configured as a distributed array of phase synchronized readers at read points 20-1, 20-2 and 20-3 and a single exciter 20-5. The location of an RFID tag 20-4 within the distributed array is also shown. The multiport exciter is configured to receive signals backscattered by the RFID tag on a plurality of ports via the antennas located at the read points 20-1, 20-2, and 20-3 and to transmit interrogation signals using a single port via the exciter antenna 20-5. Each read point is a known distance from the excitation node. For example, read points 1, 2 and 3 are spaced a specific distance d11, d21 and d31, respectively relative to the excitation node. Also, respective distances d13, d23 and d33 relative to each read points 1, 2 and 3 to the RFID tag are determinable along with the distance d22 relative to the excitation point to the RFID tag (see discussion of group delays below). Accordingly, utilizing the sums of distances d12+d13, d22+d23 and d32+d33 in conjunction with a priori known read point and excitation point locations to determine ellipses, the multiport exciter an collect observations concerning the RFID tag location. One would appreciate that no angle of arrival information is utilized or required to locate the RFID tag.

Turning now to FIGS. 13-16, exemplary excitation nodes or eNode configurations are shown. For example, in FIGS. 13A-D, observations of an RFID tag obtained by a '4-port' eNode configured as a "chandelier" and the different ports act as the exciter is shown. In the chandelier configuration, each of the antenna elements is set equidistance from each other and is set in a square like shape. The 4-port eNode maintains phase synchronization between transmit and receive points using a local oscillator or via an external reference. The view is from overhead and shows eNode setup such that 3 of 4 ports receive (21-1, 21-2 and 21-3 in FIG. 13A) and 1 transmits (21-5 in FIG. 13A). The tag of interest is denoted with a square (21-4). In each figure, three ellipses are displayed. Each ellipse shares a TX antenna for one focus and has a different receiving antenna as another focus. The intersection of all three ellipses can be taken as an observation of tag location. In situations where this intersection is not unique (not shown here) information regarding which antenna excited the tag can be used to identify the most likely 3-way intersection. In one embodiment, the phase of a received tag signal is determined via correlation with a preamble sequence. Such an approach is described in U.S. patent application Ser. No. 11/770,712, filed Jun. 28, 2007, entitled "RFID Beam Forming System", the disclosure of which is hereby incorporated by reference as if set forth in full herein.

The confidence with which observations of location estimation can be made is dependent upon the noise in the system. When an observation is made at the intersection of ellipses in the manner outlined above, the confidence of the observation can be gauged by the extent to which the ellipses are approximately parallel at the point at which they intersect (see for example FIG. 3D). When the ellipses are approximately parallel, small variations in phase noise can result in significant shifts in the observed RFID tag location. As is discussed below, the number and location of the antennas of a multiport exciter can significantly increase the confidence of location observations made using the exciter.

In FIG. 14A-D, the 4-port eNode is configured as an "offset linear array". In an offset linear array configuration, pairs of antenna elements are linearly aligned and equally distanced from each other. Also, the first pair is offset a set distance from the second pair. The offset configuration is used to increase total percent area where the backscattered signals from an RFID tag will result in a location observation in which there is only one possible location of the RFID. As shown, three ellipses are displayed for each of the four ports of the eNode with the intersection of the ellipses identifying a tag location. As is discussed further below, each of the four sets of three ellipse observations can be passed to a particle filter process with any one result being sufficient to identify the location of the tag.

FIGS. 15A-F provide another example of a 4-port eNode configured as an offset linear array exemplifying the potential coverage to locate one or more RFID tags. For ease of the reader of the application, the array is shown with a single transmitter configuration with three ellipses drawn and the intersection of which identifying six different RFID tag locations.

Figure 16:
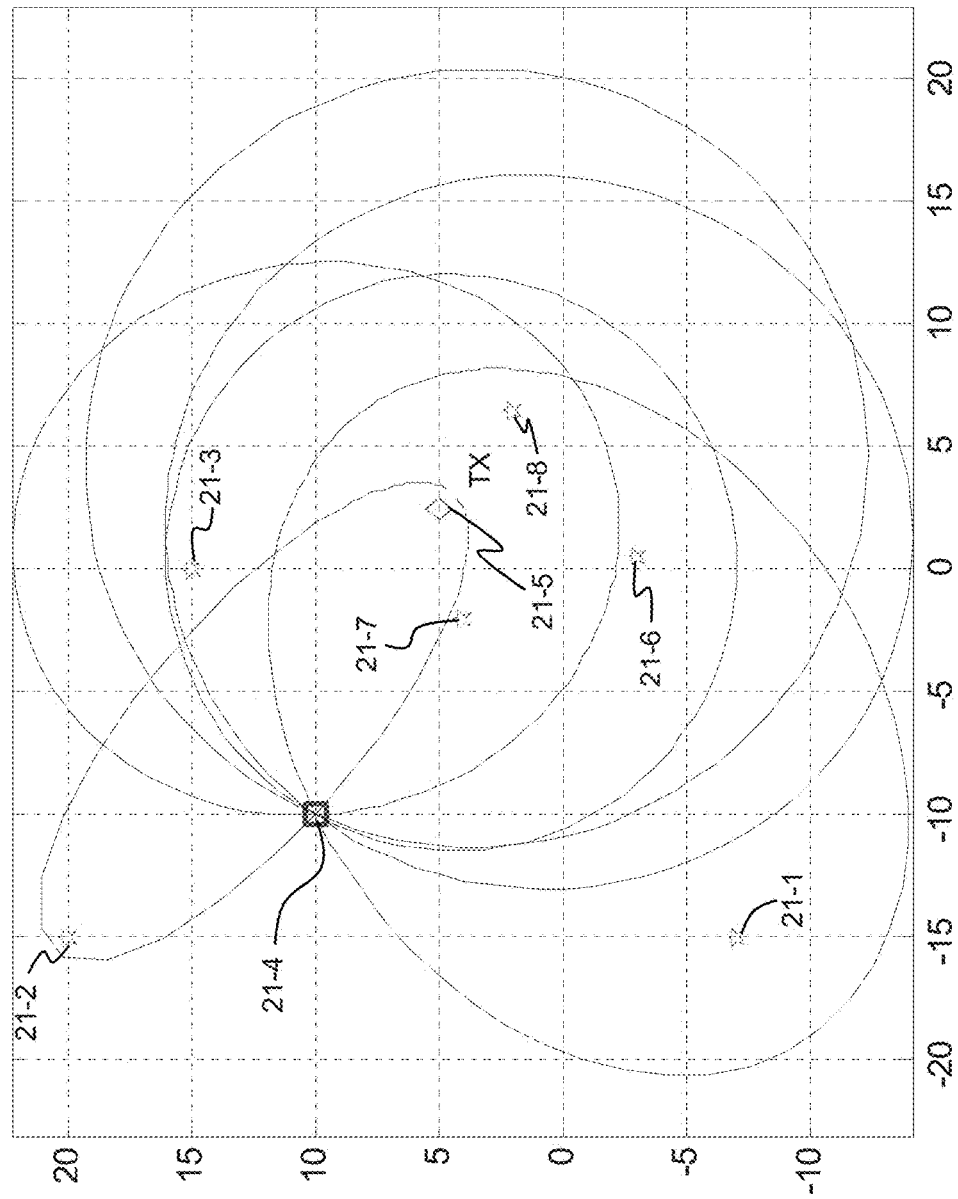
FIG. 16 is a graphical representation illustrating a generalized multi-port excitation node, or array of nodes, in an arbitrary or irregular configuration in accordance with various embodiments of the invention.
Figure 17:
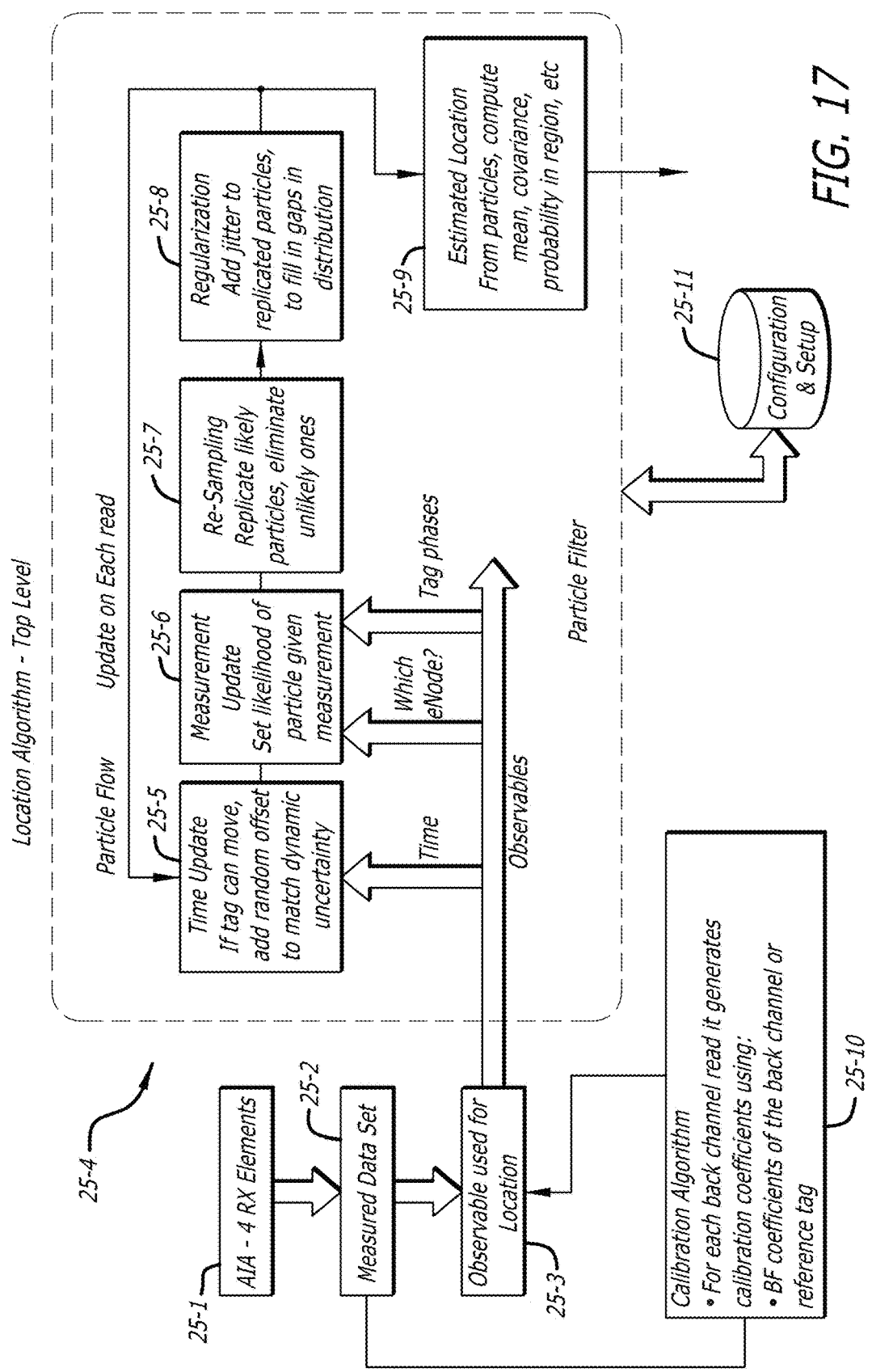
FIG. 17 is a flow chart of a particle filter location procedure for locating a RFID tag in accordance with various embodiments of the invention.

FIG. 16 illustrates an example of locating an RFID tag using an "irregular" array. In such a configuration, the antenna elements are set up in a pseudo random pattern. In the illustrated example, six total receive patches (21-1, 21-2, 21-3, 21-6, 21-7 and 21-8) and one transmit patch (21-5) are used to locate a RFID tag (21-4). The arbitrary configuration of the array can also be used for group delay based location solving.

Observables Used in Location Estimation

Backscattered signals from RFID tags provide a variety of observables that can be used in location estimation. The observable used as a proxy for distance in the above discussion of transmit and receive antenna geometries is the calibrated slope of the group delay. Group delay describes the differences in phase observed at different frequencies. The manner in which group delay can be used in location estimation in accordance with embodiments of the invention is explained below. In several embodiments, observations of read rate are used in location estimation. An RFID tag's read rate can be generally described as the number of times the RFID tag is read as a ratio of the number of opportunities in which the RFID tag could have been read. Other observables that can be utilized in location estimation include, but are not limited to, phase, phase coefficient magnitude, read rate, carrier frequency, excitation node index, and receive antenna index.

Group Delay as an Observable

Figure 18:
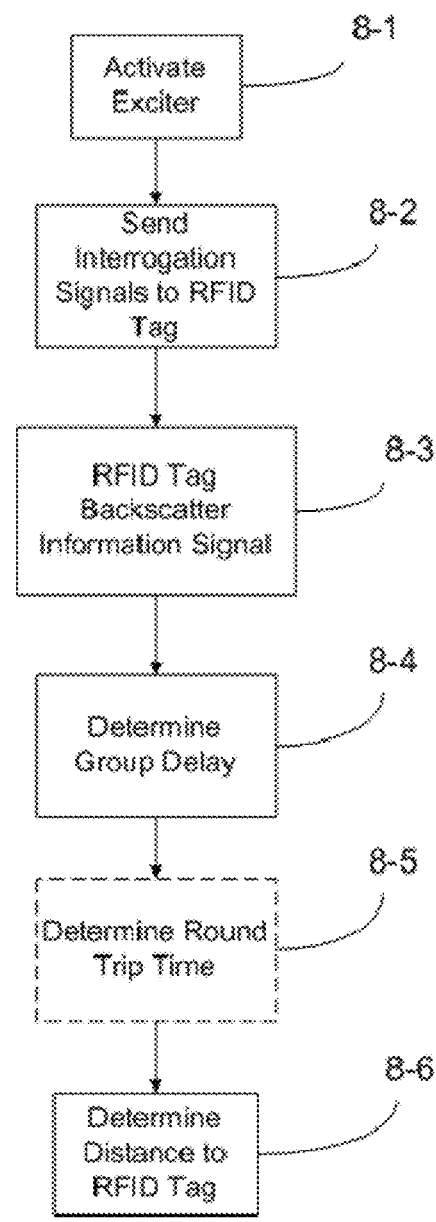
FIGS. 18-19 are flow diagrams providing an overview of location estimation performed by a reader in accordance with various aspects of the present invention.

In FIG. 18, a flowchart describing one aspect of a location estimation procedure is provided. The process commences when the reader transmits (8-1) an activation signal to a predetermined exciter. The exciter illuminates (sends interrogation signals) a RFID tag in the exciter's transmit field (8-2). The RFID tag responds by sending information signals (8-3) in which the reader determines a group delay of the signals (8-4). The RFID receiver system causes the RFID tag to respond in which the information signals differ in frequency only and the system determines the phase difference between the different information signals. Using the ratio of the difference in phase versus the difference in frequency (i.e. the group delay), the reader determines the distance to the RFID tag. In one embodiment, the reader also determines total round trip time (8-5). As is discussed below, the distance to the RFID tag can be determined using the group delay (8-6). It should be noted that throughout this process the signals communicated to each system is frequency and phase locked.

Assuming that the exciter location from the reader is known, the received phase of the tag signal at the reader is measured. If a different tone frequency is used, a different relative phase will be measured. The difference in measured relative phases of the two tones at two different frequencies due to the round trip delay is related to the differential frequency via (assuming the exciter is co-located with the reader):

$$\Delta\phi = 2\frac{2\pi\Delta f d}{c} \qquad (6)$$

where $\Delta\phi$ is differential relative phases, $\Delta f$ is differential frequency, d is distance, and c is the speed of light. The phase $\theta_1$ at tone frequency $f_1$ can be measured with a $2\,m\pi$ ambiguity. Similarly the phase at tone frequency $f_2$ can be measured with a $2n\pi$ ambiguity. As long as the differential phase is less than $2\pi$, the phase difference of the modulo $2\pi$ measurements can be used to determine the range d given $\Delta f$. This is true as long as $\Delta\phi$ is less than $2\pi$. Note that the condition can be satisfied by selecting the appropriate frequency separation given the expected range of operation. From the range d and bearing $\theta$, the tag location can be determined for the two-dimensional example. One skilled in the art would appreciate the extension to 3D is achievable and contemplated. When the exciter is not co-located with the reader and has distance $d_1$ to the tag, then $$\Delta\phi = \frac{2\pi\Delta f(d + d_1)}{c}$$

Angle of Arrival (AOA) as an Observable

In systems that include the specialized case of linear antenna arrays, observations of angle of arrival (AOA) from multiple linear arrays can be used to triangulate an RFID tag. In addition, multiple observations made from a single linear array at different frequencies can be used to triangulate an RFID tag.

One example of a technique for observing location using AOA is based on a set of techniques known as Multiple Signal Classification (MUSIC) algorithms with spatial smoothing. In particular, to simplify notations, we examine the technique as applied to a four element linear array using the MUSIC algorithm with forward and backward filtering. One skilled in the art would appreciate the extension of the algorithm to an arbitrary array is achievable and contemplated.

The signals $r_i(t)$ received by the ith element of an M-element linear array each separated by a fixed distance, say $\lambda/2$, are given by $$r_i(t) = \sum_{k=1}^{N} a_k s_k(t) e^{-j(i-1)\pi\sin\theta_k} + n(t) \qquad (4)$$

where $a_k$ is the amplitude of the k-th multipath signal. $s_1(t)$ is the desired signal, $s_k(t)$ for $k=2, 3, \ldots, N$ are multipath received signals, $\theta_k$ is the angle of AOA relative to the antenna boresight for the k-th signal, and $n(t)$ is additive noise or interference.

The inphase and quadrature components, namely $I_n$, $Q_n$ denote the real and imaginary part of the received signal $r_i(t)$. In vector notation:

$$r(t) = As(t) + n(t) \qquad (5)$$

$$s(t) = \begin{bmatrix} s_1(t) \\ s_2(t) \\ M \\ s_N(t) \end{bmatrix}; A = [a(\theta_1), a(\theta_2), \ldots, a(\theta_N)];$$

$$a(\theta_i) = \begin{bmatrix} a_i \\ a_i e^{-j\pi\sin\theta_i} \\ M \\ a_i e^{-j(M-1)\pi\sin\theta_i} \end{bmatrix}$$

where $\theta$ is the AOA relative to the antenna boresight. The signals s(t) includes the desired signal and (N−1) multipath signals.

Figure 21:
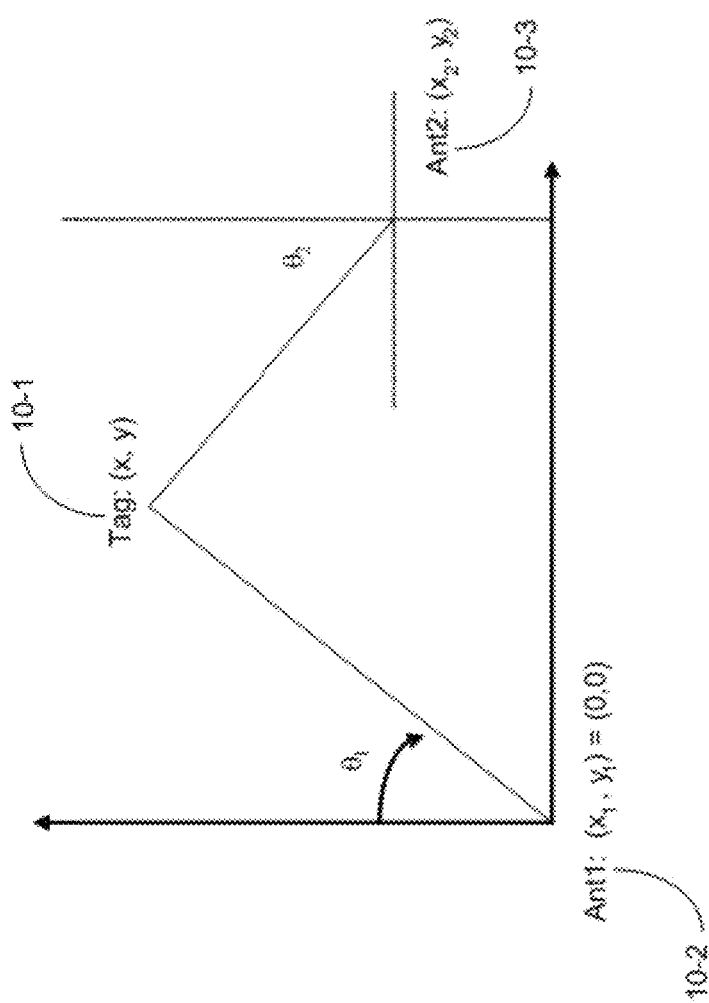
FIG. 21 graphically illustrates an analysis setup for DOA analysis showing RFID Tag, and antenna in accordance with various aspects of the present invention.

Referring now to FIG. 21, the location determination of an RFID tag 10-1 through multiple AOA measurements is illustrated. In this two-dimensional rendering, the tag location can be determined from two AOA measurements when the locations of the two array antennas 10-2 and 10-3 are known. In particular, the location (x, y) of the tag can be determined from:

$$\begin{bmatrix} x \\ y \end{bmatrix} = \begin{bmatrix} 1 & -\tan(\theta_1) \\ 1 & -\tan(\theta_2) \end{bmatrix}^{-1} \begin{bmatrix} 0 \\ x_2 - \tan(\theta_2)y_2 \end{bmatrix}$$

Figure 20:
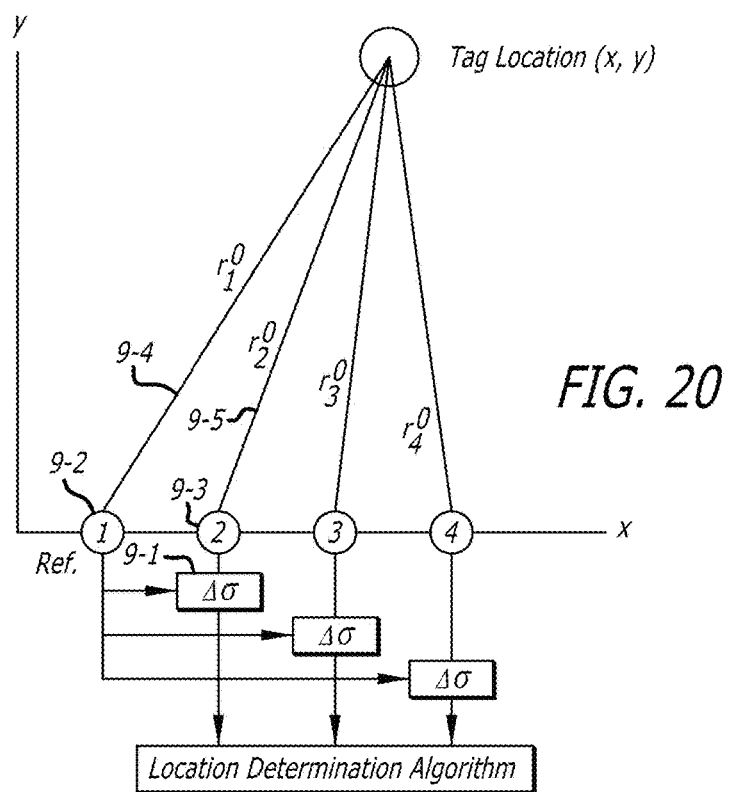
FIG. 20 graphically illustrates a simplified four-element array in a 2D implementation in accordance with various aspects of the present invention.

Referring now to FIG. 20, one aspect of an array antenna RFID system operating in a near field mode in terms of its ability to locate RFID tags is shown. A simplified four-element array is shown in a 2D illustration of an example of the RFID tag location provided by the system. One skilled in the art would appreciate the extension of the 2D to an arbitrary array in 3D is achievable and contemplated. The RFID tag location technique is based on measuring a phase difference 9-1 of the arrival signals between a particular element 9-3 and a reference element 9-2 or a preamble signal. The phase difference 9-1 is proportional to the range difference $(r_2^\circ - r_1^\circ)$ of the paths 9-4 and 9-5 between the RFID tag and the two array elements 9-2 and 9-3. In particular, the differential range is given by $$r_2^\circ - r_1^\circ = \frac{c}{2\pi f}\Delta\theta_1 \qquad (2)$$

where f is the carrier frequency of the RFID tag. The location of the RFID tag, uniquely determinable from $x_1$, $x_2$, $x_3$, $x_4$ and differential range $(r_2-r_1)$, $(r_3-r_1)$, $(r_4-r_1)$ can be calculated from the known locations of the array elements $(x_i, y_i)$ and the measured differential ranges from the very efficient algorithm where $$G = \begin{bmatrix} x_2 - x_1 & r_2 - r_1 \\ x_3 - x_1 & r_3 - r_1 \\ x_4 - x_1 & r_4 - r_1 \end{bmatrix}; Q = \begin{bmatrix} 1 & 0.5 & 0.5 \\ 0.5 & 1 & 0.5 \\ 0.5 & 0.5 & 1 \end{bmatrix}; \quad (3)$$

$$h = \frac{1}{2} \begin{bmatrix} (r_2 - r_1)^2 - x_2^2 + x_1^2 \\ (r_3 - r_1)^2 - x_3^2 + x_1^2 \\ (r_4 - r_1)^2 - x_4^2 + x_1^2 \end{bmatrix}; r_i^2 = (x_i - x)^2 + y^2$$

$$\begin{pmatrix} \hat{x} \\ \hat{y} \end{pmatrix} \approx (G^T Q^{-1} G)^{-1} G^T Q^{-1} h$$

without loss of generality we assumed $y_i=0$.

The solution is based on weighted linear Least Square (LS) solution to finding the intersection of hyperbolic curves defining the differential ranges. The accuracy of the solution approaches that predicted by the Cramer-Rao Bound (CRB).

Read Rate as an Observable

Read rate is the ratio of the number of times an RFID tag is read to the number of times in which the RFID tag could have been read during excitation of an exciter. Systems that utilize distributed exciter architectures can have receive sensitivity so high that the main factor influence tag read rate is path loss between transmitter and tag. Therefore, read rates are expected to be correlated to the location of the tag with respect to the exciter. For example, if hypothesis region $x_a$ is located at equal distance from exciters $e_1$ and $e_2$, then its respective read rates $RR_{e_1}$ and $RR_{e_2}$ for an RFID tag located within the hypothesis region are expected to be equal. In determining read rates, collisions can impact data. Typically, a balance is struck between avoiding collisions and ensuring that the number of slots provided to avoid collisions is not so great as to materially impact the performance of the system.

An excitation link margin is used to generate a probability mass function (pmf) that describes the likelihood that a tag will be read a given percentage of the time (Read Rate) if it is located within inventory region $x_a$. Read Rate is determined time interval and dividing this quantity by the number of total possible reads that were possible in the same time duration. Read Rates (RR) will be indexed by exciter ($e^j$) using notation $RR_e$. Given the preceding definitions it is possible to specify the probabilities as a point on a Gaussian probability mass function:

$$p(y^e | x_a) = \frac{1}{\sqrt{2\pi\sigma^2}} e^{-\frac{(RR_e - \mu)^2}{2\sigma^2}}$$

Where $\mu$ and $\sigma$ are determined as a function of excitation power, angle from exciter to hypothesis region, distance from exciter to hypothesis region, exciter radiation pattern, and tag radiation pattern. Note that prior to determining the probability of reading an RFID tag at a given location, all probabilities associated with a given exciter, e, are normalized such that:

$$\sum_{a \in H} p(y^e | x_a) = 1$$

H=The set of all hypothesis regions

As is discussed further below, a variety of estimators can be utilized to determine the location of the hypothesis regions and obtain location estimates for RFID tags observable within the various hypothesis regions.

Estimation Location Using Observables

Figure 19:
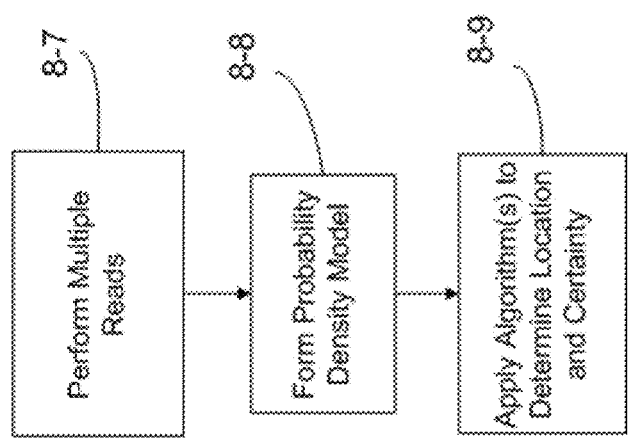

Referring now to FIG. 19, the operation provided in FIG. 18 is repeated (8-7). The repeated operation produces multiple read points. Utilizing these multiple reads and thus the information or distance estimations of the RFID tag, a probability distribution model is formed (8-8). An algorithm can be selected and applied (8-9) to determine a location estimate of the RFID tag. Additionally, a confidence level or accuracy factor can be determined. As a result of applying the algorithm the multipath effects, e.g., the direction of arrival of the signal from the source to each antenna element are accounted for and mitigated. Various estimators are discussed below.

Estimators Used to Obtain Location from Observables

The impact of noise present in observations of RFID tag location can be limited using estimators. A number of different estimators that can be used to estimate RFID tag location using any of the observables outlined above are discussed below.

Particle Filter Based Estimators

In one embodiment shown in FIG. 18 the phase, phase coefficient magnitude, read rate, carrier frequency, excitation node index, receive patch antenna index phase, and/or other observables associated with a given tag read (as described in the preceding text on observables) is passed to a Monte Carlo hypothesis testing algorithm known as a particle filter (25-4). Since a generalized 3D probability distribution function is continuous and hence technically infinite in complexity, a finite compressed description of this distribution is found. Kalman filters provide only a second-moment description of this general distribution. Unscented filters are good to 3rd moment complexity. It is also possible to consider gridded hypotheses, where a set of hypotheses are kept from across the domain of the state, and can be extended to higher point density. However, these can be very wasteful in the number of hypotheses needed to express a localized likelihood.

Particle filters are an adaptive hypothesis approach to estimation that uses a non-uniform time adaptive grid. Particles, which represent test hypotheses in state space, are generated based on the prior distribution of the state. For each observation, the likelihood that a given particle (the state possibility) generates that observation is assessed. Highly likely particles are replicated, unlikely particles are eliminated. Finally, replicated particles are randomly moved a small amount in state space, similar to a genetic mutation or annealing.

For our location estimation problem particles are associated with a (x,y,z) location and optionally a ($\dot{x}$, $\dot{y}$, $\dot{z}$) velocity. Particle filtering can be divided into an initialization process and a recurring set of processes that operate on each new measurement. We use the first measurement distribution, or other prior states, to generate the seed particle cloud. If the state were a uniform distribution over a finite extent, these initial particles could be chosen from a grid. But in general, the prior distribution is more complicated, and random state values are chosen to seed the particle set.

The time update process (25-5) is performed whenever a new observation (25-3) enters the system. It corresponds to the propagation of the particle states and dynamic uncertainty due to the fact that some time has passed since the last update. This step is driven by physical processes, deterministic and stochastic. Given that some amount of time that has passed since the last update there is some uncertainty about the current position and velocity of each particle. We relocate each particle to a random new position and a random new velocity. The distribution used for this processes depends on the environment and the current state of the particle. As an example, if we wish to estimate the location of tags moving on a forklifts the new velocity is limited to the velocities that can be obtained by an acceleration of 1G or less in each direction. There's also a maximum absolute value of velocity that the forklift can have. The time update process is separate from the regularization step in principle, but is dependent in implementation, since both time update and regularization add noise to state particles Next the measurement update (25-6) process computes likelihoods associated to each particle given the new measurement. The resulting likelihood is the product of the likelihoods that each observation (for instance phasor, or read rate measure) correspond to given the expected phase between eNode to tag and tag to antenna element distances. These probabilities can be evaluated with, in one embodiment, a Gaussian distribution that uses a standard deviation which depends on the receive power on the antenna when the observation is taken and also on the reliability associated with the estimated calibration coefficient. Calibration coefficients are used on each tag-read measurement in order to remove any effects that don't correspond to wave propagation. In one embodiment, given that the distance between an excitation point and a receive patch in known, one can remove excess phase rotation at each frequency compared to observed phase using a 'backchannel' waveform or reference tag that is co-located with the excitation point (25-10). The amount of removed excess rotation at each frequency is recorded and 'backed-out' of subsequent received tag measured phase data in order to compensate for phase rotation effects not due to radio propagation (such as electronic delay).

The re-sampling process (25-7) is in charge of destroying/cloning particles based on their likelihood. This is done by taking the cumulative distribution generated by the particles likelihoods and using it to generate the new particles. The more likely a particle is, the more it will be cloned. Clones of particles have the same position and velocity (in other words, they are exact clones for now; the next step (regularization) adds carefully chosen mutations)

The final step in the particle filter process, regularization (25-8), is responsible for keeping some memory of measurement likelihoods. Previous probabilities of particles are captured by reproduction and mutation. In this way particles with high are replicated. The regularization process is similar to genetic mutation or simulated annealing. Its purpose is to jitter clones to fill in gaps in the particle set. One of the known problems of particle filters is the possibility that the points collapse to a small number of hypothesis. If the cloud of particles collapses, there will be too few hypotheses to test in future measurements. The regularization process, through its introduction of random variation, is in charge of avoiding this problem.

Results are finally output for higher layer static gathering in (25-9). At this layer it is possible to compute probability densities for the location solution over time. In general one can report the quality of the final solution via variance measurement of this final layer statistic.

Bayesian Estimators

In one embodiment, signals for a selected RFID tag from which information is to be derived may be selected from signals from a plurality of RFID tags based on a spatial location of the selected RFID tag relative to the spatial location of other ones of the plurality of RFID tags. That is for a given interrogation space, only a specific population of tags are illuminated as depicted in FIG. 3 and as an example the interrogation space 3-8. For estimating the location of the tag, a Bayesian approach is used to model the probability density function of the location of an RFID tag, based on all available information such as the AOA, position of excitation node and any previous knowledge of the position of the population of the sensor(s) or tag(s), the multi path propagation environment, the frequency of the measurement, and the array response (beam pattern) where the measurement and any other auxiliary information to further inject in the apriori Bayesian model. In one aspect, the system recursively estimates the location in the three dimensional Euclidean space (position in x, y, z, that is elevation, roll, yaw).

The observed vector $Y_t^j$ (for the j-th tag) measured at each antenna element comprises of discrete complex valued received signal samples $r_t$ or equivalently the in-phase and quadrature components $I_n$, $Q_n$ for each antenna element with real and complex part respectively, known position of exciter (x,y,z), beam former coefficients a, Signal-to-Noise Ratio (SNR) Estimate, gain setting $\alpha$, soft metric, extrinsic information $\rho(I_n,Q_n)$, and packets (e.g. RN16+EPC code) for each interrogation space. The model measurement used is a single vector at time t, $Y_t^j$. It is assumed that the observed L-dimensional vector $Y_t^j$ results from mapping the 3-dimensional Euclidean space of the location of the tag to an L-dimensional observable vector $R^3 \rightarrow R^L$. Different approaches of estimating the probability distribution $P(x_t^i/Y_t^j)$ recursively are provided in which $x_t^j$ is the location coordinates of the j-th tag in 3 dimensions. The conditional expectation (i.e. mean value E(x|Y)) of this density represents that the location of the tag or equivalently is isomorphic to the estimation of this sequence.

Figure 22:
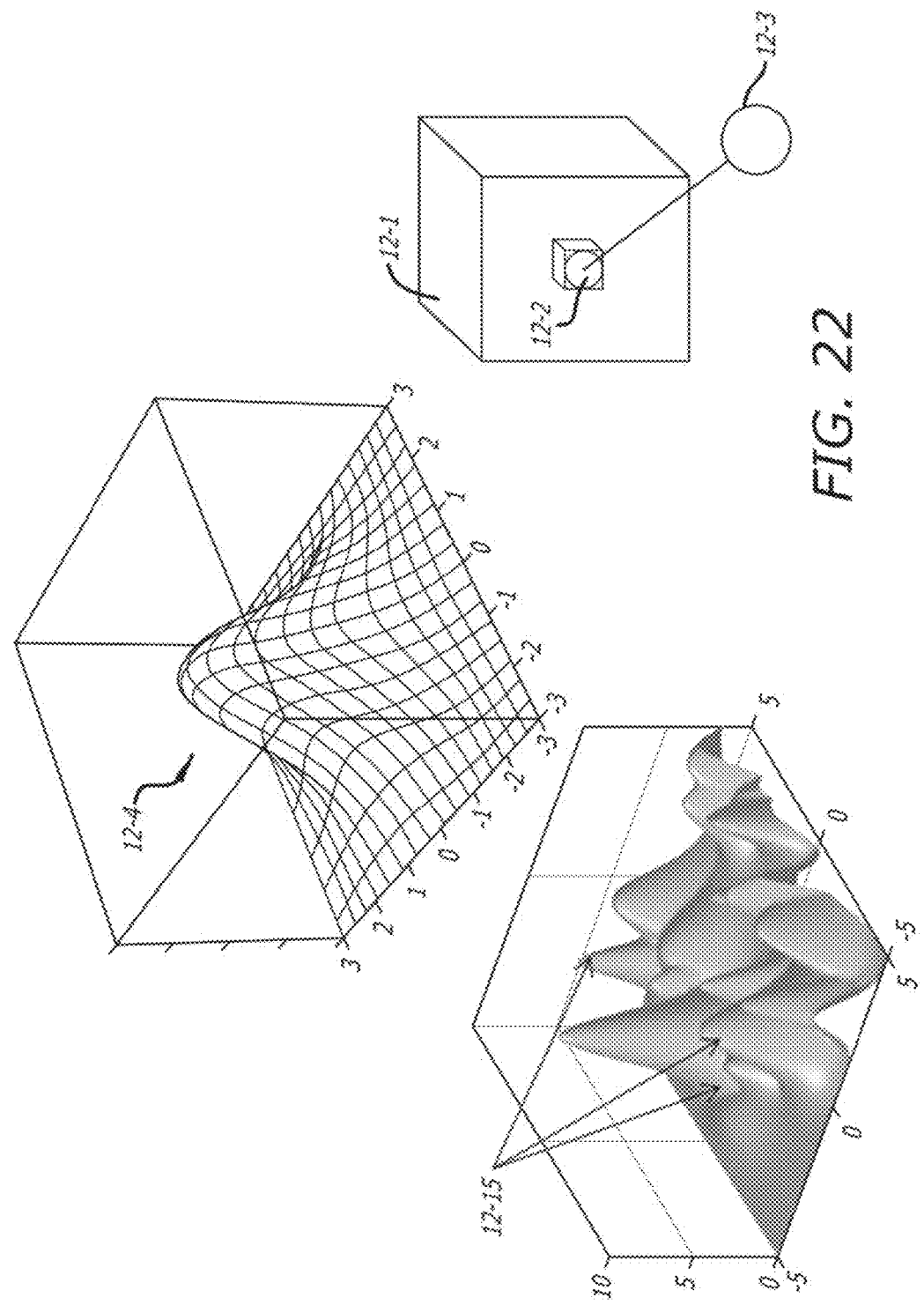
FIG. 22 is an interrogation space viewed as a two dimensional Gaussian density with a known mean and variance in two dimensional (x,y) Euclidean space in accordance with various aspects of the present invention.

Referring now to FIG. 22, for entire space or volume 12-1, an exciter activated by the reader produces a RFID location estimate that graphically is shown in 12-4. As multiple iterations of reads occur, the RFID location estimates for multiple RFIDs are graphically shown in 12-5. The peaks or centroid of the cones identifies the location of an RFID. The surrounding portion of the cone identifies the accuracy or certainty of the identified location. For example, the peak 12-5a being stepper provides an highly accurate location of an RFID tag while the peak 12-5b being flatter provides a less accurate estimate location of the RFID tag.

With a priori knowledge of the location of the transmitter/exciter (11-2), the problem of estimating a tag's location can be reduced to finding the location of tag in the cube shown in 12-1. Utilizing hypothetical testing, the cube can be further quantized for location of each tag to smaller cubes as shown in 12-2, with each location treated as sphere 12-3. The probability distribution of the location of population of the tags in the interrogation space can be viewed as a two dimensional Gaussian density with a known mean and variance in two dimensional (x,y) Euclidean space. The spheres projected into circles can also respectively be viewed as a two dimensional Gaussian density with a known mean and variance in two dimensional (x,y) Euclidean space as illustrated by graph 12-5. In case of three dimensional sphere 12-3 in a three dimensional Euclidean space, the (x,y,z) dimension of each point becomes the support of a three dimensional Gaussian density. In this manner, for certain class of algorithms described later, the algorithm can be initialized with a known a priori probability density models as illustrated by graph 12-5.

Figure 23:
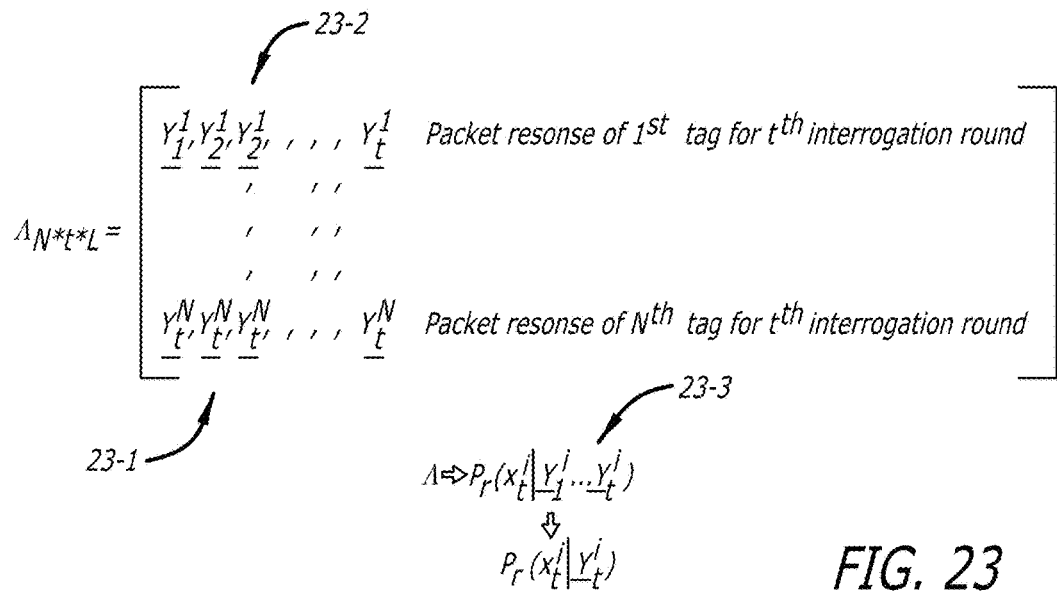
FIG. 23 illustrates a Markov chain assumption in accordance with various aspects of the present invention.
Figure 24:
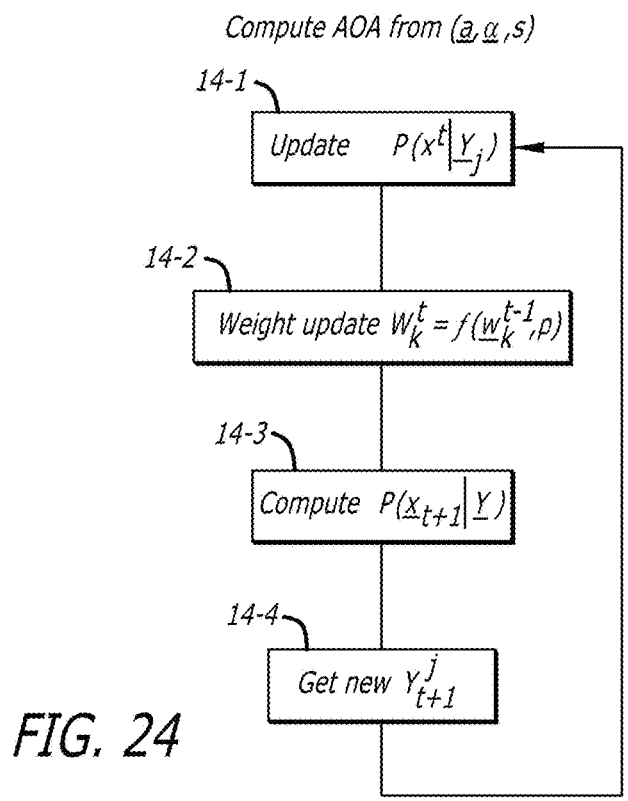
FIG. 24 is a flow diagram illustrating steps of the general form of sequential Monte Carlo methods in accordance with various aspects of the present invention.
Figure 25:
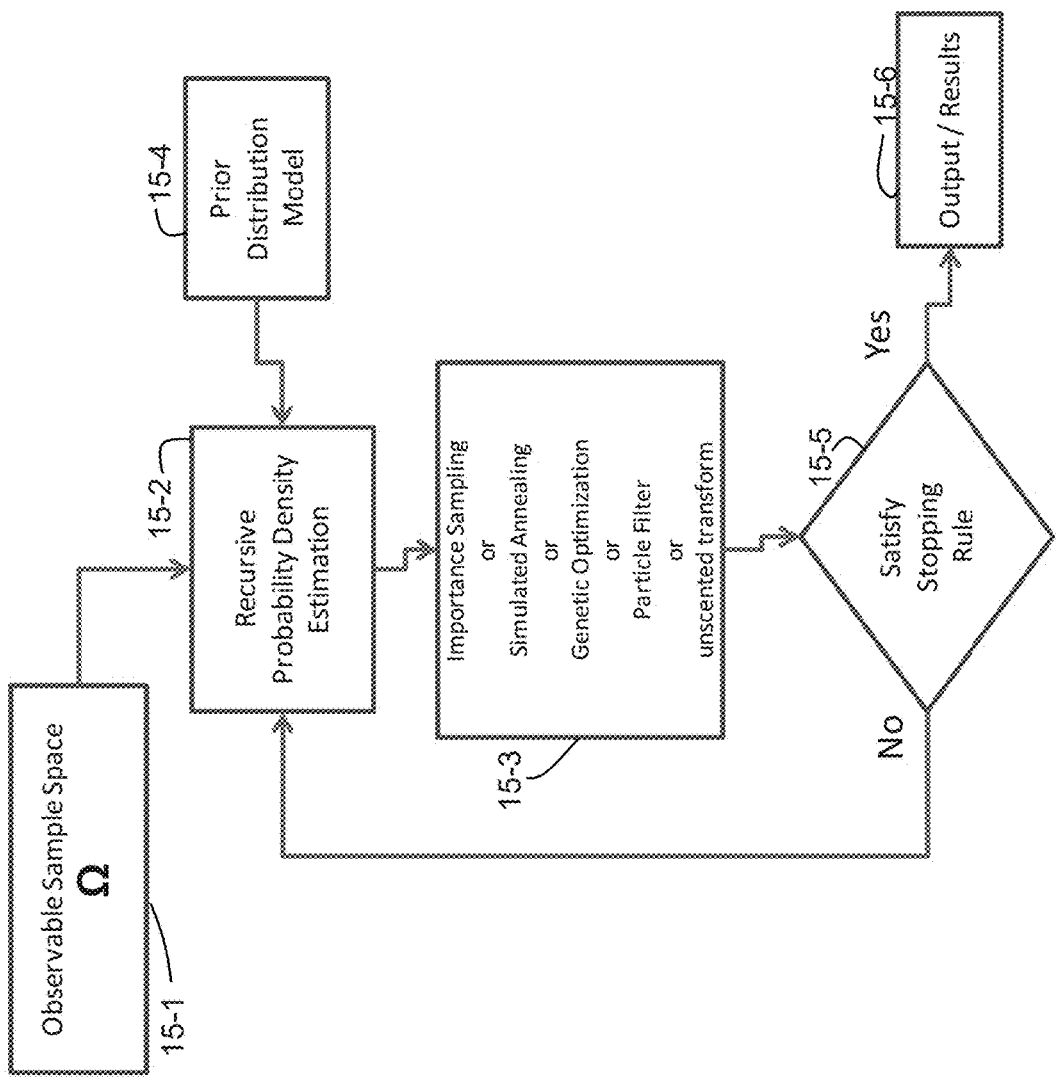
FIG. 25 is a flow diagram illustrating steps for the general solution to finding the location of the RFID tag/sensor in accordance with various aspects of the present invention.

Referring now to FIGS. 23-25, exemplary procedures and formulations to further refine and/or provide additional accuracy to the location estimation of an RFID tag are provided. In the following, the observed sample space $\Omega=\{Y_t^j, \forall t, j\}$ is denoted. $P(x_t^j|Y_t^j)$ represents the probability distribution function location at time t, based on all the past AOA measurements. Bayes models provide a probabilistic framework for the recursive estimation of $P(x_t^j|\theta)$, where the vector $\theta=(\theta_j \ldots \theta_t)$ defines the angle of arrival vector.

In an indoor propagation environment, the direction of the dominant signal may be due to a reflected signal instead of the direct path in some cases. This situation is accounted for to avoid an erroneous estimate of the actual location of the source. The location of a tag $\{x_t; t \in N\}$, $x_t \in X$ (t may also represent an iteration index) is modeled as a $1^{st}$ order Markov process with initial distribution $p(x_0)$ and the Markov relation $P(x_t|x_{t-1})$. The observed sequence of tag signals $Y_t \in \Omega$ may include both complex and real-valued measurements and estimates made by the reader system for each array element are provided in FIG. 23.

The observed vector from the j-th tag is denoted by $Y_t^j=(y_t^j, y_{t-1}^j, y_{t-2}^j, \ldots y_0^j)$ with each $y_t^j$ is a vector. The $P(x_t^j|Y_t^j)$ probability density function in one aspect is obtained recursively in two stages, namely prediction and update stages. The a priori probability density function at time step t used to predict $x_t$ (for clarity the dependency on j is removed) is $$P(x_t|Y_{t-1}) = \int P(x_t|x_{t-1})P(x_{t-1}|Y_{t-1})dx_{t-1} \quad (7)$$

and the update via Bayes rule is $$P(x_t|Y_t) = \frac{P(y_t|x_t)P(x_t|Y_{t-1})}{P(y_t|Y_{t-1})} \quad (8)$$

where, $P(y_t|y_{t-1}) = \int P(y_t|x_t)P(x_t|y_{t-1})dx_t$ with initial condition $P(x_0|Y_0)$. Equation (8) can be viewed as $P(x_t|Y_t)=W_t P(x_t|Y_{t-1})$ where the weight is defined by $$W_t = \frac{P(y_t|x_t)}{P(y_t|Y_{t-1})} \quad (9)$$

In various aspects, multiple approaches for recursive estimation of $P(x_t^j|Y_t^j)$ are provided. FIG. 24 outlines the steps of the general form of sequential Monte Carlo methods. The conditional density function $P(x_t^j|Y_t^j)$ is updated in each iteration 14-1, the weights are updated based on a function (to be defined later) of previous values of the weights and possibly a random parameter p (to be defined shortly) in 14-2. The prediction step 14-3 involves computing $P(x_{t+1}^j|Y_t^j)$ and then obtaining a new sample $Y_{t+1}^j$ from the sample space. This last step is referred to as resampling.

One resampling approach is to evaluate the density with a pointwise approximation. Using a classical Monte Carlo method, the empirical distribution of $x_t$ is given by an application of histogram averaging via $$\hat{P}(x_t) = \frac{1}{N}\sum_{i=1}^{N}\delta(x_t - x(i))$$

where $\{x(i)\}$ is drawn from a random source with a probability distribution $P(x)$. Each time a set of measurements is made, the likelihood of each prior measurement can be estimated.

In accordance with various aspects, the system initializes multiple solutions as described earlier. FIG. 25 provides a general approach in accordance with various aspect of finding the location of an RFID tag/sensor. Beginning with multiple candidate solutions and each solution set itself are applied to one of the many choices for estimating the likelihood as shown in 15-2, by sampling S2 in 15-1, and computing the probability density $P(x_{t+1}^j|Y_t^j)$. Various techniques outlined in 15-3 such as rejection sampling, importance sampling and sampling importance resampling (SIR), simulated annealing, particle filtering and unscented transform approaches can be used. Each of these techniques utilize a slightly different approach to computing the weight sequence in resampling over time, where resampling is performed with replacement N-times from $\Omega$ in all the cases.

A Sampling Importance Resampling Estimator

A recursive SIR approach is performed as follows:

1. Set t=0 and get M samples $x_0^i \in \Omega$ for i=1, . . . , M
2. Weight Update: Compute the likelihood weights $w_t^i=P(y_t|x_t^i)$ for i=1, . . . , M
3. Normalize the weights by $$\partial = \sum_{j=1}^{M} w_j \text{ with } w_i^* = \frac{w_i}{\partial}$$

4. Resampling: Generate a new set $\tilde{x}_t^i \in \Omega$ with l= 1, . . . , N with replacement N times from the discrete set $\{x_t^j, j=1,L, M\}$ with $P(\tilde{x}_t^i=x_t^j)=w_j^*$
5. Prediction: predict each of the resampled states independently k-time, where $x_{t+1}^{(i-1)k+m} \propto P(x_{t+1}|\tilde{x}_t^i)$ with j=1, . . . , N and m=1, . . . , k
6. go to step 2 and repeat t=t+1

To avoid a degenerate solution where after some iterations only one candidate state vector value is present, the resampling step may modified by using a known distribution around the expected location of RFID tags near the exciter. The choice of importance function in each coordinate will be an independent identically distributed Gaussian distributed density $N(m,\sigma)$ with the mean m and variance $\sigma^2$ of the density to be equal to the location of the exciter plus a correction term (mid-range between exciter and the farthest tag illuminated by the exciter) and variance $\sigma^2$ to be equal to one of the diameters of the ellipsoid in the three dimensional Euclidean space.

In this case the importance sampling is achieved by generating samples from a proposed distribution $q(X_t|Y_t)=q(x_t|x_{t-1}^i,Y_t)q(X_{t-1}|Y_{t-1})$. In this version to determine the degeneracy of the particle cloud, the relative efficiency of the importance sampling procedure is related by the ratio between the variance of the importance sampling estimate and the variance of the estimate if a perfect Monte Carlo simulation was possible. The quantity can be estimated by $$N_{eff} = \frac{1}{\sum_i^N w_i^2}$$

and $N_{thresh}$ is a preselected threshold where the resampling procedure is applied to the set of the particles.

An Enhanced Particle Filter Estimator

In one embodiment, an enhanced particle filtering approach begins with a generation or selection of N inputs or samples (Set t=0 and $$w_0^i = \frac{1}{N}$$

get N samples $x_0^i \in \Omega$ for i=1, ..., N from $q(x_0|y_0)$). Weights for each sample (i=1, ..., N) are then computed in accordance with the following function:

$$w_t^j = w_{t-1}^j \frac{p(y_t|x_{t-1}^j)}{q(x_t|x_{t-1}^j, Y_t)}$$

and normalized:

$$\partial = \sum_{j=1}^M w_j \text{ with } w_i = \frac{w_i}{\partial}$$

If the relative efficiency is greater than a preselected threshold ($N_{eff} > N_{thresh}$) then resampling is skipped. Otherwise, resampling is performed by generating a new set $\tilde{x} \in \Omega$ with i=1, ..., N with replacement N times from the discrete set $\{x_t^j, j=1, L, M\}$ with $P(\tilde{x}=x_t^j)=w_j$ and weights are reset $$w_0^i = \frac{1}{N}.$$

Prediction is then performed for each of the states or resampled states independently of k-time, where $x_{t+1}^i \propto q(x_{t+1}|x_t^i, Y_{t+1})$ with i=1, ..., N and m=1, ..., k. The process is then repeated for the next set (t=t+1) and the computation of the weights for the new samples.

A Metropolis-Hastings Algorithm Estimator

Using a Markov chain model for the observed sequence and estimation when a proposed distribution is used to generate the samples, the Metropolis-Hastings algorithm, a candidate sample z is drawn from the proposal q(z|x) and accepted with a probability given by (p, q, π representing different distributions)

$$\alpha(x, z) = \min\left(1, \frac{\pi(z)q(x|z)}{\pi(x)q(z|x)}\right)$$

The candidate is accepted or rejected, as the Markov chain moves to the new data set, while the rejection leaves the Markov chain at the current data point in the state space. If $\pi(x)=p(x|y)$ is chosen, then the acceptance probability is simply:

$$\alpha(x, z) = \min\left(1, \frac{p(y|z)}{q(y|x)}\right)$$

Metropolis-Hastings Algorithm is Summarized as Follows:
1. Set t=0 and choose $x_0$ randomly or deterministically
2. Sample $z \sim q(z|x_t)$ and $u \sim U(0,1)$
3. Compute acceptance probability: $\alpha(x,z)$
4. Predict: If $u \leq \alpha(x,z)$ accept the new sample $x_{t+1}=z$ otherwise $x_{t+1}=x_t$
5. Go to step 2 and repeat t=t+1

In step 4, by adopting a statistical mechanics approach with introducing an energy or fitness function for the state of the system, then the probability density in phase space of the point representing $x_t$ is proportional to $e^{-\beta E(x_t)}$ where $$\beta = \frac{1}{kT},$$

T is the absolute temperature in Kelvin and k is the Boltzman constant $1.38 \times 10^{-23}$ J/Kelvin. The energy or fitness improvement with transitioning from one state to another can be characterized as the difference between the two energy state, i.e. $\Delta E = E(x_{t+1}) - E(x_t)$ such that the energy is reduced in each iteration, that is transition probabilities of the state is:

$$x_{t+1} = \begin{cases} x_t^\% & \text{with probability } e^{-\beta \Delta E} \\ x_t & \text{with probability } 1 - e^{-\beta \Delta E} \end{cases} \text{ where } x_t^\% \in \Omega.$$

If an additional constraint is applied to reduce the temperature T monotonically such that $T_n < T_{n-1} < T_{n-2}$ in each iteration for a set of the data with the initial condition of $T_0 \gg T_n < T_{n-1} < T_{n-2}$, it is expected for the solution to converge to the near optimal estimate, by utilizing the trajectory of the solution phase space with the property of following the states of an aperiodic and irreducible Markov chain.

An Unscented Transform Estimator

Unscented transform is another approach to estimation of the location for the RFID tags. By defining the covariance matrix $P=E((x-\bar{x})(x-\bar{x})^T)$, where $\bar{x}$ denotes the mean value of the random variable x, the problem of approximating the distribution of an N-dimensional random variable with a mean and covariance is approached. The affine transform $x = \bar{x} + (\sqrt{X})z$ is defined where $\sqrt{X}$ is the matrix square root of X with property $\sqrt{X}\sqrt{X}^T = X$. The unscented transform approach is thus summarized as follows:
1. Initialize $$\bar{x}_0 = E[x_0] \quad P_0 = E[(x_0 - \bar{x}_0)(x_0 - \bar{x}_0)^T]$$

$$\bar{x}_0^a = E[x^a] = [\bar{x}_0^T \quad 0 \quad 0]^T$$

$$P_0^a = E[(x_0^a - \bar{x}_0^a)(x_0^a - \bar{x}_0^a)^T] = \begin{bmatrix} P_0 & 0 & 0 \\ 0 & Q & 0 \\ 0 & 0 & R \end{bmatrix}$$

2. Define $$\lambda_{t-1}^a [\bar{x}_{t-1}^a \bar{x}_{t-1}^a \pm \sqrt{(n_a+\lambda)P_{t-1}^a}]$$

3. Time Update $$X^x_{t|t-1} = f(X^x_{t-1}, X^v_{t-1})$$

$$\bar{x}_{t|t-1} = \sum_{i=0}^{2n_a} W_i^{(m)} X^x_{i,t|t-1}$$

$$P_{t|t-1} = \sum_{i=0}^{2n_a} W_i^{(c)} [X^x_{i,t|t-1} - \bar{x}_{t|t-1}][X^x_{i,t|t-1} - \bar{x}_{t|t-1}]^T$$

$$Y_{t|t-1} = h(X^x_{t|t-1}, X^x_{t-1})$$

$$\bar{y}_{t|t-1} = \sum_{i=0}^{2n_a} W_i^{(m)} Y_{i,t|t-1}$$

4. Weight Update $$W_t^c = W_{t-1}^c P(y_t|x_t)$$

$\lambda$ is a composite scaling parameter, $n_a = n_x + n_v + n_n$, Q is process noise covariance. R is measurement noise covariance matrix.

A Differential Evolution Based Estimator

Figure 26:
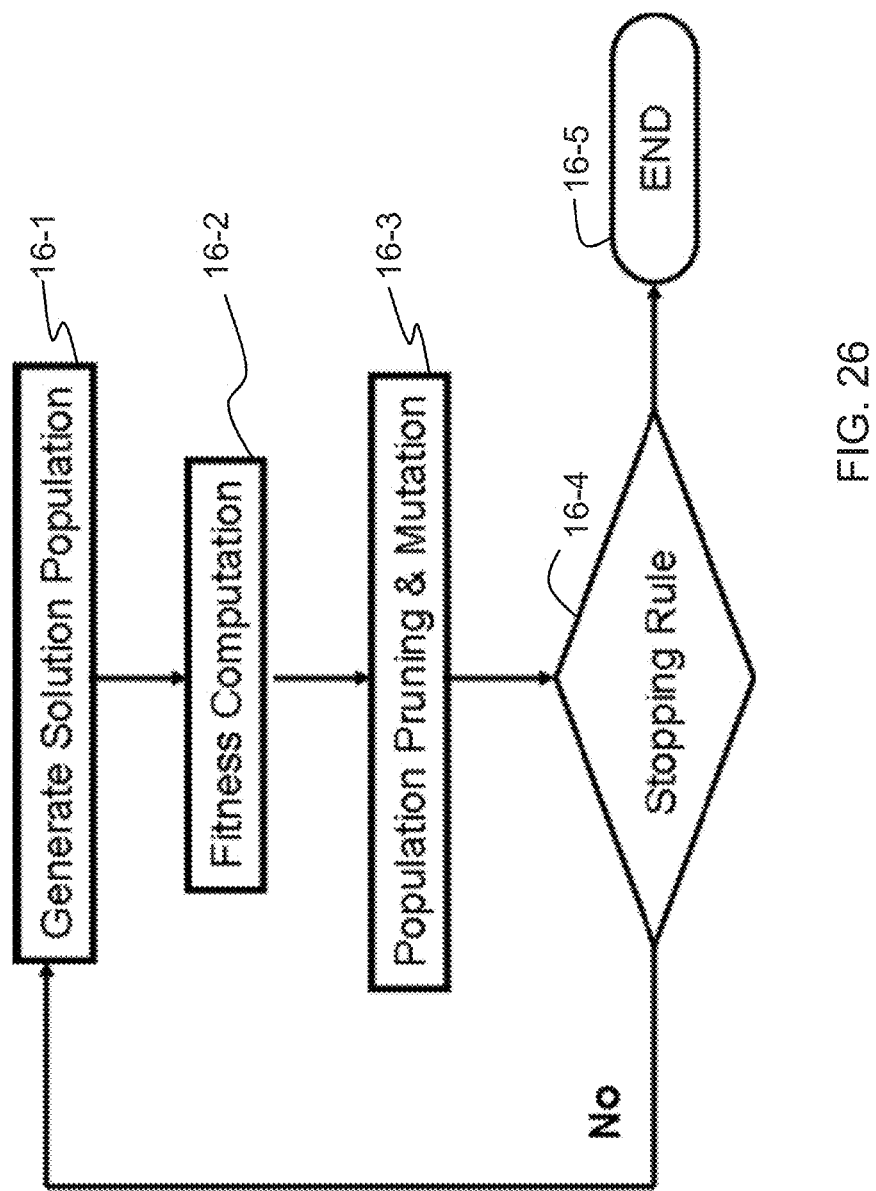
FIG. 26 is a flowchart of a Differential and Genetic evolution methodology in accordance with various aspects of the present invention.

Another layer of optimization for finding the location of the RFID tag is to start from a population (instead of a single solution) of possible solutions. The initial population is chosen judiciously to cover the space of the exciter range as much as possible. In one aspect, a uniform probability distribution for all random locations is initially utilized. In case a preliminary solution is available, the initial population is often generated by adding normally distributed random deviations to the nominal solution $x_{nominal}$. Differential evolution (DE) provides an approach for generating trial parameter vectors. DE generates new parameter vectors by adding a weighted difference vector between two population members to a third member. If the resulting vector yields a lower objective function value than a predetermined population member, the newly generated vector will replace the vector with which it was compared in the following generation. The comparison vector can but need not be part of the generation process mentioned above. In addition the best parameter vector $x_{Best,G}$ is evaluated for every generation G in order to keep track of the progress that is made during the minimization process. Extracting distance and direction information from the population to generate random deviations results into a converging solution. A trial vector is introduced for each generation $v = x_{r_1,G} + \mu(x_{r_2,G} - x_{r_3,G})$ with $r_1, r_2, r_3$ randomly chosen between 1 and L, where L is the number of generations to follow and is a fixed parameter throughout the evolution and $\mu$ controls the step size of the differential variation from one generation to the other. This methodology is summarized in FIG. 26, starting with a population of feasible solutions 16-1, then performing some fitness computation in 16-2, population pruning and mutation in 16-3, checking a stopping rule in 16-3.

An Ant Colony Optimization Based Estimator

In various other embodiments, other nonlinear stochastic optimization algorithms are utilized by considering a population of solutions and updating each solution's viability via some selected metric. A metric used frequently and referred to as ant colony optimization, referred to as pheromone is defined by $$p_{ij}^k = \begin{cases} \dfrac{\tau_{ij}^\alpha}{\sum_{l \in N_i^k} \tau_{il}^\alpha} & \text{if } j \in N_i^k \\ 0 & \text{if } j \notin N_i^k \end{cases}$$

When in iteration t, consider N possible solutions (as opposed to following one solution) and follow k solutions and compute the probability of solution j by setting a solution metric $\tau_{ij} \leftarrow \tau_{ij} + \Delta \tau^k$ with initial condition $\tau_{ij} \leftarrow (1-p) \tau_{ij}$, $\forall (i,j) \in A$. $N_i^k$ denotes the number of solutions in the neighborhood of $k^{th}$ solution in the $i^{th}$ iteration. In this manner, potential degeneracy problems are avoided at an algorithmic level by considering multiple solutions concurrently in the solution space. This can be applied to any of the algorithms described above, by considering each solution as a single point in a planar graph and finding the best path in the graph via the solution metric outlined here. This approach is similar to so called "genetic programming" or "ant colony optimization".

Stopping Rules

In the accordance with various aspects, the approaches provided are without any specific constraints on the form or type of stopping rule. For brevity here, a number of different stopping rules are provided as used in accordance various aspects of the present invention. Here a distance is computed $d(x_t, x_{t+1})$, for example $|x_t - x_{t+1}|$ and if $d(x_t, x^{t+1}) << \epsilon$ the algorithm is stopped. A region of attraction is defined by $A = \{x_t, d(x_t, x^*) << \epsilon\}$ where $x^*$ denotes the optimal solution and $\epsilon$ being a small positive number. For algorithms utilizing a discrete Markov chain approach such as the Metropolis-Hastings method, the fraction of the uncovered state space is minimized such that a region of attraction is reached. In this approach a count is used for visiting each state of $\Omega$ and then incrementing it each time the state is visited. The stopping rule is such that $$\min_i C_i > 1$$

and in addition the distance criterion is met.

Location Estimation in Vertical Racked Shelving Applications

An end application of the present invention is described in FIG. 27. The figure details a series of adjacent vertical racked shelves used to store inventory items. Such shelving commonly appears in warehouses to store inventory. With present technology the inventory must be manually counted, often with the aid of barcode reading devices, by moving from one section of the shelving to another and recording an item's serial identifier along with shelf x,y,z location. In contrast the RFID location system as described throughout this description in various embodiments is able to provide continuous status regarding items stored on shelves without movement of gear or personnel from one area to the next. This is achieved in one embodiment through regular static placement of radio frequency excitation points overhead in the area between aisles. Utilizing excitation power control and/or read rates for an RFID tag on a per exciter basis in conjunction with the particle location procedures items in applications such as vertical racked storage can be located. In particular, read rates for an RFID tag on a per exciter basis and per excitation power level provide z dimension information for the location of an RFID tag. It should however be appreciated that there is a special case of vertical racked storage, floor level storage (also known as floor staging of goods), such that the vertical location of goods (z) is known a-priori to be a known constant. It should also be appreciated that a special case of vertical racked storage exists when items are simply stacked on top of one another. In this case no physical shelf separates items in the "z" dimension; rather item height is delineated by stacking order.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

The invention claimed is:

1. A method of locating one or more radio frequency identification (RFID) tags comprising:
   transmitting, to at least one RFID tag, a first interrogation signal from a first transmit antenna at a first location and a different second interrogation signal from a second transmit antenna at a second location;
   receiving first and second information signals at a set of one or more receive antennas in a third location in response to the first and second interrogation signals from the at least one RFID tag;
   determining a set of phase differences for the received first and second information signals from the at least one RFID tag received by the at least one receive antenna;
   determining, based on the set of phase differences:
      a first path length between the first location of the first transmit antenna, the at least one RFID tag, and the third location of the set of receive antennas, and
      a second path length between the second location of the second transmit antenna, the at least one RFID tag, and the third location of the set of receive antennas; and
   identifying a location of the at least one RFID tag based on the determined phase differences of the first and second received information signals and the first and second path lengths.

2. A radio frequency identification (RFID) system for locating one or more RFID tags, the system comprising:
   a plurality of antennas comprising:
      first and second transmit antennas configured to transmit interrogation signals to at least one RFID tag, wherein the first and second transmit antennas are at first and second locations respectively; and
      at least one receive antenna to receive information signals from the at least one RFID tag; and
   a reader configured to:
      selectively activate the first transmit antenna to transmit a first interrogation signal at a first frequency and the second transmit antenna to transmit a second interrogation signal at a different second frequency;
      receive first and second information signals in response to the first and second interrogation signals at a set of one or more receive antennas in a third location; and
      identify a location of the at least one RFID tag based on the first, second, and third locations, and a first path length between the set of receive antennas, the at least one RFID tag, and the first transmit antenna, and a second path length between the set of receive antennas, the at least one RFID tag, and the second transmit antenna, wherein the path lengths are determined from the first and second information signals.

3. The system of claim 2, wherein the reader activates the first and second transmit antennas to send the first and second interrogation signals simultaneously.

4. The system of claim 3, wherein the reader identifies the location of the at least one RFID tag further based on phase differences between the first and second information signals.

5. The system of claim 2, wherein the reader identifies the location of the at least one RFID tag further based on frequency differences of the first and second information signals.

6. The system of claim 5, wherein the reader identifies the location of the at least one RFID tag based on a ratio of phase differences between the first and second information signals versus the frequency differences of the first and second information signals.

7. The system of claim 2, wherein the first and second antennas are associated with an exciter, wherein the exciter comprises at least one transmit antenna and at least one receive antenna.

8. The system of claim 7, wherein each antenna of the exciter can operate as either a transmit antenna or a receive antenna.

9. The system of claim 2, wherein the first and second transmit antennas are each associated with different exciters.

10. The system of claim 2, wherein the reader selectively activates the first and second transmit antennas in a plurality of iterations to collect a plurality of information signals from the at least one RFID tag for each iteration.

11. The system of claim 2, wherein the reader activates the first transmit antenna to use a first frequency for a first iteration and a different, third frequency for a subsequent second iteration.

12. The system of claim 2, wherein the reader estimates the location of the at least one RFID tag from the received information signals using a probability model.

13. The system of claim 12, wherein the probability model is determined using a particle filter.

14. The method of claim 1, wherein transmitting the first and second interrogation signals to the at least one RFID tag comprises activating the first and second transmit antennas to send the first and second interrogation signals simultaneously.

15. The method of claim 14, wherein identifying the location of the at least one RFID tag comprises using differences between the first and second frequencies to identify the location of the at least one RFID tag.

16. The method of claim 1, wherein identifying the location of the at least one RFID tag from the received information signals comprises using a probability model to estimate the location of the at least one RFID tag.

17. The system of claim 3, wherein the reader is further configured to transmit a third interrogation signal using the first transmit antenna and a fourth interrogation signal using the second antenna, wherein the third interrogation signal has a same set of properties as the first interrogation signal and the fourth interrogation signal has a different set of properties from the second interrogation signal.

18. The system of claim 17, wherein the first and third interrogation signals use a same frequency and the second and fourth interrogation signals use different frequencies.

19. The system of claim 3, wherein the reader is configured to locate the RFID tag further based on differences in frequency between the received first and second information signals.

* * * * *